FIG. I

ALL RED INTERVALS SEQUENCE CHART

| SEQUENCE | INTERVAL |
|---|---|
| B–C | LONG |
| B–A | SHORT |
| A–B | LONG |
| A–C | SHORT |
| C–A | LONG |
| C–B | SHORT |

INVENTOR:
WALTER M. JEFFERS,

BY

HIS ATTORNEY.

TRAFFIC ADJUSTED CONTROL SYSTEM AND APPARATUS

Filed Sept. 22, 1961 23 Sheets-Sheet 2

INVENTOR:
WALTER M. JEFFERS,

BY Q. Emmett Thompson
HIS ATTORNEY.

Sept. 21, 1965 W. M. JEFFERS 3,208,038

TRAFFIC ADJUSTED CONTROL SYSTEM AND APPARATUS

Filed Sept. 22, 1961 23 Sheets-Sheet 3

TAC CAM CHART

INVENTOR:
WALTER M. JEFFERS,

BY Q. Emmett Thompson,
HIS ATTORNEY.

INVENTOR:
WALTER M. JEFFERS,

BY D. Emmett Thompson
HIS ATTORNEY.

INVENTOR:
WALTER M. JEFFERS,

BY Q. Emmett Thompson,
HIS ATTORNEY.

INVENTOR:
WALTER M. JEFFERS,

BY R. Emmett Thompson,
HIS ATTORNEY.

INVENTOR:
WALTER M. JEFFERS,
BY R. Emmett Thompson
HIS ATTORNEY.

INVENTOR:
WALTER M. JEFFERS,

BY [signature]

HIS ATTORNEY.

INVENTOR:
WALTER M. JEFFERS,
BY R. Emmett Thompson,
HIS ATTORNEY.

TPT TRIPLE PEDESTRIAN TIME

INVENTOR:
WALTER M. JEFFERS,
BY R. Emmett Thompson,
HIS ATTORNEY.

Sept. 21, 1965 W. M. JEFFERS 3,208,038

TRAFFIC ADJUSTED CONTROL SYSTEM AND APPARATUS

Filed Sept. 22, 1961 23 Sheets-Sheet 11

TRC
TRIPLE RED CLEARANCE
TIMER

INVENTOR:
WALTER M. JEFFERS,

BY R. Emmett Thompson,
HIS ATTORNEY.

INVENTOR:
WALTER M. JEFFERS,
BY [signature]
HIS ATTORNEY.

INVENTOR:
WALTER M. JEFFERS,
BY Q. Emmett Thompson
HIS ATTORNEY

INVENTOR:
WALTER M. JEFFERS,
BY Q. Emmett Thompson,
HIS ATTORNEY.

TRAFFIC ADJUSTED CONTROL SYSTEM AND APPARATUS

Filed Sept. 22, 1961 23 Sheets-Sheet 15

INVENTOR:
WALTER M. JEFFERS,

BY D. Emmett Thompson,
HIS ATTORNEY.

TPT TRIPLE PEDESTRIAN TIMER

INVENTOR:
WALTER M. JEFFERS,

BY [signature]
HIS ATTORNEY.

Sept. 21, 1965 W. M. JEFFERS 3,208,038
TRAFFIC ADJUSTED CONTROL SYSTEM AND APPARATUS
Filed Sept. 22, 1961 23 Sheets-Sheet 17
FIG. 13k. TPT TRIPLE PEDESTRIAN TIMER
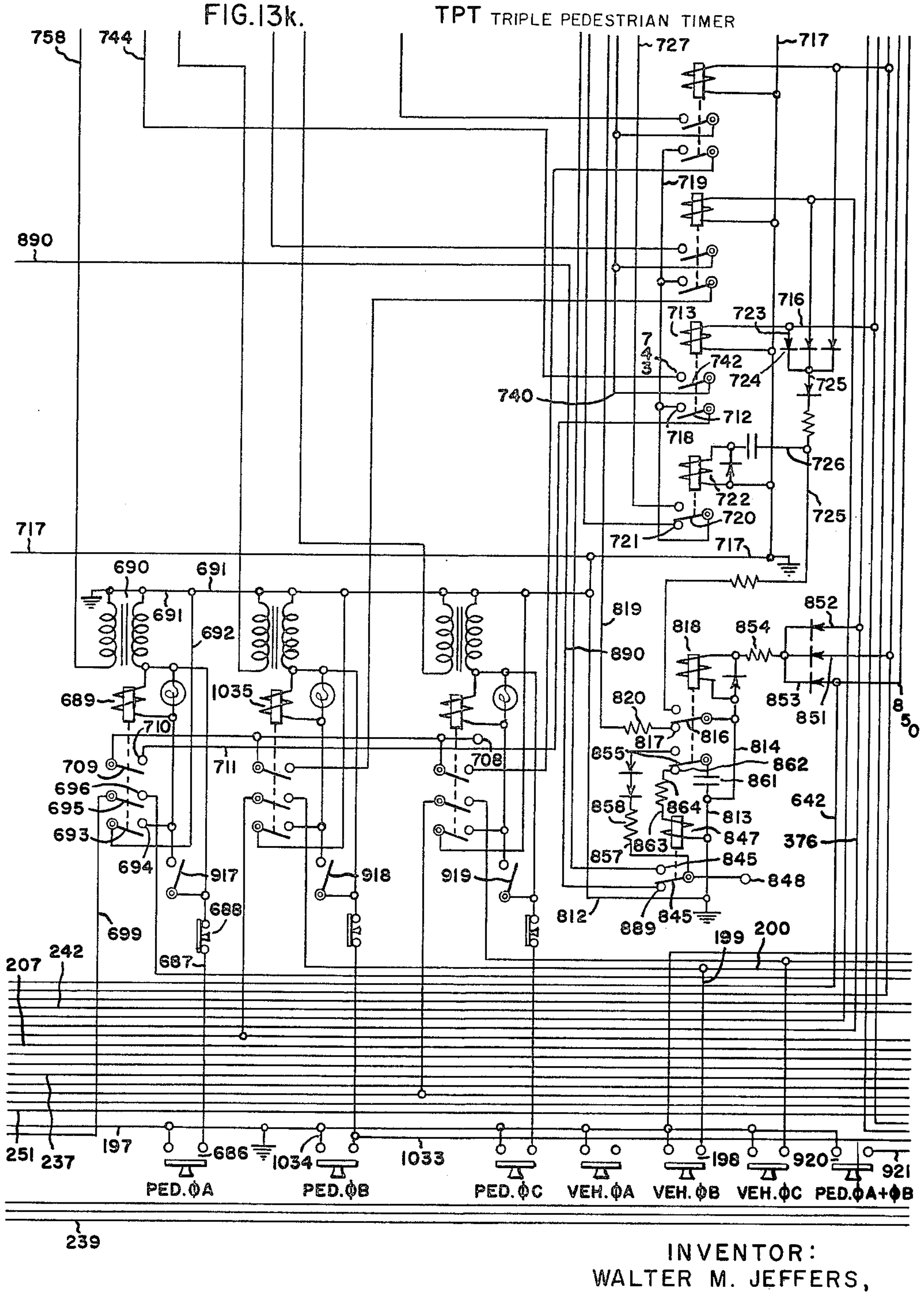
INVENTOR:
WALTER M. JEFFERS,
BY [signature]
HIS ATTORNEY.

TRC TRIPLE RED CLEARANCE TIMER

INVENTOR:
WALTER M. JEFFERS,
BY [signature]
HIS ATTORNEY.

TPO VEHICLE OVERLAP UNIT

INVENTOR:
WALTER M. JEFFERS,
BY D. Emmett Thompson
HIS ATTORNEY.

Sept. 21, 1965 W. M. JEFFERS 3,208,038

TRAFFIC ADJUSTED CONTROL SYSTEM AND APPARATUS

Filed Sept. 22, 1961 23 Sheets-Sheet 20

INVENTOR:
WALTER M. JEFFERS,

BY [signature]

HIS ATTORNEY.

TRAFFIC ADJUSTED CONTROL SYSTEM AND APPARATUS

Filed Sept. 22, 1961 23 Sheets-Sheet 21

INVENTOR:
WALTER M. JEFFERS,
BY
HIS ATTORNEY.

INVENTOR:
WALTER M. JEFFERS,
BY O. Emmett Thompson
HIS ATTORNEY.

Sept. 21, 1965 W. M. JEFFERS 3,208,038

TRAFFIC ADJUSTED CONTROL SYSTEM AND APPARATUS

Filed Sept. 22, 1961 23 Sheets-Sheet 23

INVENTOR:

WALTER M. JEFFERS,

BY D. Emmett Thompson

HIS ATTORNEY.

United States Patent Office 3,208,038

Patented Sept. 21, 1965

3,208,038
TRAFFIC ADJUSTED CONTROL SYSTEM AND APPARATUS

Walter M. Jeffers, Syracuse, N.Y., assignor to Crouse-Hinds Company, Syracuse, N.Y., a corporation of New York Filed Sept. 22, 1961, Ser. No. 139,952
5 Claims. (Cl. 340—35)

This invention relates to and has as a general object a new and improved traffic control system and apparatus therefor.

In the art of traffic signalling prior to this time, there have been two general types of traffic signal controllers. The first type is known as a "fixed," or "pre-timed controller," and operates to display the right-of-way signal display sequence which constitutes the "go" or proceed signal, and the amber, or clearance signal to two or more intersecting streets for predetermined fixed periods of time, independent of the amount of traffic passing through the intersection on the streets.

The second general type of controllers are known as actuated controllers, and these controllers are interconnected with detector means associated with each of the intersecting lanes, or streets, and operate in response to vehicular actuations of the detector means to provide the right-of-way signal display sequence to the streets for periods of time which vary in response to the number and/or the frequency of the actuations of the detector means.

Each controller has its own advantage, the outstanding advantage of the fixed time controller being its simplicity and economy of manufacture, and, further, in periods of a maximum traffic density at an intersection, the fixed time controller is the most efficient controller. In addition, a plurality of pre-timed controllers may be interconnected so as to establish and maintain a progressive traffic movement. Conversely, the outstanding advantage of the actuated controller is its flexibility in that the right-of-way signal display sequence will be presented to the various intersecting lanes, or streets, in response to the actual demand on the lanes and, accordingly, the actuated controller is the most efficient controller where the traffic density at the intersection is something less than the maximum, or saturation point.

The main disadvantage of the fixed time controller is that the intersecting lanes are presented with the right-of-way signal display sequence continuously and cyclically whether or not there is a demand present on any of the lanes. The main disadvantage of the actuated controller is that it is complicated and expensive to manufacture and maintain, and is not as efficient as a fixed time controller during periods of maximum traffic saturation.

Accordingly, it is a more specific object of this invention to provide a traffic adjusted control system which functions to combine a traffic adjusted control system which functions to combine the best features of operation of the fixed time controller and the actuated controller.

More specifically, it is an object of this invention to provide a traffic adjusted contrtol system and apparatus which functions as a fixed time controller in periods of maximum traffic density of the controlled intersection, but which operates as an actuated controller during periods of less than maximum traffic density, and wherein the maximum is selectively variable.

Further, it is an object of this invention to provide a traffic control system and apparatus for an intersection which may be interconnected with other similar apparatus, all of which are controlled by a master controller so as to provide for a progressive traffic movement along a main traffic artery.

In my prior application, Serial Number 47,492, filed August 4, 1960, now U.S. Patent 3,146,421; there is disclosed a full actuated 3-phase (or movement) single traffic intersection controller. The invention of that application may be referred to for a more complete disclosure of an actuated controller, and it will be seen that the invention of that application functioned to transfer the right-of-way signal display sequence to the various phases or movements in the order of actuation of the detector means associated with each lane. The amount of time, or the interval during which the right-of-way signal display sequence was presented to the various lanes was dependent upon the traffic demand on the movements, and was limited by a maximum timer in the controller.

It is an additional object of this invention to provide an actuated traffic controller which is capable of presenting the right-of-way signal display sequence for one or two of the three movements on a fixed time basis, and to the remaining movement, or movements, on an actuated basis dependent upon the volume of traffic present upon the movements.

Further, it is an object of this invention to provide a traffic control system for an intersection wherein an all-red clearance interval is inserted in the right-of-way sequence following each amber, or clearance interval in the control cycle, and wherein the all-red interval is variable, depending upon the transfer sequence of the right-of-way signal display.

It is an additional object of this invention to provide a traffic control system wherein one or more overlapping movements are provided with a righ-of-way signal display sequence simultaneously with one or more of the main movements, and wherein means are provided for maintaining at least one of the energized overlapping signals in the proceed condition during the all-red clearance interval.

It is a further object of the invention to provide a traffic control system and apparatus wherein predictor circuits are provided for predicting in advance the transfer sequence of the right-of-way signal display as a result of actuation of detector means.

Another object of this invention is to provide a right-of-way signal display sequence for a plurality of pedestrian movements wherein the pedestrian right-of-way sequence includes a proceed interval, and an initial clearance interval, and a terminal clearance interval wherein the signal indication is the same as during the initial interval, but may be timed separately from, but concurrently with, other main timer intervals.

It is another object of this invention to provide a traffic control system including a pedestrian overlap unit which operates to control pedestrian signals that operate concurrently with the vehicle signals of any given overlap movement.

Another object of the invention is to provide a control system including an auxiliary pedestrian control unit which operates so as to control the pedestrian signals for a crosswalk. That is, this unit operates in conjunction with an overlap movement proceed signal display in a manner which causes a portion of the overlap movement to be terminated after a call has been received by the auxiliary pedestrian unit in the case where the overlap movement conflicts with the pedestrian movement controlled by the auxiliary pedestrian unit.

*General description*

Figure 1:
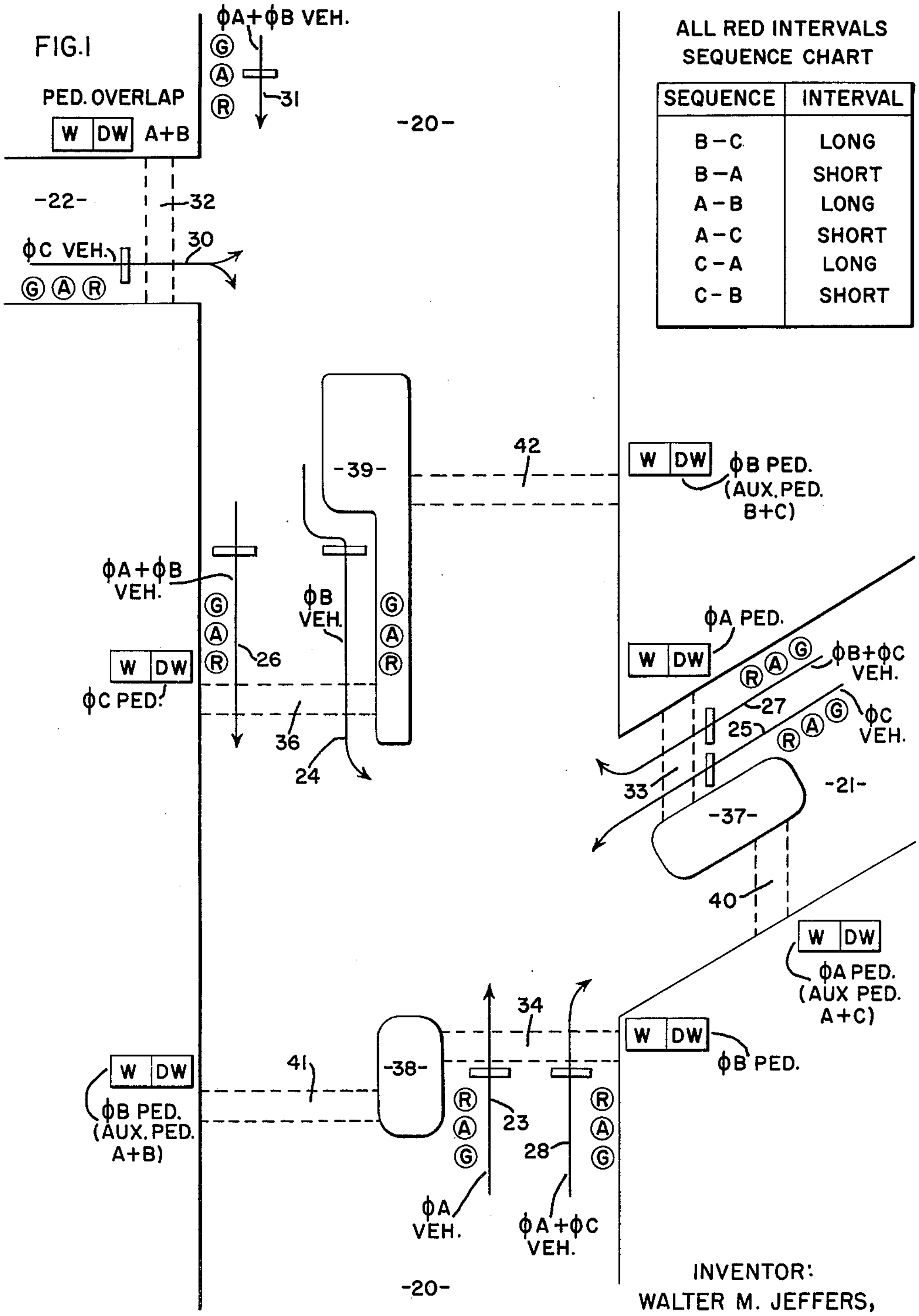
FIGURE 1 is a schematic illustration of an intersection wherein the various traffic movements indicated by the arrows are controlled by the traffic control system comprising the preferred embodiment of the invention. This intersection shows how all of the units of the controller may be utilized for a single intersection, but it is to be understood that on other and simpler intersections only portions of the controller may be utilized.

The controller comprising the preferred embodiment of the invention is made up of seven (7) units, as shown on the block diagram, FIGURE 12, to be described in the detailed description of the drawings, which follows hereinafter.

The main timer (TAC) is similar to the 3-phase full-actuated controller disclosed in my prior application, previously referred to, and is capable of operating with a synchronous interconnect unit (TSI) as an independent intersection controller. These two units may be interconnected with a plurality of other intersections, or secondary controllers in a manner which will permit the local or remote selection of the splits and offsets.

As is well known in the art, "split" is defined as being the division of the total time cycle of the controller expressed in percentages, during which the various intersecting streets, or lanes, are given the right-of-way signal display sequence. As for example, in a three-street intersection, street I may be receiving the right-of-way signal display sequence for 40% of the total time cycle, while streets 2 and 3 recive only 30% of the time cycle.

The term "offset" is known in the art as being the difference expressed in percentage of time of a given time cycle at which the right-of-way signal display sequence commences for the main street in an interconnected system. For example, where the interconnected system comprises two separate intersection controllers which are interconnected so that the right-of-way signal display for the main street commences on the second controller 15 seconds after the commencement of the right-of-way signal display at the first controller, the offset between the two controllers in a 100 second time cycle is expressed as 15%. The offset is used to permit a progressive movement of traffic along the main street of an interconnected system, as is well understood in the art.

As used hereinafter in the specification, the terms "movement" and "phase" will be used interchangeably to indicate a part of the total traffic control cycle allocated to any particular traffic movement receiving the right-of-way signal display sequence. The term "interval" will mean the time period during which the signal display to a given movement does not change, and the term "position" will be used to indicate the various positions of the cam unit which is part of the main timer, as is more fully set forth in my prior application, above referred to.

The main timer differs only from the full-actuated 3-phase controller, disclosed in my prior application, in that the maximum for the proceed interval is controlled by the synchronous interconnect unit of this invention, while in the invention disclosed in the previous application, the maximum time period for any proceed interval was controlled by an RC timer. This allows the controller to transfer automatically from a fixed, or pre-timed operation to a vehicle actuated operation in response to the vehicle, or pedestrian traffic. Further, this permits one or more of the phases controlled by the main timer to operate by fixed time basis where the traffic demand on that phase is above the maximum point, while the remaining phase, or phases, may operate on an actuated basis. At this point, it is to be understood that while the invention will be disclosed in its preferred form as utilizing a 3-phase controller, it is to be understood that the claims are not so limited and will include a 2-phase controller.

The synchronous interconnect unit includes one, two, or three dial units that are rotated continuously by synchronous motors. The dial units each include a number of keys which operate a plurality of contacts to effect the control of the main timer, and the synchronous interconnect unit includes provisions for a triple offset, triple split, and has circuits to transfer one of these splits between two dial keys on any one of the 3 dial units. This is referred to as a "split transfer" and may be used for example where the right-of-way sequence is movement I (phase A) movement 3 (phase C), skip movement 2 (phase B), and move to movement I. The space allotted on the dial unit for both phase B and phase C would now be used by phase C resulting in an inordinately long movement 3 right-of-way interval. The split transfer would now operate in this example to divide the split so as to provide longer than normal intervals for both movements I and 3, rather than movement 3 only.

The first auxiliary movement which may be added to the main timer and the synchronous interconnect unit is an all-red clearance timer (TRC) and is operable to insert an all-red interval following each amber movement in the controller cycle in order to insure all traffic movements a sufficient amount of time to clear the intersection during a transfer from one right-of-way signal display sequence to another. The all-red clearance timer is provided with means for selecting one of two different all-red intervals depending upon the right-of-way transfer sequence. This feature is extremely important in intersections where the physical or geometric layout of the intersection is such that movement I, for example, needs a much longer timer to clear the intersection movement, than movement 3. Accordingly, where the transfer sequence is from movement 2 to movement 3, a short all-red interval is utilized whereas when the sequence is from movement 1 to either of movements 2 or 3, the longer movement is utilized.

A further auxiliary unit of the controller is termed a vehicle overlap unit (TPO). This unit operates to provide for a 4th movement simultaneously with movements 1 and 2, a 5th movement simultaneously with movements 2 and 3, and a 6th movement simultaneously with movements 3 and 1. For ease of reference, the two movements with which the overlap unit is associated are referred to as the leading and lagging movements, the leading movement being the first movement appearing in the cycle and the lagging movement being the second movement appearing in the cycle of the timer. For example, in the case of movement 4, which is an overlap movement associated with movements 1 and 2, movement 1 may be termed the leading associated movement, while movement 2 is the lagging associated movement. Referring briefly to FIGURE 1, an example is shown of an intersection where the overlap unit would be incorporated into the controller to provide for these 3 additional movements. As will be obvious, the movement 1, phase A, and movement 2, phase B, while they conflict with each other, do not conflict with movement 4, phase A plus B, and accordingly movement 4 will receive the right-of-way signal display sequence simultaneously with either of movements 1 or 2. In like manner, movement 5, phase B plus C will receive the right-of-way signal display sequence simultaneously with either of movements 3 or 1. An important feature of the overlap unit is one that operates to maintain one of the overlap movements 4, 5 or 6 with its proceed signal continuously energized during the transfer of the right-of-way signal display between the movements 1, 2 and 3. For example, where the transfer is to be from movement 1 to movement 2, the signal display sequence to movement 6 must receive the amber, or clearance signal simultaneously with the presence of the clearance signal to movement 1 in order to prevent a conflicting movement between movement 2 and movement 6. Movement 4, however, should continue to receive the proceed indication since it will conflict with neither of movements 1 or 2. Accordingly, upon completion of the clearance interval for movements 1 and 6, movements 1, 2 and 6 will receive an all-red signal indication, while movement 4 will continue to receive the proceed signal indication.

The overlap unit also includes predictor circuits which operate to transmit an impulse which indicates which phase will appear next in the sequence as the main timer cycles to any amber.These predictor circuits are utilized to select one of the two intervals of the all-red timers and also to position the cam unit in the triple pedestrian timer.

The triple pedestrain timer (TPT), just referred to, is an additional auxiliary unit of the controller, and operates to control the associated pedestrian movements with each main timer phase of the controller. The triple pedestrian timer functions to provide each pedestrian movement with three intervals comprising the pedestrian right-of-way sequence. The first interval may be referred to as a proceed interval during which a steady "walk" signal may be displayed to the pedestrian movement. The second interval may be termed an initial clearance interval during which a "don't walk" sign is intermittently flashed to the pedestrian movement. The third interval may be termed a terminal clearance interval which maintains the same signal indication, i.e., flashing "don't walk," but concurrently with various other main timer intervals, as will be hereinafter explained.

In operation, the triple pedestrian timer operates to call the main timer to the phase that a particular pedestrian call is associated with upon actuation of that pedestrian movement, and energizes a pedestrian proceed signal concurrently with the green light of the vehicle movement of the associated main timer phase. However, if a pedestrian actuation has been received previously to the cycling of the main timer to its associated phase, the pedestrian timer forces the main timer to rest in the initial interval of the main timer cycle displaying the proceed signal to the vehicle movement and to the pedestrian movement until called to another phase by either a pedestrian or vehicle actuation. Upon the receipt of such a call, the pedestrian timer moves to the pedestrian clearance initial interval while 1 holding the main timer in the initial portion of the green interval. After a predetermined time set on the pedestrian clearance interval has expired, the pedestrian timer will allow the main timer to move to the extension portion of the proceed interval for the vehicle movement. During the proceed extension portion of the interval, the pedestrian timer commences the timing of the terminal pedestrian clearance interval. If the main timer moves through its extension interval without a further vehicle actuation that would extend the interval, the all-red and terminal pedestrian clearance intervals would terminate simultaneously. However, if the extension interval of the main timer is extended by additional vehicle actuations, the terminal "don't walk" interval of the pedestrian timer would end as much earlier than the end of the all-red interval as the amount of time by which the extension interval was extended. For example, if the extension amber and all-red intervals total 12 seconds, the pedestrian terminal clearance interval would be set at 12 seconds. Accordingly, if the extension interval were extended by 5 seconds, due to additional vehicle actuations, the total length of the three intervals would equal 17 seconds, but the terminal pedestrian clearance interval would still end after 12 seconds, which would be 5 seconds earlier than the end of the all-red interval. In other words, the total pedestrian clearance interval is fixed at a maximum.

The triple pedestrian timer is provided with a cam unit similar to the cam unit in the main timer, and the 2 cam units are synchronized by the predictor circuits in the vehicle overlap unit for a purpose to be hereinafter described in detail.

Figure 11:
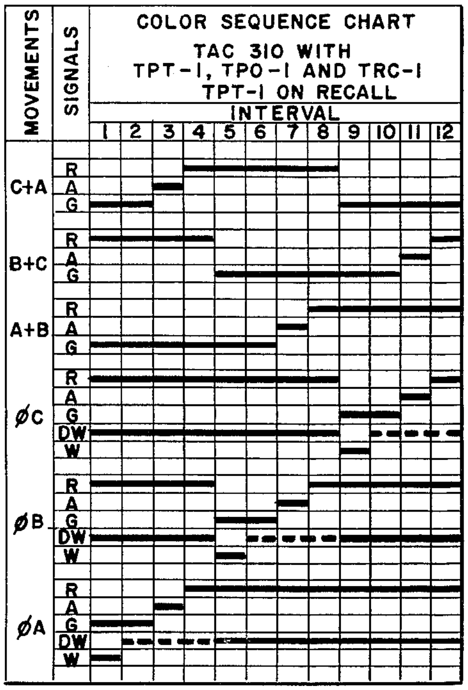
FIGURE 11 is a sequence chart showing a combined signal sequence for the main timer, the triple vehicle overlap unit, the all-red clearance timer, and the triple pedestrian timer wherein the triple pedestrian timer is on recall.

The right-of-way signal displays sequence for the TPT unit in combination with the TAC and TRC units where the TPT unit is on recall in is shown in FIGURE 11.

Figure 2:
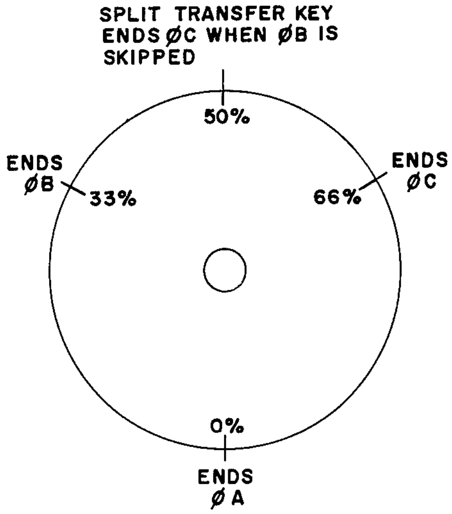
FIGURE 2 is a schematic diagram illustrating the split transfer mechanism of the synchronous interconnect unit.

The next auxiliary unit is termed a pedestrian overlap unit (TPL) and operates to control separate pedestrian signals for pedestrian movements receiving the right-of-way concurrently with the vehicle signals for any one of the overlap vehicle movements. The pedestrian overlap unit may be connected so as to operate with the signals of any one of the three overlap movements, and for purposes of explanation and description here, as well as in the detailed description, it will be assumed that the unit is connected for operation with the phase A plus B overlap movement, which is referred to in FIGURE 2 as being movement 4. Referring now to FIGURE 2, wherein an intersection is shown as having a phase A plus B overlap movement, the pedestrian overlap movement is shown as moving in the same general direction as the overlap movement. Accordingly, the pedestrian overlap movement proceed signal must come on simultaneously with the A plus B overlap movement signal, and, therefore, if a call is registered on the pedestrian overlap movement the controller must transfer the right-of-way to phase C (unless the controller is on phase C) and must then return to phases A or B simultaneously with the phase A plus B overlap movement.

After a call has been received by the detector means associated with the pedestrian overlap movement, the main timer will cycle to phase C. After the phase C initial portion of the proceed interval is timed and reaches the extension portion of the interval, and there is no call received on either of movements, I or 2, a call will be automatically placed on movement I, and if a call has been received on movement 2, no call will be automatically placed on movement I. A movement I call, however, can be registered from either the vehicle or pedestrian traffic at the intersection. After a call is registered on movement I or movement 2 vehicle only, an automatic call for a pedestrian movement will be registered, and as the controller moves back to vehicle movement I, or vehicle movement 2 from vehicle movement 3, as the case may be, the vehicle and pedestrian overlap movement signals will be energized simultaneously to display the proceed to these movements, see the sequence charts of FIGURES 5 to 10, inclusive.

Figure 6:
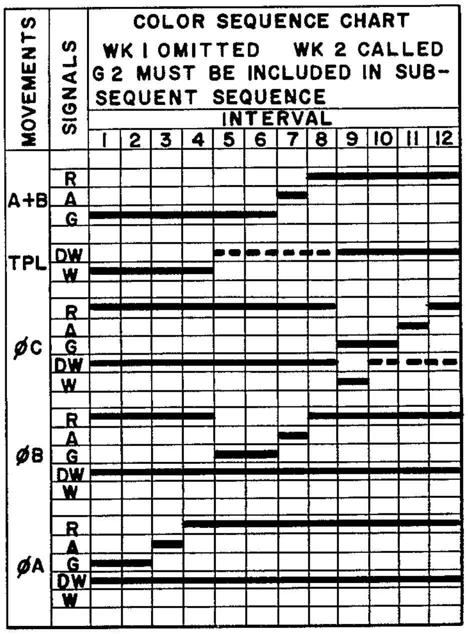
Figure 7:
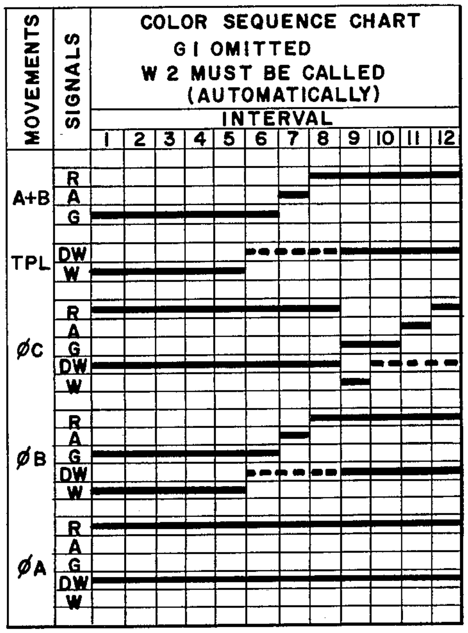
Figure 8:
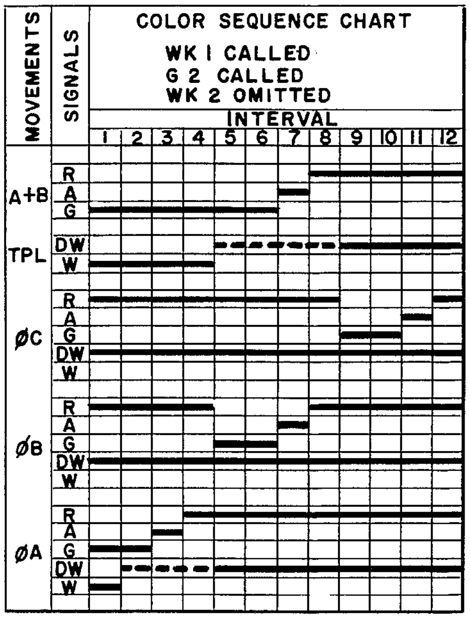
Figure 9:
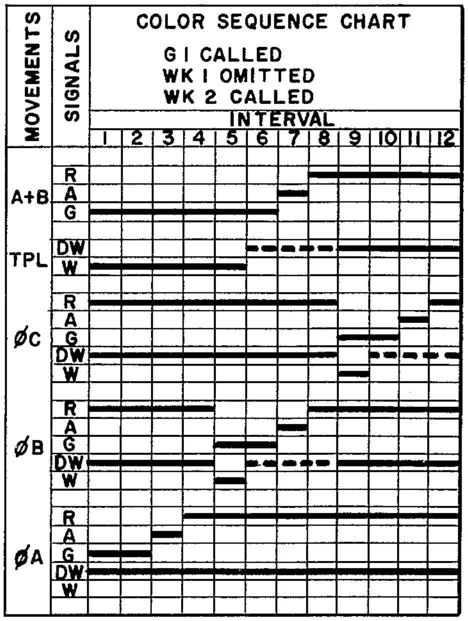
Figure 10:
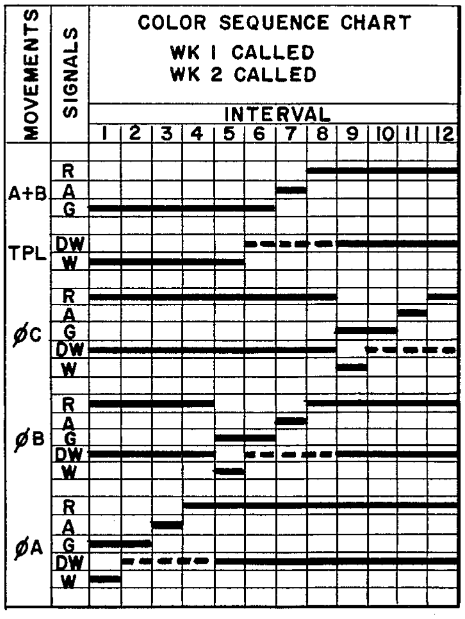

The pedestrian overlap movement proceed indication will end, and the clearance indication start with the regular pedestrian movement 2 clearance indication if both vehicle movement I and vehicle movement 2 are called, or if only vehicle movement 2 is called (see FIGURES 7, 10 and 9). The pedestrian overlap movement clearance signal is a flashing "don't walk" indication, the same as the regular TPT clearance indication. The pedestrian overlap clearance interval will start with the pedestrian movement I clearance interval if only pedestrian movement I is called and pedestrian movement 2 is skipped (see FIGURE 5). The pedestrian overlap movement clearance will start at the beginning of vehicle movement 2 proceed if pedestrian movement I and vehicle movement 2 are called, but pedestrian movement 2 is omitted (see sequence charts of FIGURES 8 and 6).

The clearance interval (flashing "don't walk") for the pedestrian overlap movement will end and the steady "don't walk" signal indication will start at the beginning of the vehicle movement 3 proceed if both vehicle movement I and pedestrian movement 2, or vehicle movement I and pedestrian movement 2, or vehicle movement I only, was called (see sequence charts FIGURES 7, 10, 9 and 5). If vehicle movement I only was called, it will be recalled that an automatic call from pedestrian movement 2 will be registered. In this case, the clearance interval for the pedestrian overlap movement will end, and the steady "dont walk" indication will start at the end of the time set on the pedestrian overlap unit clearance timer if the pedestrian movement I and vehicle movement 2 only are called (see sequence charts of FIGURES 8 and 6). The reason for this is that there will be no pedestrian movement clearance interval for the pedestrian overlap timer to follow so it must utilize a timing of its own timer. The setting of the pedestrian overlap clearance timer will always be one second longer than the longest of the pedestrian movement I, or pedestrian movement 2 clearance interval set on the triple pedestrian timer.

The last auxiliary unit utilized in the control system and apparatus is an auxiliary pedestrian unit, termed a TPA unit, and the purpose of this unit is to cut off one-half of the vehicle overlap proceed indication when a pedestrian actuation of the TPA unit causes a "walk" indication to be displayed. This operation may be best understood by referring to FIGURE 1. In that figure, the auxiliary pedestrian movement A plus C moves parallel to the vehicle movement A. However, the overlap movement A plus C allows the vehicle traffic on the overlap movement to turn intersecting with the pedestrian movement A plus C. The auxiliary pedestrian movement when actuated in this case would cut off a portion of the movement A plus movement C overlap movement proceed indication during vehicle movement A. This would result in the pedestrian crosswalk for the auxiliary pedestrian movement A plus C being a protected cross walk. It will be understood that the auxiliary pedestrian unit may be connected so as to cut off either portion of any of the three overlap movements, and, further, the connection of this unit is symmetrical to any phase of 3-phase controllers resulting in nine possible connection combinations.

*Detailed description of operation*

FIGURE 1 illustrates an intersection having a plurality of movements, all of which may be controlled by the controller comprising the preferred embodiment of the invention. It is to be understood, however, that the controller may be used on intersections which are less complicated and having fewer movements than that shown in FIGURE 1. In FIGURE 1, the main street 20 has a pair of side streets 21, and 22 intersecting therewith. Three main movements controlled by the main timer are indicated by the arrows 23, 24 and 25. The phase A movement, which will also be hereinafter referred to as main movement I, is a straight-through movement, while the phase B and phase C movements (also hereinafter referred to as movements 2 and 3 respectively), as shown by arrows 24 and 25 are turning movements. Each of these movements is controlled by the right-of-way display on the signals associated with the movements, which signals are indicated by the circled letters (R) for the red, or stop indication, (A) or (Y) for the amber or clearance indication, and (G) for the green, or proceed indication.

The intersection is also provided with three overlap movements, as are indicated by the arrows 26, 27 and 28. Arrow 26 indicates an overlap movement, phase A plus phase B, shown as being provided with traffic signals; arrow 27 indicates an overlap movement, phase B plus phase C, shown as being provided with a group of traffic signals, and arrow 28 indicates the third overlap movement, phase A plus phase C, also shown with its associated traffic signals. Arrow 30 indicates the movement of traffic from the street 22 into the street 20. This is also a phase C movement so that its signals are wired in parallel with the movement 25. Arrow 31 in like manner is a phase A plus phase B movement, and its associated signals are wired in parallel with the signals for the movement indicated by the arrow 26.

The street 22 is provided with a pedestrian movement indicated by the double dashed lines 32 and this movement is termed a pedestrian overlap movement, and is controlled by the pedestrian signals indicated in the box by the letters W and DW, these letters indicating a "walk" and "don't walk" signal. This pedestrian overlap movement is provided with detector means (see FIGURE 12) and comes on with, and moves parallel with the vehicle movement phase A plus phase B, and is controlled by the pedestrian overlap unit, TPL.

The pedestrian movements indicated by the double-dashed lines 33, 34 and 36, are the phase A, B, and C pedestrian movements controlled by the triple pedestrian timer, TPT. It will be noted that these movements move only half way across the streets 21 and 20, respectively, to the traffic islands 37, 38 and 39. In like manner to the pedestrian movement 32, the movements 33, 34 and 36 are controlled by pedestrian signals as shown in FIGURE 1. The remaining pedestrian movements indicated by the double-dashed lines 40, 41 and 42 are respectively, phase A phase B and phase B pedestrian movements, but are controlled by the auxiliary pedestrian control unit, APT, the movement 40 being associated with the phase A plus phase C movement, movement 41 being associated with the phase A plus phase B movement, and movement 42 being associated with the phase B plus phase C movement. In like manner, the movements 40, 41 and 42 have pedestrian signals associated therewith, as shown in FIGURE 1.

Located to the upper right of FIGURE 1 is a sequence chart which indicates the length of the all-red clearance interval inserted by the all-red clearance unit, TRC, when the right-of-way signal display transfer sequence is that shown in the left hand column of the chart. For example, when the right-of-way signal display transfer sequence is from movement B to movement C, the all-red clearance is a long interval, whereas when the sequence is from movement B to movement A, the all-red clearance interval is a short interval, the reason for this being that it will take more time for the traffic to clear the intersection in the B–C transfer sequence than it would in the B–A sequence.

Referring now briefly to FIGURE 2, the synchronous interconnect unit, TSI, has a provision for a split transfer, as set forth above in the general description. An example of operation of this transfer may be seen by referring to FIGURE 2. In that figure, where the sequence of right-of-way is phase A, skip phase B, phase C and move to phase A, the split transfer would be operated to transfer the phase A split to divide the phase B right-of-way portion of the cycle between phases A and C.

In FIGURE 2, this division will be effected, as will be hereinafter described in detail, by the key 45 so that half of the cycle will be utilized for the phase A right-of-way display and the remaining half for the phase C right-of-way display.

Figure 3:
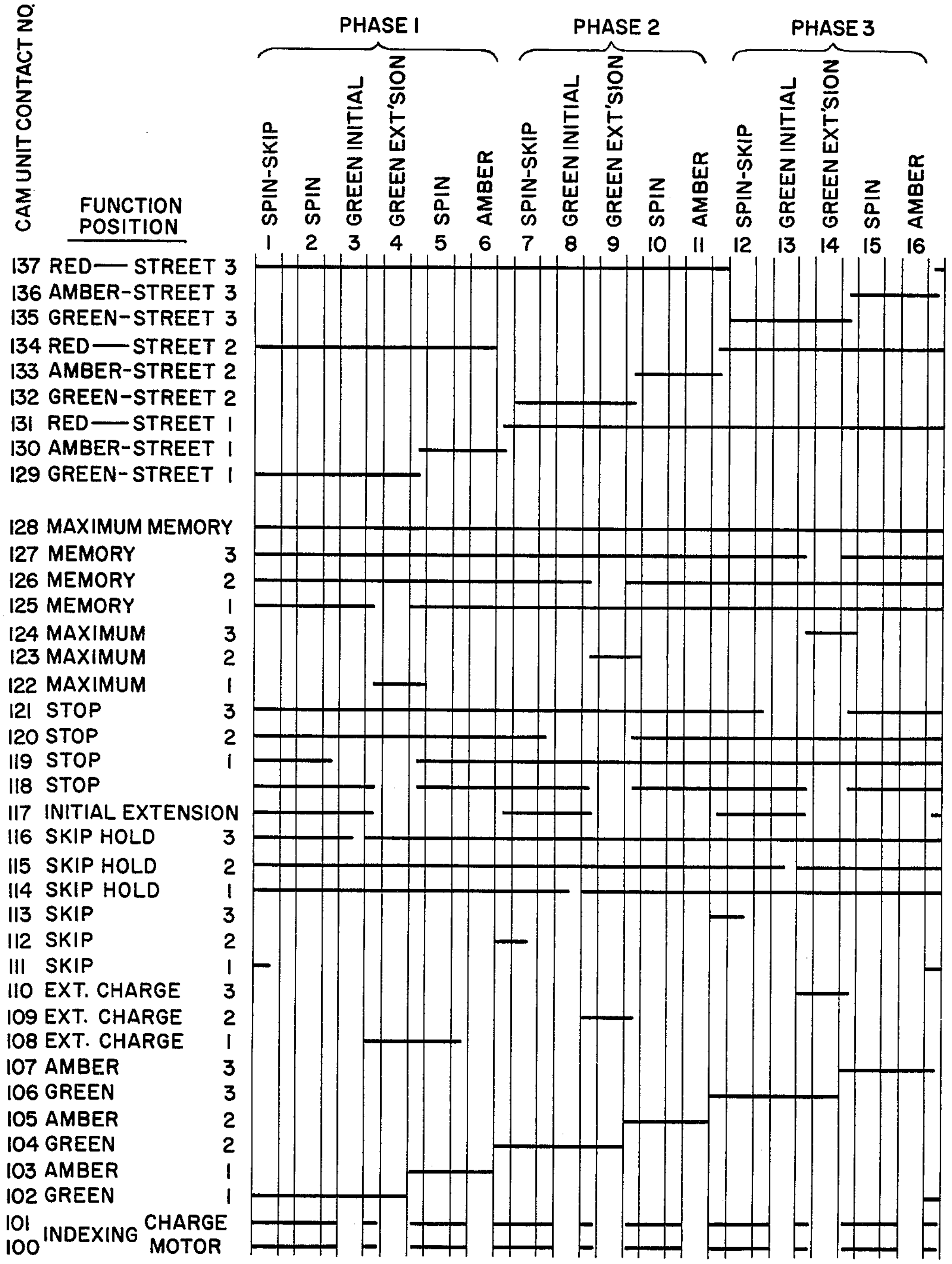
FIGURE 3 is a cam chart for the main timer.

FIGURE 3 is a cam chart for the main timer, TAC, similar to the cam chart shown in my above identified application, and shows those cam unit contacts which are closed during each of the 16 cam unit positions. It should be noted that position I is an unused position, but since the cam unit is manufactured with 16 positions, this position has been shown on the main chart, but the index contacts are closed so as to spin the cam unit through this position.

Figure 4:
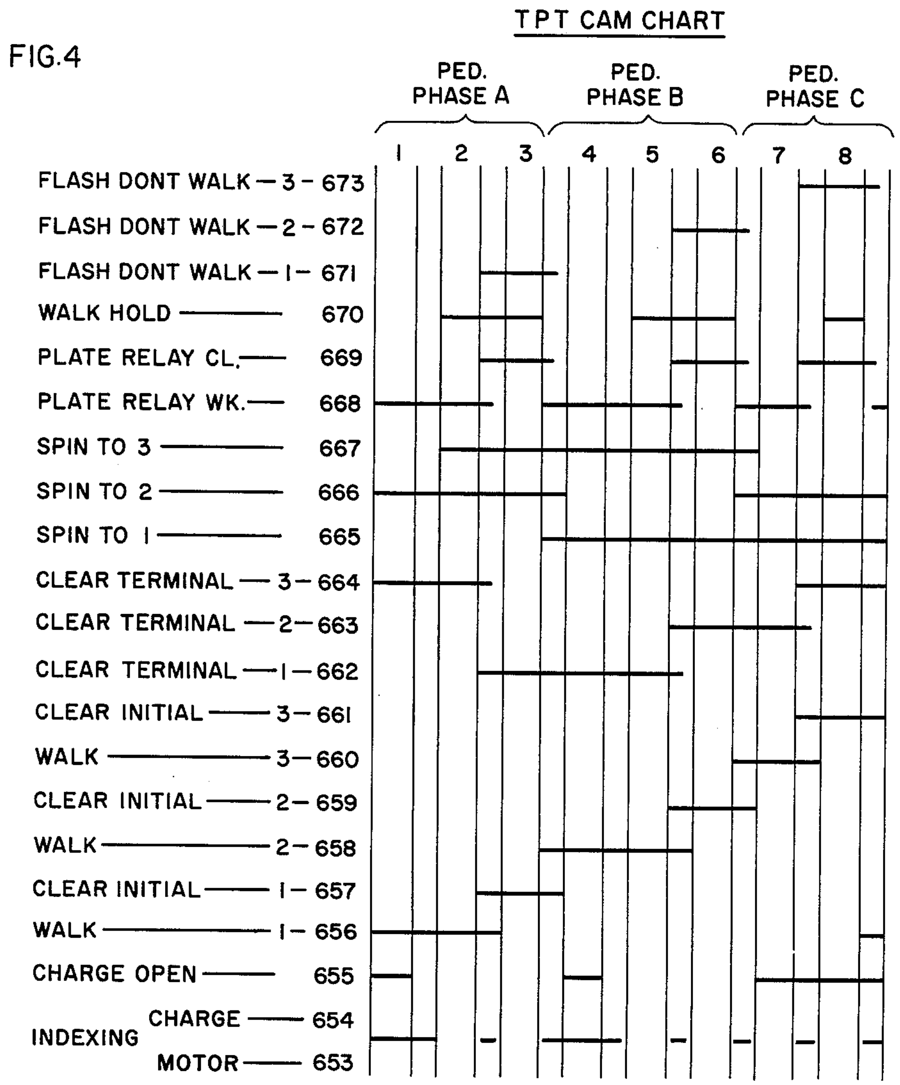
FIGURE 4 is a cam chart for the triple pedestrian timer.

FIGURE 4 is a cam chart for the triple pedestrian timer and this cam chart is similar to that shown in FIGURE 3. Again, the cam unit and triple pedestrian timer is a 16 position cam unit, and the last 8 positions are merely repeats of position I through 8, and, accordingly, only the first 8 positions are shown in FIGURE 4.

Figures 12, 13:
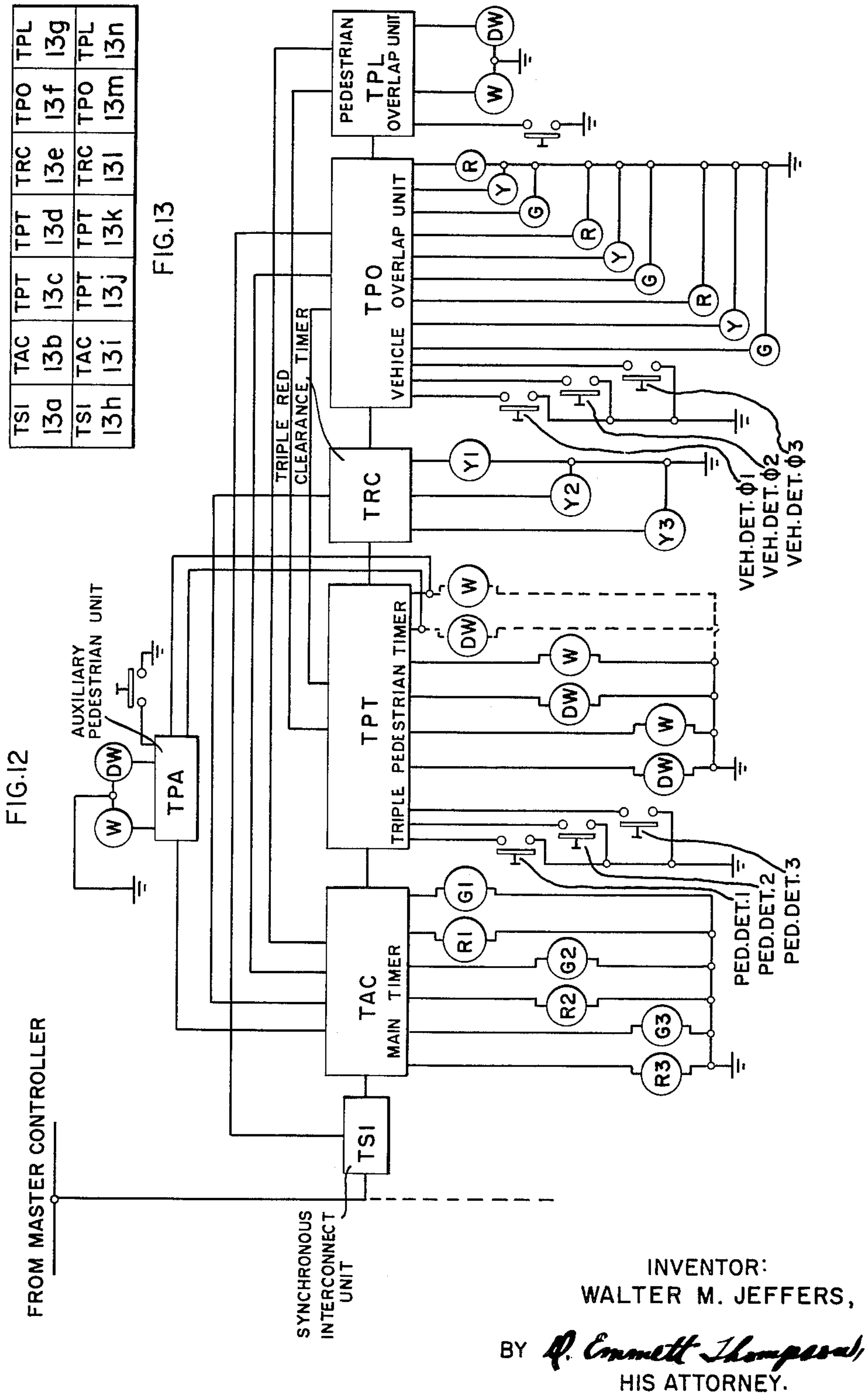
FIGURE 12 is a block diagram showing the cable connections between the components of the controller.

Referring now to FIGURE 12, which is a block diagram of the control system and apparatus, the TAC unit is shown connected to the red and green signals for movements 1, 2 and 3 (phases A, B and C) and this unit is interconnected with all of the other units comprising the complete controller. The TPT unit is shown connected to the "walk" and "don't walk" pedestrian signals, and the associated detector for the 3 pedestrian movements associated with the main movements 1, 2 and 3. The TPT unit is connected to each of the other units of the controller.

The TRC unit is shown as being connected to the yellow, or clearance signals for the main movements 1, 2 and 3, and the TRC unit is connected to the TAC unit, the TPT and TPO units.

The TPO unit is shown connected to three sets of traffic signals for the overlap movements 4, 5 and 6, and the detectors associated with the main movements. The TPO unit is interconnected with the other units as shown.

The TPL unit is shown connected to a "walk" and "don't walk" pedestrian signal, and an associated detector for the pedestrian overlap movement, and the TPL unit is interconnected with the remaining units as shown.

The TPA unit is shown connected to only one set of "walk" and "don't walk" signals, and an associated detector for the auxiliary pedestrian movement, and is also shown as being interconnected with one set of the TPT pedestrian signals. This is shown in this manner to indicate that with the TPA unit in the system, one set of main pedestrian movement signals will be operated by the TPA unit.

Figure 13A:
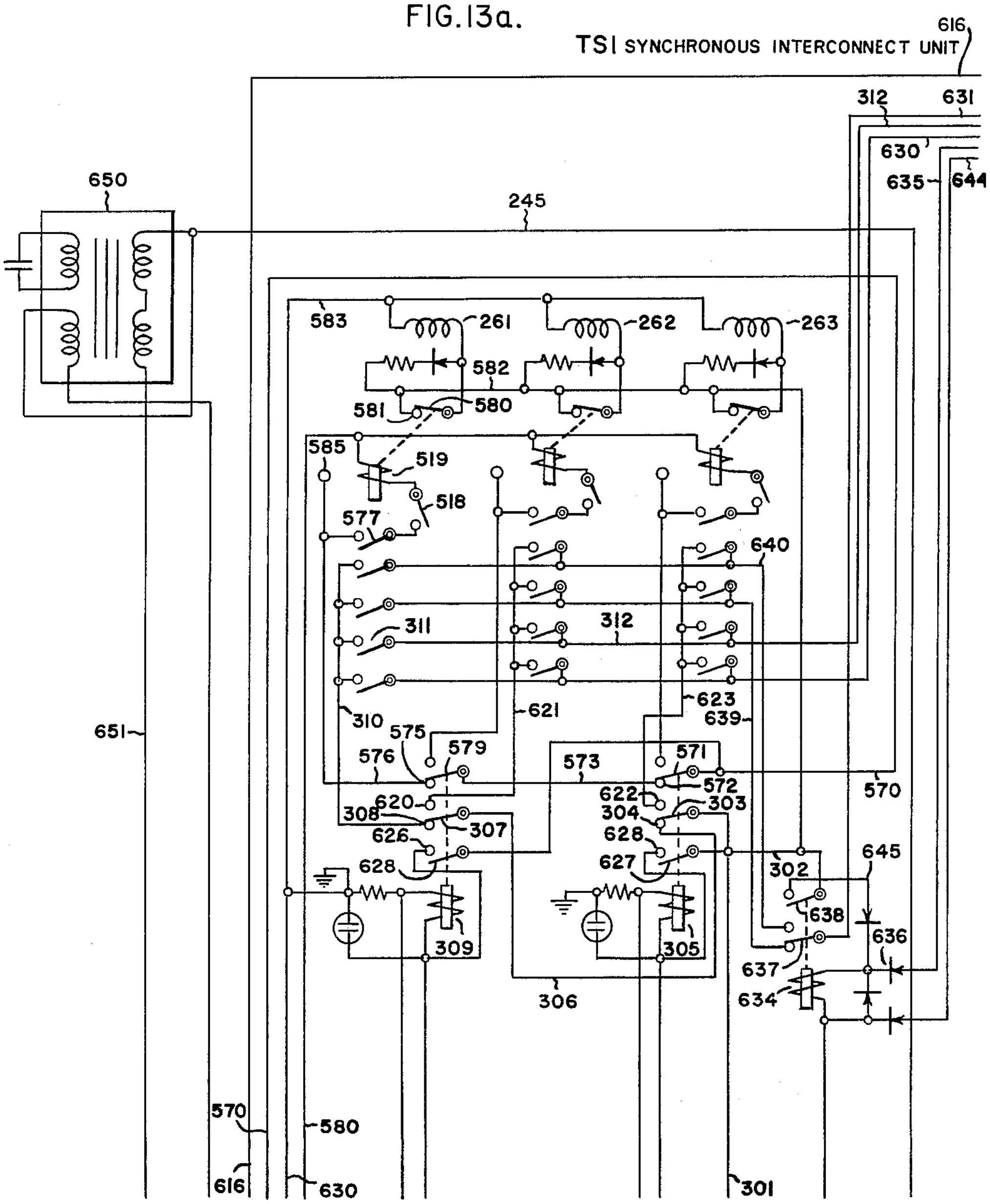
FIGURES 13*a* to 13*m* show portions of the circuit diagram of the complete controller comprising the preferred embodiment of the invention, and then these figures are placed together in the manner indicated in the key FIGURE 13, the complete circuit for the control system and apparatus is shown.
Figure 13B:
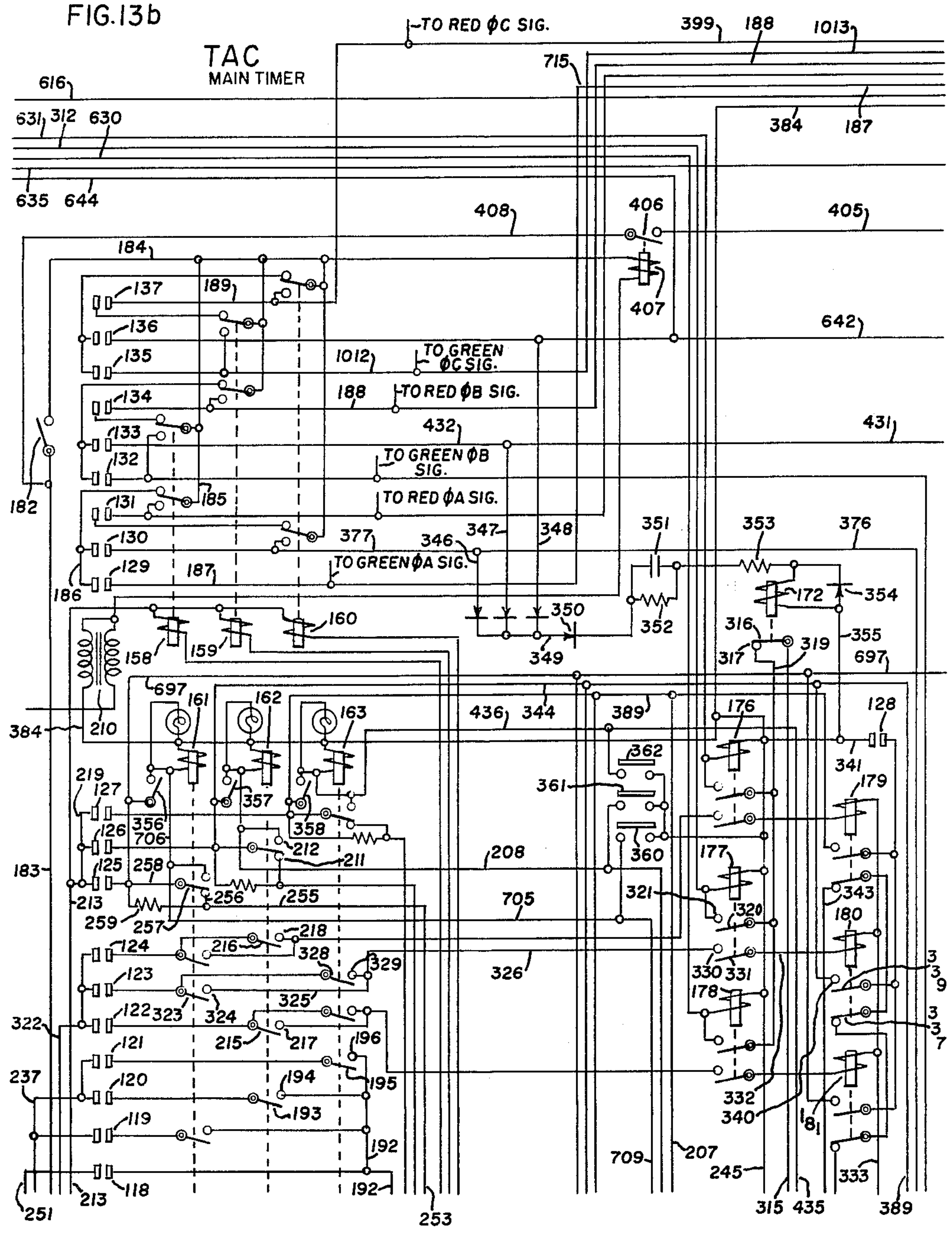
Figure 13C:
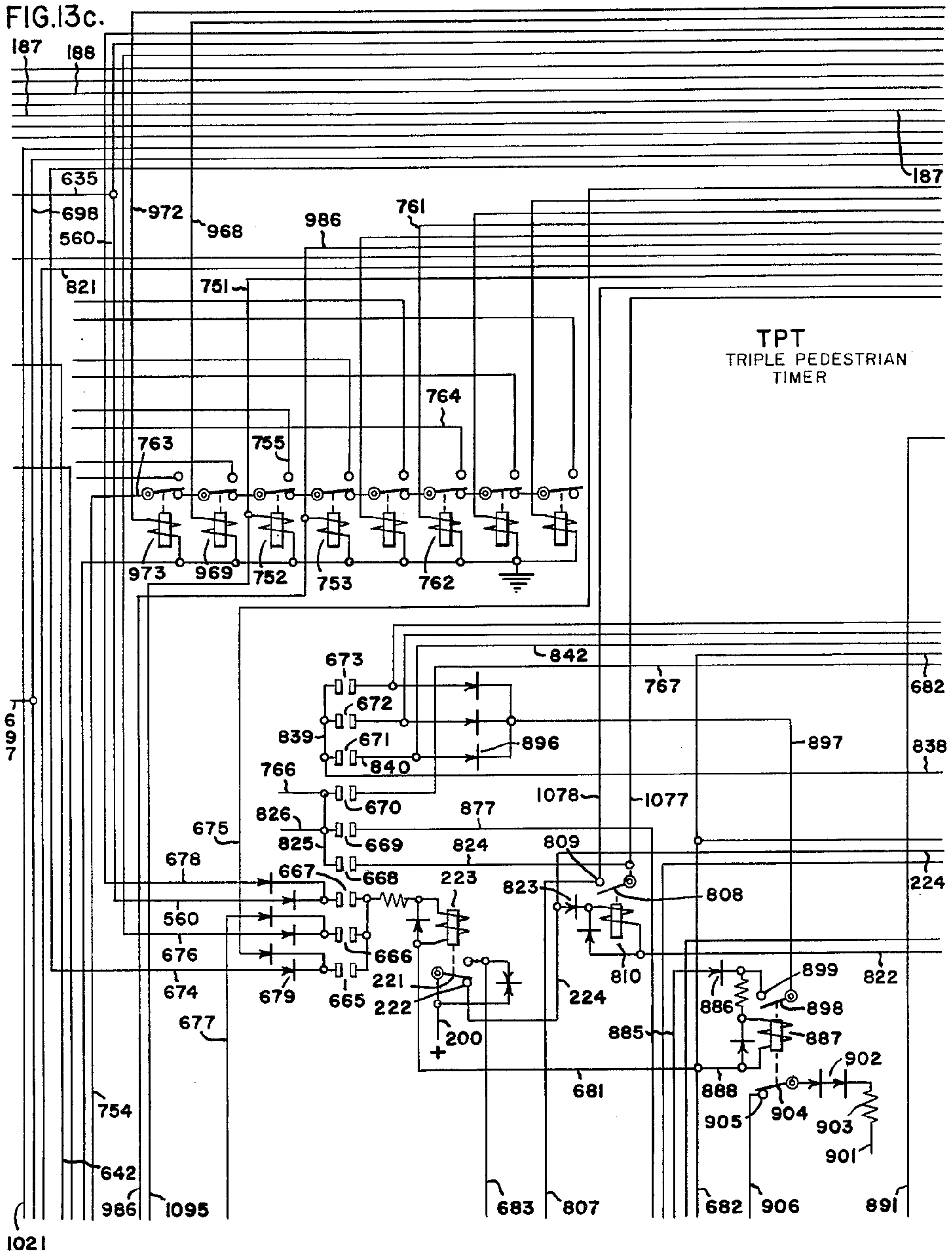
Figure 13D:
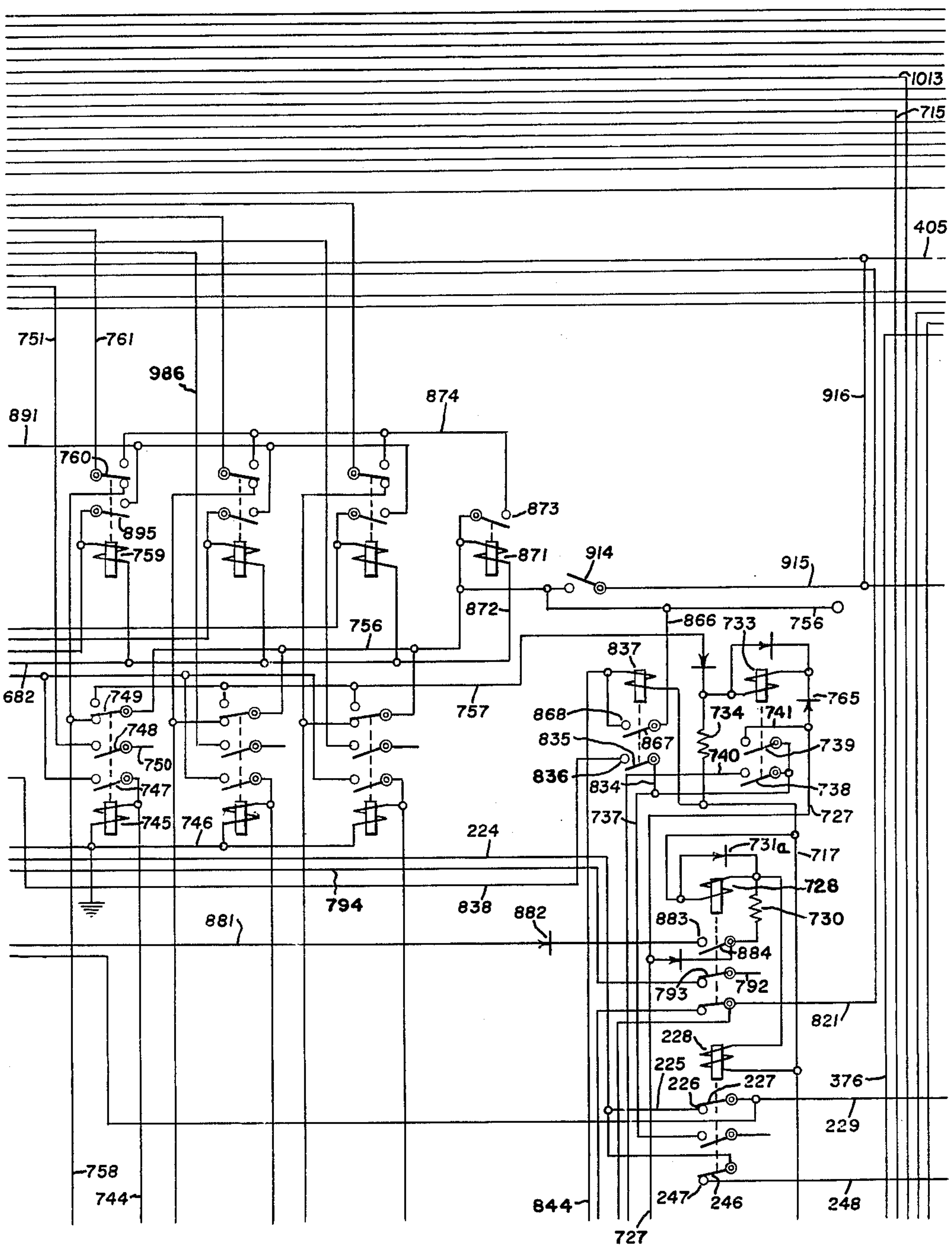
Figure 13E:
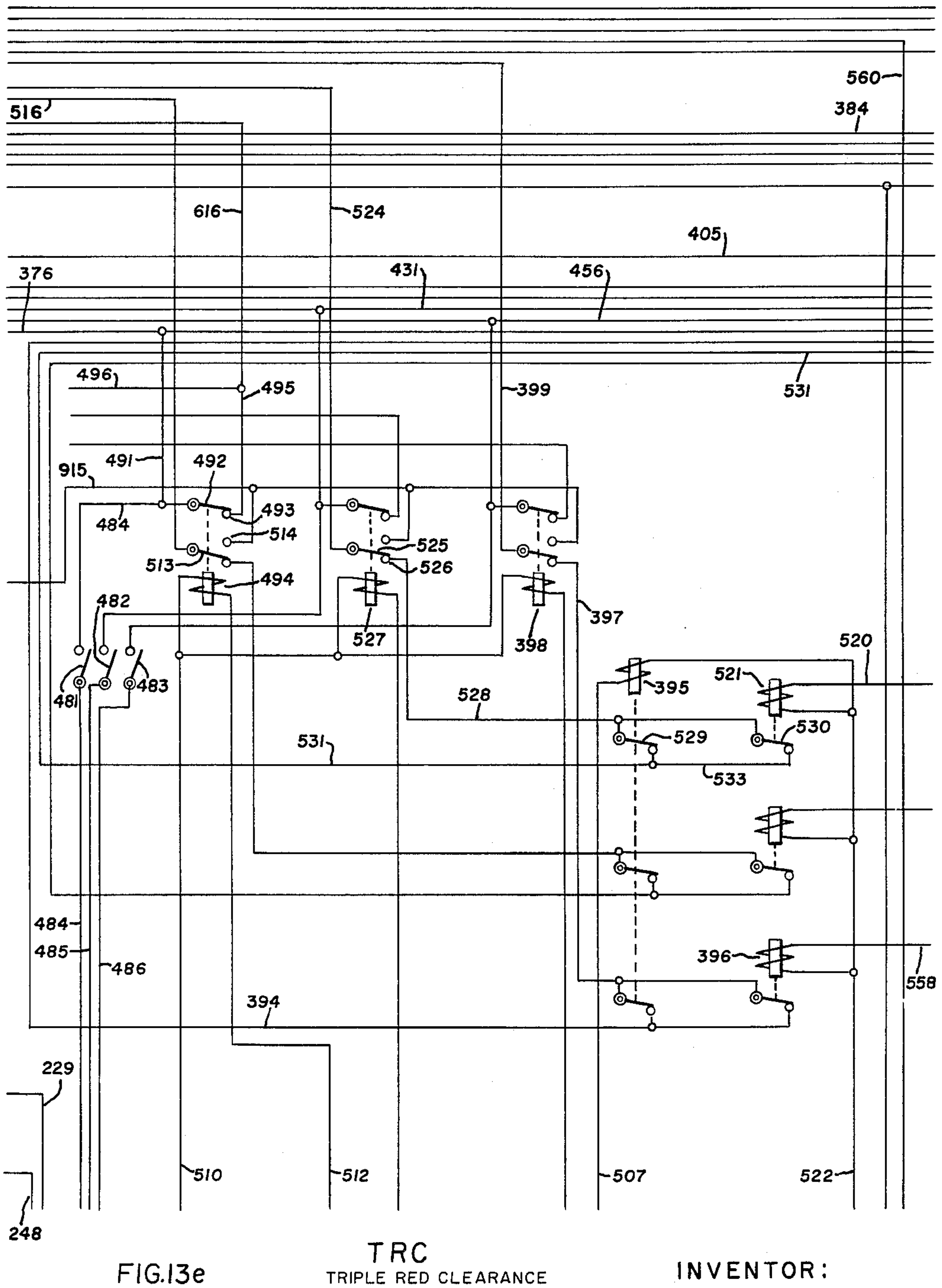
Figure 13F:
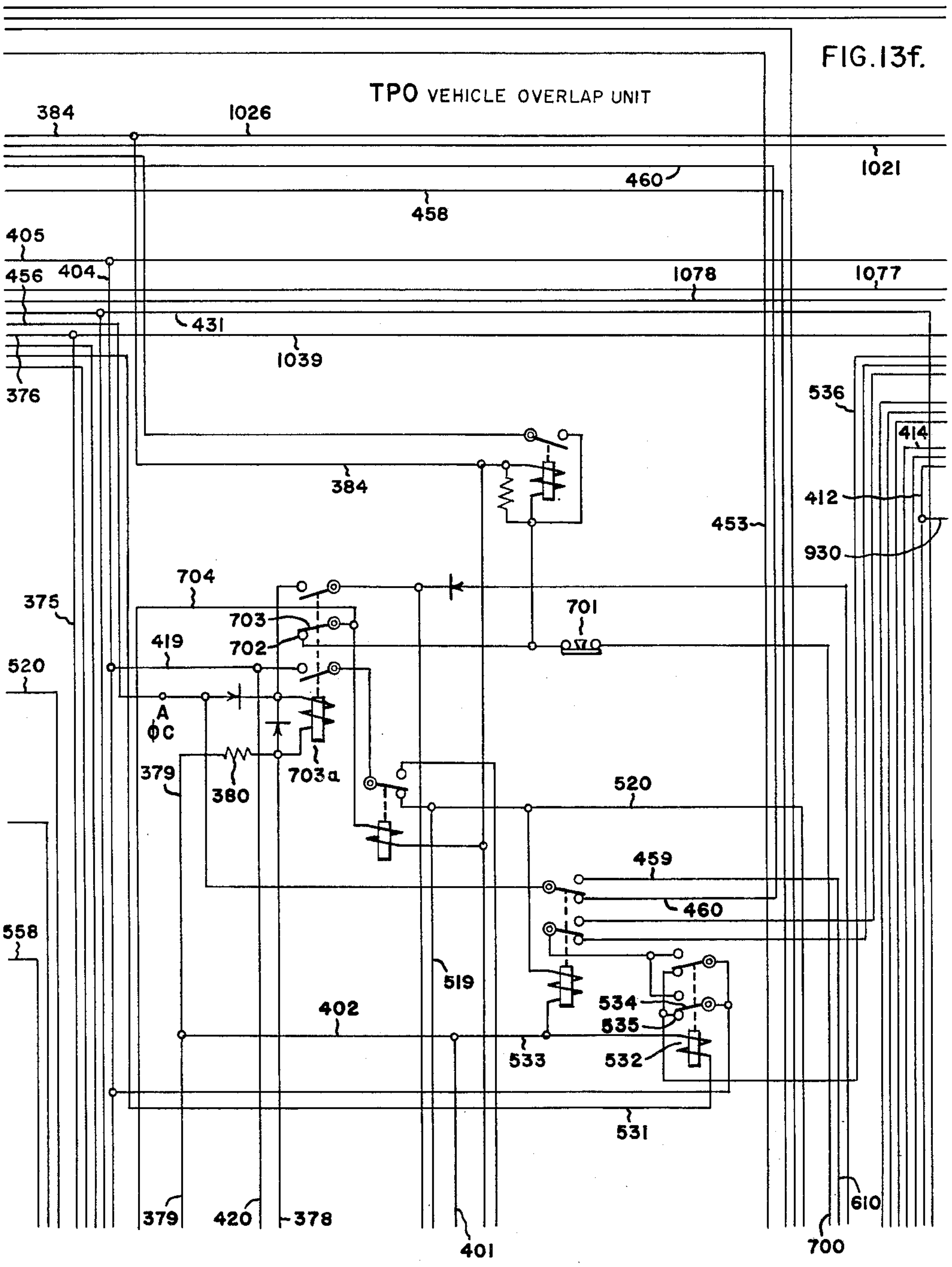
Figure 13G:
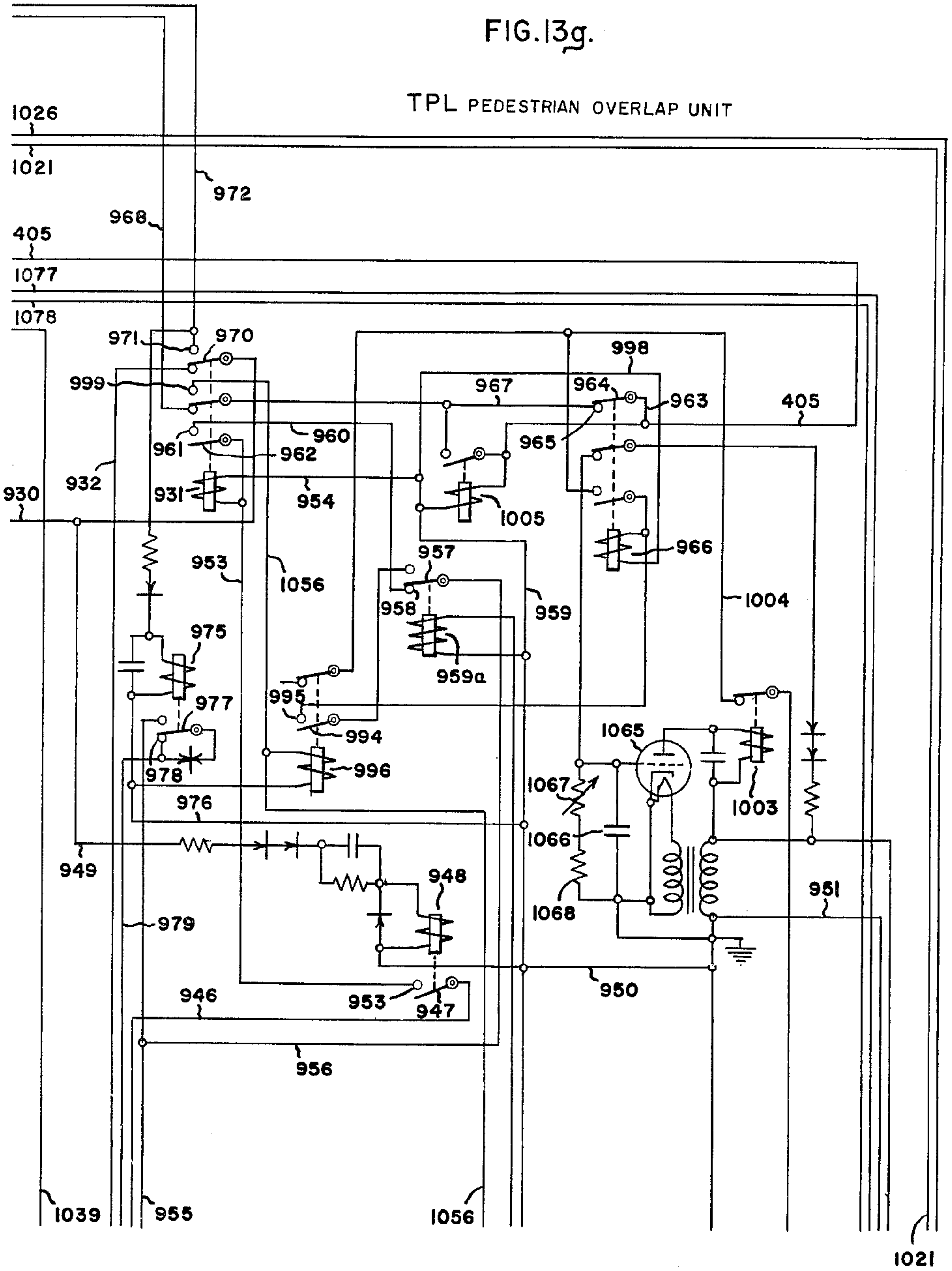
Figure 13H:
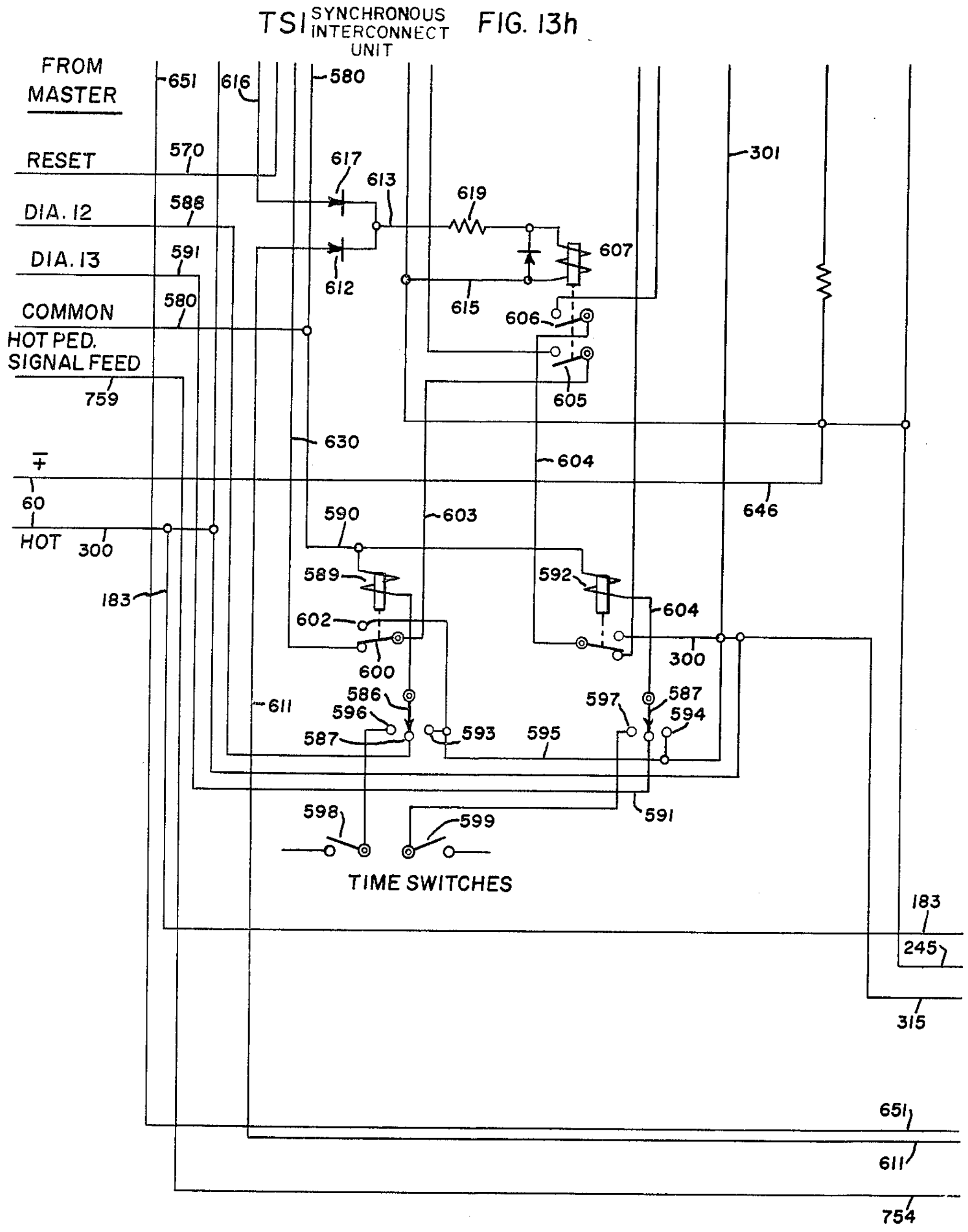
Figure 13I:
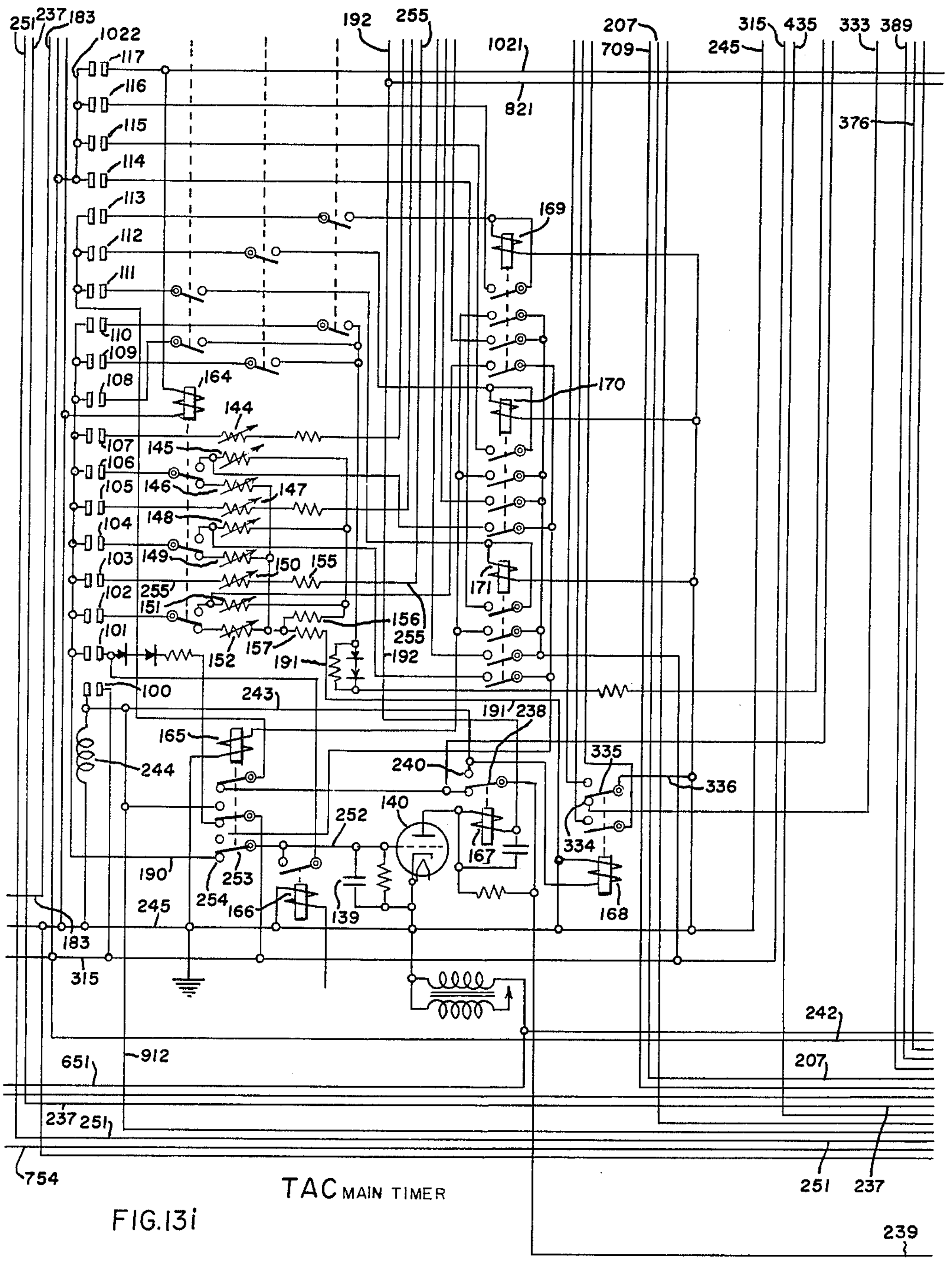
Figure 13J:
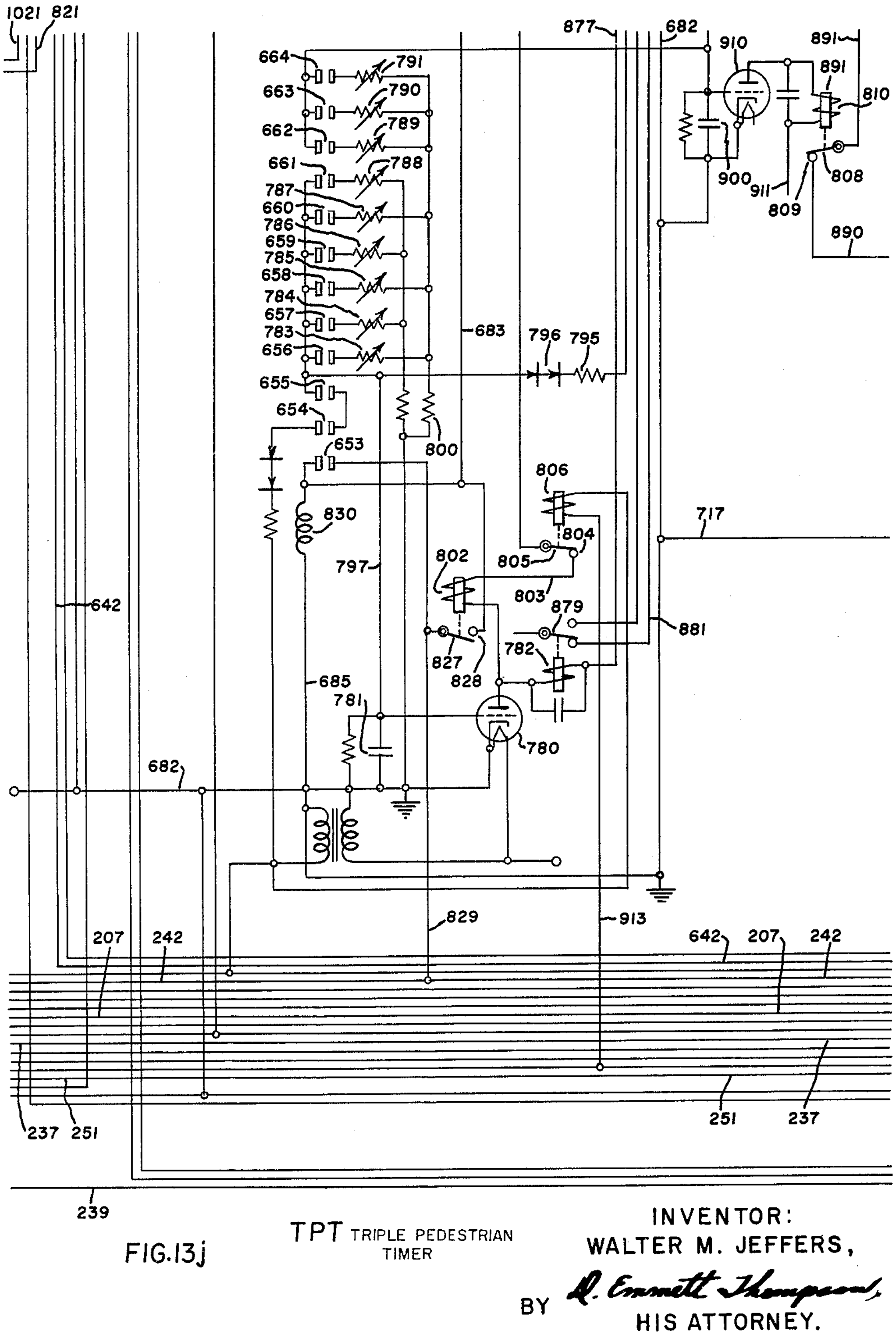
Figure 13F:
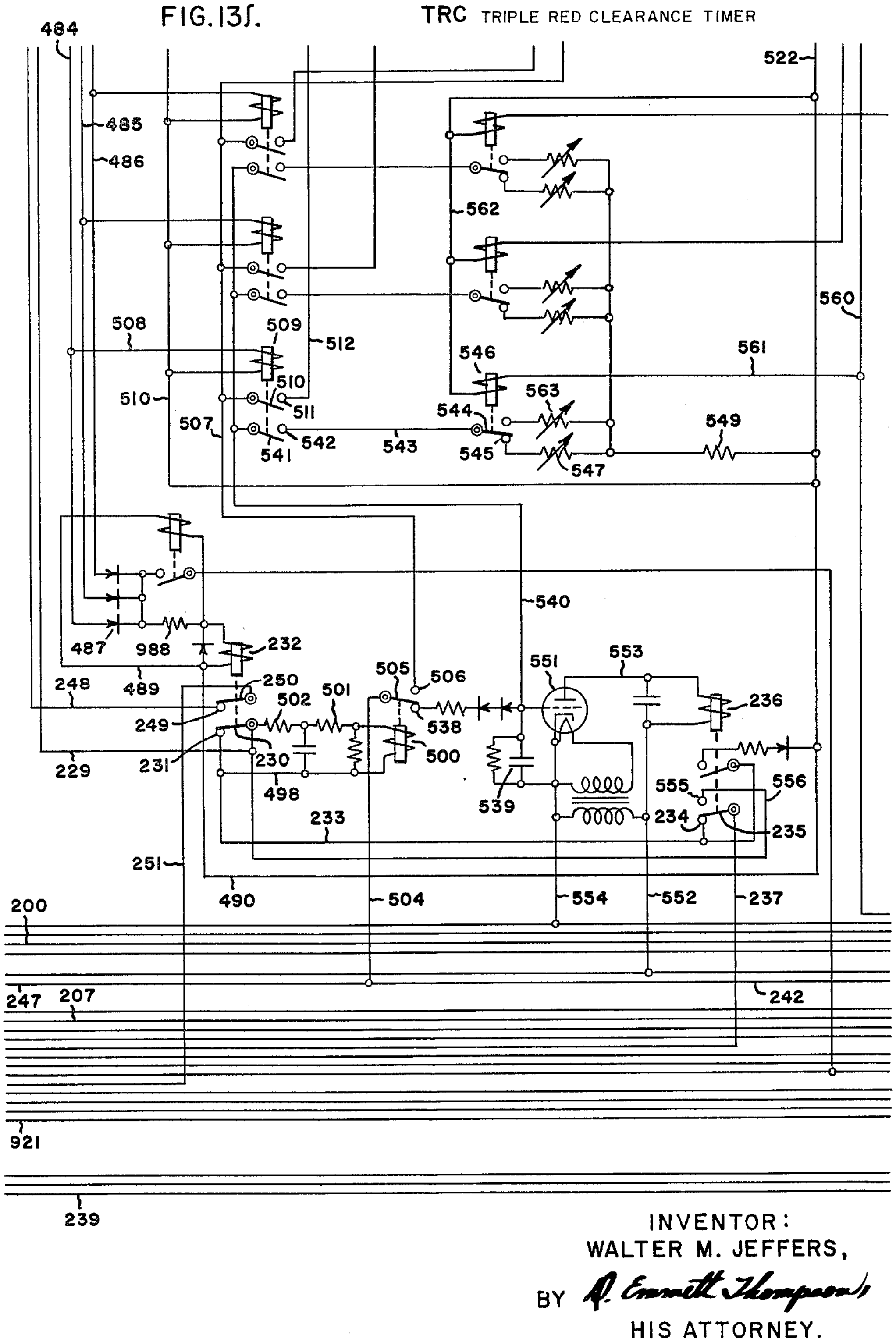
Figure 13M:
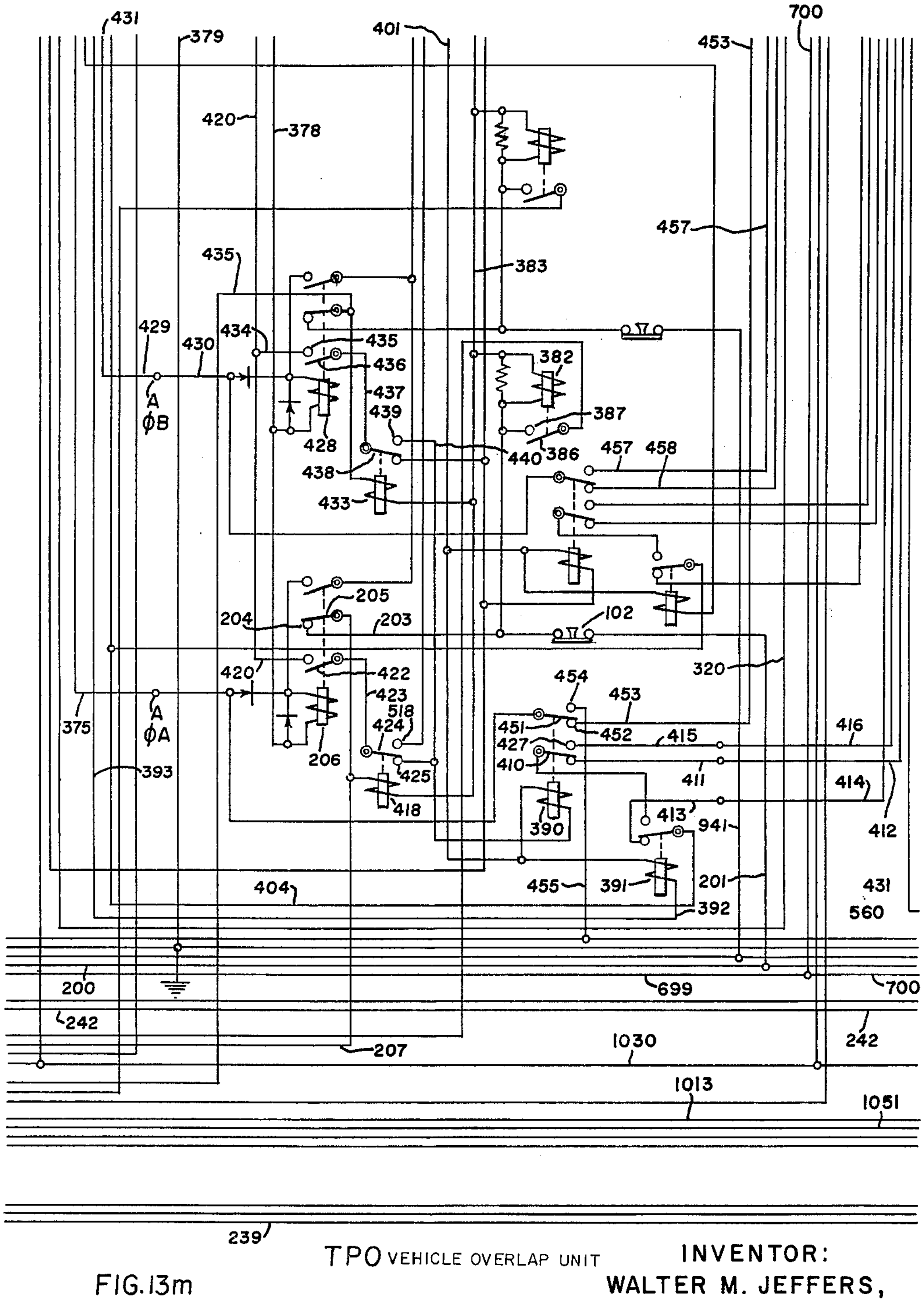
Figure 13N:
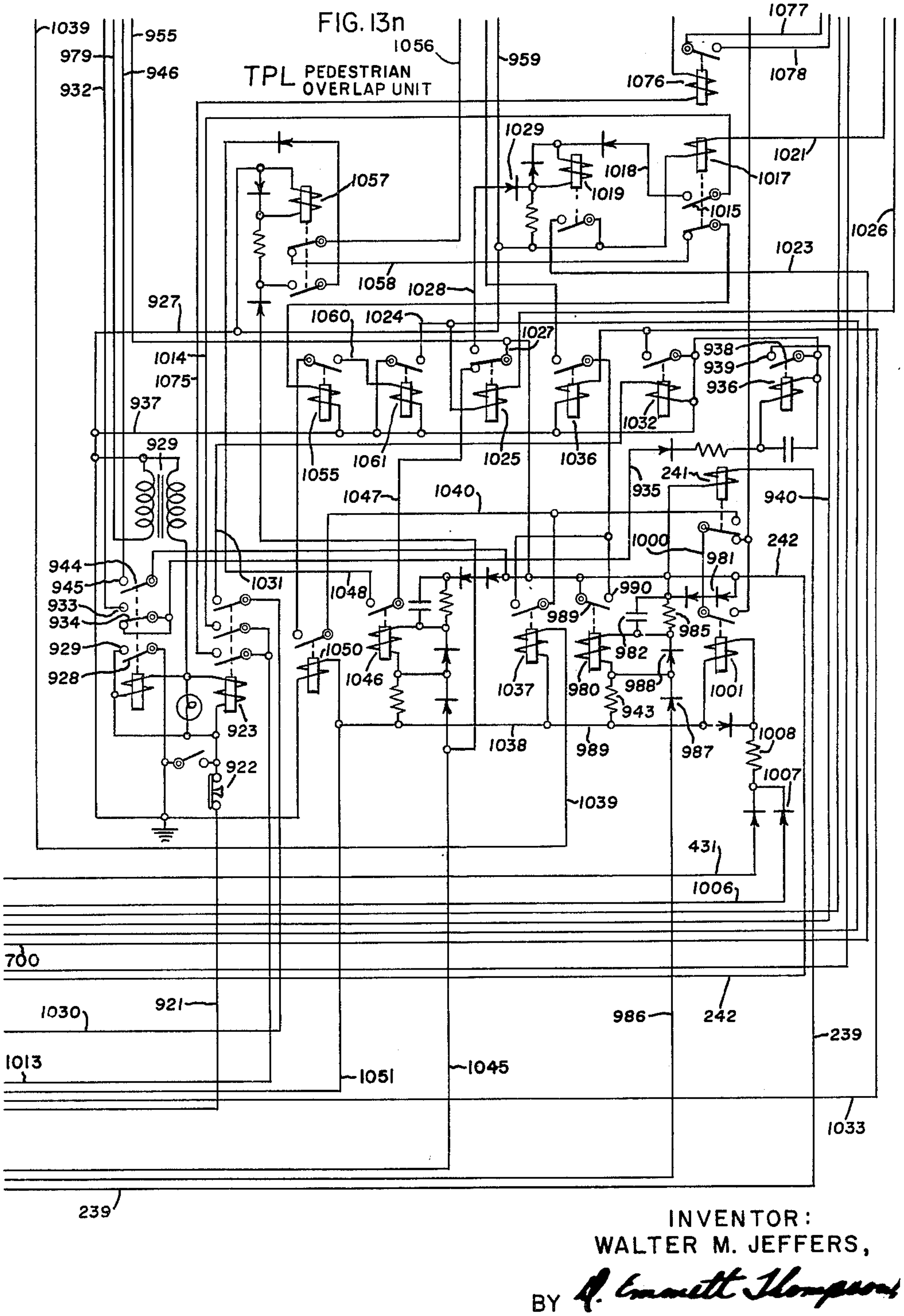

The circuit diagram for the control system is shown in FIGURES 13*a* to 13*n*, inclusive, and when these figures are placed together in the manner shown on the key diagram, FIGURE 13, the complete circuit diagram for the TSI, TAC, TPT, TRC, TPO and TPL units of the controller is shown.

Figure 14:
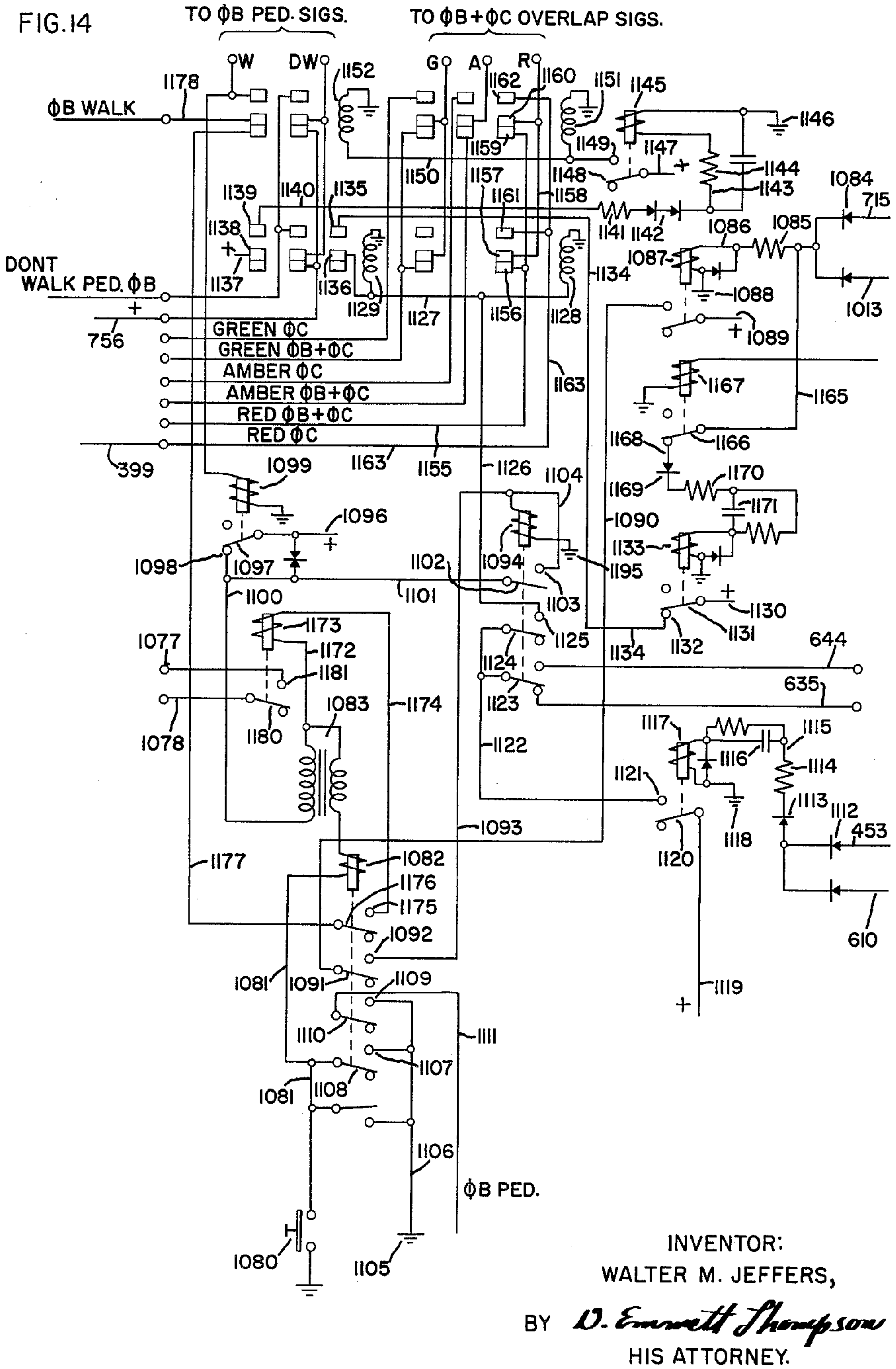
FIGURES 14 to 16 are circuit diagrams of an auxiliary pedestrian timer.
Figure 15:
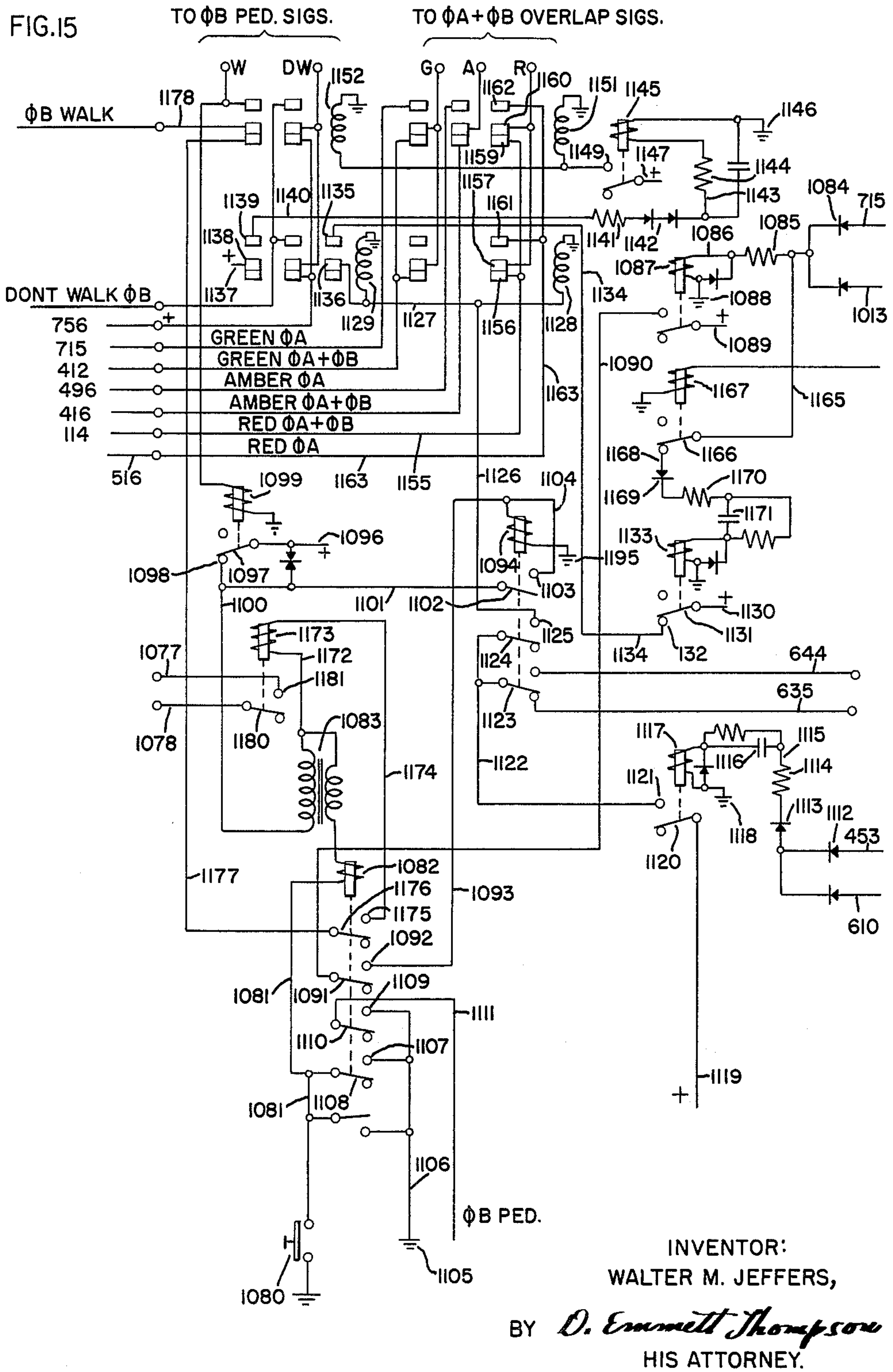
Figure 16:
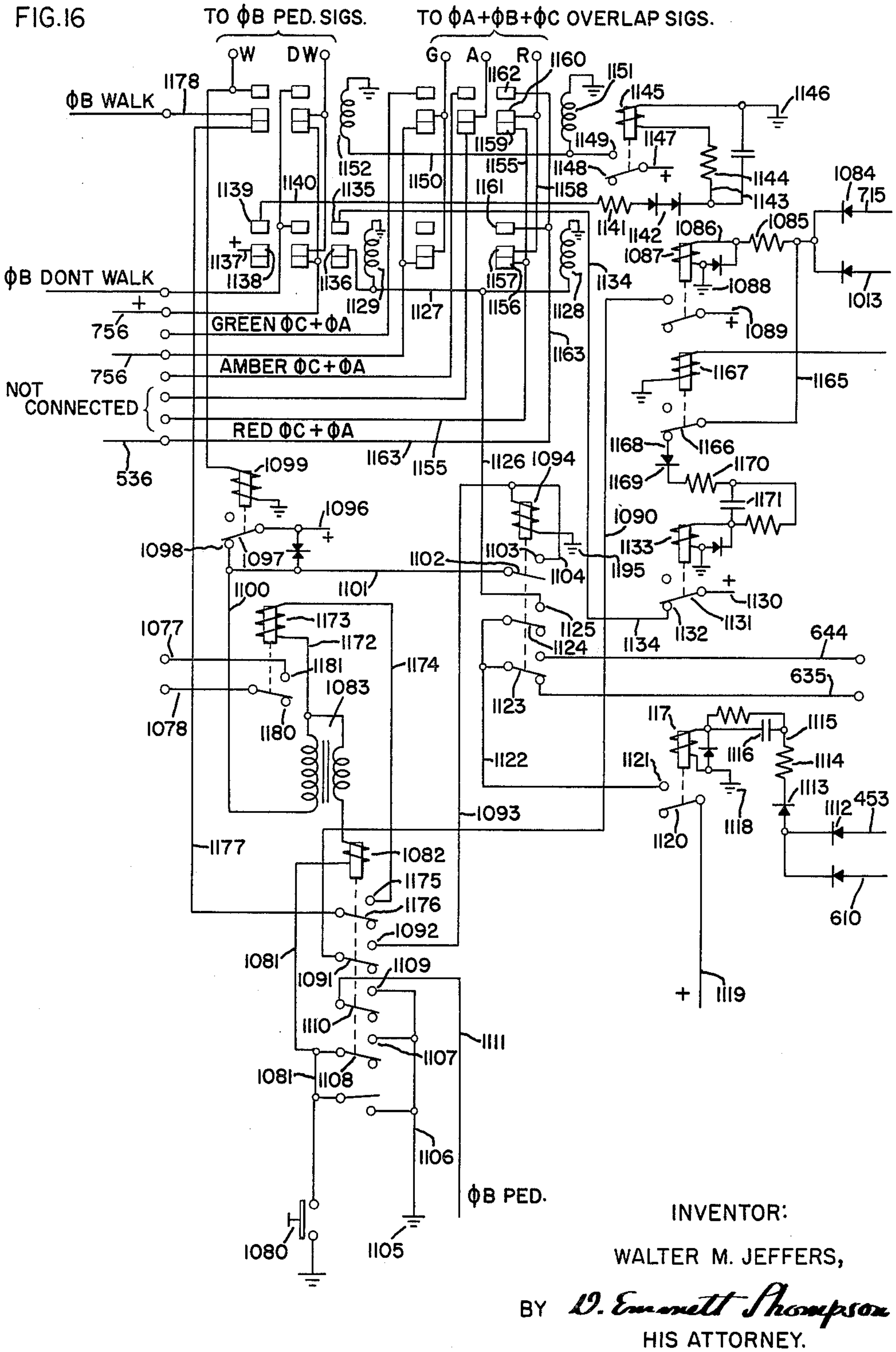

FIGURES 14 to 16, inclusive, show three different connections for the TPA unit.

The main timer, referred to as the TAC unit, is shown in FIGURES 13*b* and 13*i*, and is generally similar in construction and operation to that disclosed and claimed in my above identified application. The main timer consists of a cam unit having thirty-eight cam contacts 100 to 137, a standard RC timer circuit including capacitor 139 and tube 140, and variable timing resistors 144 through 157 that operate in conjunction with the tube 140, skip signal relays 158, 159 and 160, detector relays 161, 162 and 163, an initial extension relay 164, a skip charge relay 165, a hold timing relay 166, a main timing relay 167, memory carryover relay 168, skip relays 169, 170 and 171, a maximum memory relay 172 and maximum relays 176 through 181. The main timer operates in a manner generally similar to the 3-phase controller, described in my prior application, and reference may be had to said application for a more complete description of operation of a 3-phase full actuated controller.

Since the main timer is a 3-phase controller, the cam unit is divided into thirds, ⅓ for each of three movements controlled and starting from cam position I. As shown in the cam chart of FIGURE 3, the movements are set up in phase A, phase B and phase C order around the cam shaft. As set forth in the above identified application, the main timer will skip any phase not having demand, and move directly to those phases having demand.

*Main Timer—TAC*

In describing the invention, the main timer can best be explained by describing in detail the operation of its components as the controller moves through one complete cycle. Accordingly, it shall be assumed that the controller is resting in the green extension portion interval of phase A, and that all switches, except signal switch 182, are open. The signal switch 182 is closed in normal operation, and it will therefore be assumed to be closed. In this position, as best seen in the cam chart shown in FIGURE 3, the cam unit is in interval 4, the green extension interval for phase I. In this position, the cam contact 129 for the green signal for street I will be closed; cam contacts 135 and 137 for the red signal for streets 2 and 3 will be closed. The phase A green signal is energized through a circuit comprising line 183, which is a hot line connected to a 220/115 volt, 60 cycle, power supply. Line 183 passes through the closed signal switch 182 to line 184, through the lowermost armature of relay 158, which is in engagement with the upper contact via line 185, line 186, closed cam contacts 129 to line 187, which is connected to the green signal for phase A, as is indicated in FIGURE 13*b*. The circuit for the energization of phase B red signal originates from the hot line 184 through the upper armature of relay 158 and normally closed contact of said relay through the closed cam unit contacts 134 to line 188, which is connected directly to the phase B red signal, as is indicated in FIGURE 13*b*. Similarly, the hot feed for the phase C red signal also originates from the hot line 184 and passes through the upper armature of relay 159, and the closed cam contact 137 to line 189, which is connected to the red phase C signal, as is indicated in FIGURE 13*b*. These circuits are also utilized for other reasons, as will be hereinafter described, and the signal connections are not shown, but are of the conventional type.

With the main timer resting in the extension portion of phase A green interval, the capacitor discharge timing path is from the main timing capacitor 139, which has been previously charged, as explained in the above referred to application, through the lower armature and lower contact of relay 165 to line 190, to cam unit contacts 102 which are closed in this position, through the variable resistor 152 via the lower armature and lower contact of relay 164 and resistor 157 to line 191, which is connected to ground. Even though the capacitor 139 may completely discharge, thus terminating the extension timing, the tube 140 will not conduct so as to energize the main timing relay 167 because the plate circuit for the tube 140 is open through the open cam contacts 118 and 119 from the line 192, the armature 193 and contact 194 of relay 162, and armature 195 and contact 196 of relay 163 which are de-energized.

At this point an actuation of the detector associated with phase B will energize relay 162 by the placing of a ground feed from line 197, which is a ground line, through the closed vehicle detector for phase B, 198, to line 199, line 200 to line 201 in FIGURE 13*m*, through switch 202, line 203, contact 204 and armature 205 of a relay 206, line 207, which is connected as shown in FIGURE 13*i* to line 208, which is connected through the coil of relay 162 to the hot side of the detector transformer 210, thus energizing the relay 162. The energization of the relay 162 in the main timer causes the armature 211 to move into engagement with the contact 212 so as to supply a ground feed from the ground lines 213 and 214, through the closed cam contacts 126 to hold the relay 162 in the energized condition. The energization of the relay 162 also causes the armatures 215 and 216 to move into engagement with the contacts 217 and 218, respectively, to supply maximum feeds from the cam unit contacts 122 and 124, to the maximum relays, the operation of which will be described in detail hereinafter. The energization of the relay 162 also causes the armature 193 to move into engagement with the contact 194 to complete the plate circuit for the main timer tube, previously described, which plate feed originates with a hot feed supplied from a point 220 in the TPT unit, shown in FIGURE 13*c* through the armature 221, and lower contact 222 of relay 223, to line 224 which passes via line 225 through the contact 226 and armature 227 of relay 228 to line 229, through the armature 230 and contact 231 of the relay 232, in the TRC unit, shown in FIGURE 13*l* to line 233, contact 234 and armature 235 of relay 236 in the TRC unit, FIGURE 13*l* to line 237, which is connected, as shown in FIGURES 13*k*, *j*, *i* and *b*, through cam unit contacts 120, which are closed in this interval, and points 193 and 194 of energized relay 162 to the upper side of the relay 167 via line 192, which is the main timing relay of the main timer unit, TAC. Accordingly, the relay 167 will be energized, and the armature 238 of relay 167, which is connected to the hot line 239 will make contact with the normally open point 240. The line 239 receives its hot feed through the coil of relay 241 in the TPL unit, shown in FIGURE 13*n*, which receives its hot feed from line 242. The hot feed placed on the armature 238 of the relay 167 will be connected by the line 243, through the cam unit motor 244 to the ground line 245, thus energizing the cam unit motor, and moving the cam unit to the next position.

As is set forth in the previously referred to application, when the cam unit motor starts to turn the cam unit cam contacts 100 and 101 will close simultaneously supplying the motor with a hot feed to insure the rotation of the cam unit to the next position, and the contacts 101 recharge the main timing capacitor 139, replacing the bias on the grid of tube 140 so as to de-energize the relay 167. As the cam unit reaches the next position, the contacts 100 open, thus de-energizing the cam unit motor and stopping the cam unit in position 6, which, as shown in the cam chart of FIGURE 3, is the phase A amber interval. During this interval the cam unit stop contacts 118 are closed, thus maintaining a closed plate circuit and shunting the detector relay contacts.

The stop circuit through the contacts 118 also originates at the armature 221 of relay 223 in the TPT unit, shown in FIGURE 13*c*. This circuit also passes through line 224, armature 246 and contact 247 of relay 228 to line 248, to contact 249 and armature 250 of relay 232 in the TRC unit, shown in FIGURE 13*l* to line 251 through the cam contacts 118 in the TAC unit, shown in FIGURE 13*b* to complete the plate circuit previously described.

In position 6 of the cam unit, as shown on the cam chart FIGURE 3, the cam contacts 118 are closed, thus moving the cam unit from position 6 to position 7, upon completion of the timing of amber phase A interval by the RC timer for the main timer unit, as previously set forth. As shown in the cam chart of FIGURE 3, position 7 is a spin skip interval, and the unit will cycle through position 7 into position 8 wherein the green signal will be displayed to phase B, or movement 2.

The timing circuit for the phase A amber interval consists of the capacitor 139 in FIGURE 13*i* through the line 252, armature 253 and contact 254 of relay 165, line 190 through the closed cam contacts 103 to line 225 through the variable resistor 150 and the fixed resistor 155 in the line 255 through the contact 256, and armature 257 of relay 161, line 258, closed memory cam contacts 125 to the line 213, which is a grounded line.

In the event of further actuations on the detector, associated with phase A, or movement I, the timing circuit just described will include the resistor 259 by virtue of the energization of relay 161, due to the actuation of the phase A detector, thus adding an additional time to the amber interval, just described, and this addition is referred to as an extendible amber feature.

Upon completion of the amber interval the controller will move to position 8, as above set forth, which is the initial portion of the proceed interval for phase B. During this initial portion of the proceed interval, cam contacts 118 are closed completing the plate circuit of the tube 140, as previously described.

As set forth more completely in my previous application, the timing circuit for the initial portion of the proceed interval will be through the closed cam contacts 104, and upon completion of the discharge of the capacitor 139 the controller will move to position 9 on the cam chart of FIGURE 3, which is the green extension portion of the phase B proceed interval. This is normally a rest position by virtue of the opening of the cam contacts 118 and 120. Accordingly, the signal display will be proceed for phase B, stop for phases A and C. Unless there is a vehicle demand on phases A or C, upon discharge of the capacitor 139, the controller will continue to rest in this position because of the open plate circuit, as previously set forth.

Consequently, in this condition continued actuations of the detector associated with phase B will merely recharge the capacitor 139, but, due to the fact that the plate circuit for the tube 140 is open, the signal for phase B will remain energized in the proceed condition.

At this point, let it be assumed that a call is received on the detector means associated with one of the other phases A or C, and that continued actuations of the detector means associated with phase B are being received. This set of conditions will serve to illustrate the operation of the maximum feature of the controller.

Referring now to FIGURES 13*a* and 13*h*, the synchronous interconnect unit is shown as having three dial units, which are indicated by the dial unit motors 261, 262 and 263. Each of the dial units is provided with 5 sets of contacts which are closed by dial keys positioned on the dial unit, and the closing of the second set of dial contacts of the three dial units creates a maximum impulse. Commencing with the hot feed on power supply line 300 to line 301, to line 302, armature 303 and contact 304 of relay 305, line 306, armature 307, contact 308 of relay 309, line 310, dial contacts 311, line 312, which is connected to the main timer unit TAC, as shown in FIGURES 13*a* and 13*h*, through the coil of maximum relay 177 to the grounded line 245, thus energizing relay 177. Relay 177 will be maintained in the energized state by a stick circuit comprising a hot feed originating on line 300 to line 315, which passes through the armature 316 and contact 317 of the maximum memory relay 172 to line 319, through the armature 320, which is now in engagement with the upper contact 321 and through the coil 313 to the ground line 245.

At this point, a call on either of phases A or C will energize relays 161 or 163, as the case may be. The energization of these relays will transmit a hot feed from the hot line 315 to line 322, through the cam unit contacts 123, which are closed in the phase B extension interval, armature 323, and fixed contact 324 in the event relay 161 has been energized to line 325 which is connected to line 326. In the event that relay 163 has been energized, the hot feed will pass through the closed cam contacts 123, line 327, and closed contacts 328 and 329 of energized relay 163 to the line 326. The hot feed thus placed on the line 326 passes through contact 330 and armature 331 of energized relay 177 to the line 332, and through the coil of relay 160 to the line 333 through the contact 334 and armature 335 of relay 168 to the line 336 which is connected to the ground line 245. The energization of the relay 180 opens an extension charge circuit by opening the armature 337 and contact 338, the extension charge circuit being the same as the above-referred-to application. The energization of relay 180 also moves the armature 339 into engagement with the contact 340 completing a ground circuit from the line 245, line 341 through the maximum memory cam contacts 128, which are closed in each position of the cam unit, to line 342, armature 339, contact 340, line 343 to line 344, placing a ground feed on the armature 211 of the relay 162 so that in the event of an additional detector actuation of the phase B detector, a circuit will be closed through the detector coil thus giving a memory of phase B actuation to call the controller back to phase B after other calls have been answered. The opening of the extension charge circuit, as just set forth, serves to prevent further phase B extensions.

As will be obvious, relays 176 and 178 will be energized by the maximum pulses from the third and first sets of contacts on the dial units. These relays are also held energized by the feed from the hot line 315 through the armature 316 of the relay 172, as described in connection with the energization of relay 177. The relay 172 is connected in a 3-leg OR circuit comprising line 346, which is connected to the feed line for the amber phase A signal, through the cam contacts 130; line 347, which is connected to the amber feed line for the phase B signal through cam contacts 133; and line 348 which is connected to the amber feed line for the phase C signal through the cam contacts 136. The lines 346, 347 and 348 comprising the three legs of the OR circuit are each connected through rectifiers in these lines to the line 349 which passes through a rectifier 350 to a conventional pulse circuit comprising capacitor 351, resistor 353 to the top side of the coil of relay 172, which has a rectifier 354 connected in parallel therewith. The opposite side of relay 172 is connected by line 355 to the line 341, which in turn is connected to the ground line 245. As will be obvious, when any one of the amber signals receives a hot feed through its cam contacts, the hot feed will be transferred through the legs 346, 347, 348 to the line 349 to pulse the relay 172. This in turn causes the armature 316 to separate from the contact 317, thus breaking the circuit which serves to hold the relays 176, 177 or 178 energized. Consequently, it will be obvious that a maximum inpulse will be remembered only if it is received in the TAC unit from the dial contacts of the TSI unit during, or after the clearance interval preceding any given green interval.

From the above, it will be seen that the maximum timing operation will take place to transfer the right-of-way signal display from one of the main phases, which is receiving repeated vehicle actuations only where two conditions occur: (1) a call must be placed on one of the other two phases of the main timer; and (2) the maximum impulse for the phase having the right-of-way must be received from the TSI unit. As will be obvious, the maximum circuits for both phase A and phase C are identical in operation to that above described for phase B and will function in the same manner since the controller is symmetrical.

In addition, the controller will move from phase B to phase C similar to the manner described above for the movement of the controller from phase A to phase B.

Now let it be assumed that the sequence of detector actuations is a call on phase A, and a call on phase C with no call on phase B. This involves the operation of the main timer wherein the phase B portion of the control cycle is skipped. The operation of the main timer TAC under this condition will be identical to that shown and disclosed in my prior application and will not therefore be repeated herein. This skipping operation is the same regardless of which one of the three phases is skipped.

The TAC unit is provided with a memory carryover relay 168, and this relay has the function of remembering a call placed on a phase that is being skipped if no call is received during the skip spin through part of the cycle. Referring to the cam chart shown in FIGURE 3 for example, when the cam unit skips phase B it passes through position 9, in which position phase B memory contacts 126 open. If an actuation was received on phase B detector after the beginning of the skipped cycle, but before the opening of the contacts 126, this actuation would not be remembered when the memory cam contacts 126 open, thus giving rise to the possibility of a vehicle being trapped between the phase B detector and the intersection. The memory carryover relay 168, however, places all the memory circuits in parallel when energized. The energization of relay 168 takes place whenever the cam unit motor 244 is energized by virtue of the fact that the coil of relay 168 is wired in parallel with the motor coil 244, as shown in FIGURE 13*i*. Therefore at any point throughout the entire cycle, at least 2 of 3 memory circuits are closed, and consequently any detector impulse received while the motor is running will be remembered.

The TAC main timer includes a minimum and maximum recall switch for each phase. The minimum recall switches are shown to the left of FIGURE 13*b*, and are identified by reference numerals 356, 357 and 358, and when any or all of these switches are closed, the controller will be recalled to the phase, or phases, having a closed switch, or switches, for a minimum proceed interval where there are other calls present on the other phases, unless vehicle actuation is received during the extension portion of the proceed interval for the phase or phases, having the closed recall switches, in which case the proceed interval will be extended.

The maximum recall switches are located to the right of FIGURE 13*b*, and are identified by reference numerals 360, 361 and 362, and operate when closed to maintain the proceed signal in the energized condition for the phase, or phases, having the closed maximum switches until the maximum key in the dial unit of the TSI unit places a maximum pulse on the TAC unit to end the proceed interval, as above described.

The minimum recall switch 356 is connected between the coil of the relay 161, and the memory cam contacts 125 for phase A, thereby establishing a ground on the detector relay 161 when the minimum recall switch 156 is closed, and energizing the relay 161 only during the time that the memory cam contacts 125 are closed. Minimum recall switches 357, 358 are connected similarly between the coils of the detector relays 162 and 163, and the memory cam contacts 126 and 127. Conversely, the maximum recall switches 360, 361 and 362 are connected between the coils of relays 161, 162 and 163, and the ground line 245 as shown in FIGURE 13*b*, thereby continuously energizing, or holding, the detector relays 162, 163 energized, thus extending the proceed interval of the phase, or phases having the closed maximum recall switches to their maximum.

*Vehicle overlap unit—TPO*

The TPO unit includes means providing predictor circuits that will predict the transfer sequence of the right-of-way signal display, which predictor circuits will be utilized in the control of the other units of the system. As will be seen from FIGURE 12, the vehicle detectors for phases A(1), B (2) and C (3) all pass through the TPO unit. For an illustration of the operation of the TPO unit, let it be assumed that an actuation of the phase B detector 198 has taken place, thus calling the fourth movement, which overlaps with phase A and B of the main timer. An actuation of the phase B vehicle detector 198 completes a circuit from the ground line 197 through line 199 to line 200, line 201 through a detector disconnect switch 102 to line 203 in the TPO unit, FIGURE 13*m*. Line 203 is connected through contact 204 and armature 205 of relay 206 to line 207, which is connected to line 208 in the TAC unit, and through the coil of detector relay 162 to the hot side of the detector transformer 210. Consequently, the actuation of the phase B detector will actuate the detector relay 162 to the circuit just traced, which passes through the TPO unit. The reason for this is to prevent a call from being registered on the phase B detector in the main timer TAC during the phase A amber. As previously set forth, the fourth movement established and controlled by the TPO unit will show a proceed indication simultaneously with the proceed indication for phases A and B. Consequently, if the main timer was resting on a phase A green position, and a call for phase C was received, the controller would be cycled to a phase A amber position preceding its spin through to the phase C green position. Accordingly, since in this example phase C would be next in the sequence, the signal for the overlap movement number 4 must also be changed to an amber indication, since this movement will conflict with the movement for phase C. If the phase B detector actuation were allowed to register in the main timer during the phase A amber interval, the operation of the main timer is such that the sequence of transfer of the right-of-way signal display would be phase A, phase B, phase C. However, since the phase A, plus phase B overlap movement number 4 has changed to amber with the phase C call, the right-of-way signal display transfer sequence must be from phase A to phase C, or else the signals for the fourth overlap movement would turn from proceed to clearance, and back to proceed. Consequently, if a phase B detector actuation is received during a phase A amber interval in phase A to phase C transfer sequence, the impulse will be stored by a memory circuit in the TPO unit and fed into the main timer during the interval following phase A amber. The above results are effected due to the fact that the coil of relay 206 is connected by line 375, line 376 to line 377, which is connected to the phase A amber cam contacts 130, and consequently the closing of the phase A amber cam contacts 130 will place a hot feed on the line 377 to energize relay 206. The opposite side of the coil of relay 206 is connected by line 378 to line 379, having a resistor 380 therein, and the line 379 is a grounded line, thus completing the circuit for the energization of relay 206. Accordingly, the armature 205 will be separated from the contact 204, thus disconnecting the phase B detector circuit from the main timer during the amber of phase A. A detector actuation, however, will connect the ground on lines 201 and 203 to line 381 through the coil of relay 382 to line 383, which is connected by line 384 to a hot 12 volt line in the main timer taken off the detector transformer 210, thus energizing the relay 382. The energization of relay 382 moves the armature 386 upward into engagement with the contact 387 thus completing a stick circuit from the hot line 383 through the coil of relay 382 to line 388, which is connected by line 389 to the phase B memory circuit by line 344. Accordingly, after the phase A amber interval has timed out, the relay 206 in the TPO unit will be de-energized, and the memory impulse from the phase B memory circuit in the main timer that is holding relay 382 energized, will now feed into the main timer through contact 204 and armature 205 of relay 206 via line 207 thus energizing the phase B memory relay in the main timer to store the phase B detector actuation in the main timer.

The signals for the fourth movement which overlaps with phase A and B of the main timer are controlled by relays 390 and 391. One side of the coil of relay 391 is connected by line 392 and line 393 to line 394 in the TRC unit, and through the lowermost armature and contact of relay 395, and the armature and contact of a relay 396 to the line 397 which passes through a set of normally closed contacts of relay 398 to line 399, which is connected to line 189 in the main timer unit which receives a hot feed from the cam unit contacts 137 for the red signal in the main timer phase C. The opposite side of the coil of relay 391 is connected by line 401 to line 402, which is connected to the grounded line 379. Consequently the closing of the cam contacts 137 and the phase C stop signal will energize the relay 391. The ganged armature contact 403 of the relay 391 is connected by line 404 to line 405 which receives a hot feed through the armature 406 of relay 407 from the hot line 408 which is connected through the signal switch 182 in the main timer. The relay 407 is energized when the signal switch 182 is closed to provide this hot feed to the TPO and other units.

The energization of relay 391 places the hot feed on line 404 to the upper contacts of the relay 391 and through line 409 and armature 410 of relay 390 to line 411, which is connected by line 412 to the green signal for the overlap movement number 4. The energization of the relay 391 also broke the hot feed through the armature 403 to the lower fixed contacts of relay 391, which were connected by lines 413 and 414 to the red signal for the overlap movement, thus changing the signal indication on overlap movement 4 from red to green. Consequently, it will be seen that as long as the red signal for phase C of the main timer is receiving a hot feed, the fourth movement will receive a green signal. However, since the upper fixed contact associated with armature 410 of relay 390 is connected by lines 415 and 416 to the amber signal for the overlap movement, the energization, or the de-energization of relay 390, will determine whether the amber or green signal for the fourth movement is energized.

If the transfer sequence is going to be a phase A to phase C, or a phase B to phase C transfer, an amber indication will be necessary on the fourth movement during the main timer phase amber interval since the fourth movement is an A plus B overlap movement. Consequently, if the main timer moves into phase amber interval, and there is no detector call on phase B, the relay 418 will be de-energized (relay 418 is energized by a phase B detector actuation) thereby completing a circuit from the hot line 405, line 404, line 419, line 420, contact 421 and armature 422 of relay 206, which was energized during the phase A amber interval, as previously described to line 423, which passes through armature 424 and contact 425 of relay 418 to line 426, which is connected through the coil of relay 390 to line 401, which is a grounded line, thus energizing relay 390. The energization of relay 390 causes the armature 410, which receives a hot feed from the line 409 through energized relay 391 to engage the contact 427, thus placing a hot feed on lines 415 and 416, thus energizing the amber signal for the overlap movement 4.

If the right-of-way sequence is phase B to phase C, it is necessary to turn the movement 4 signal display from proceed to amber with the phase B amber. During the phase B amber, the relay 428 will be energized by virtue of a hot feed placed on line 429, which is connected by line 420 to the upper end of the coil of relay 428 because line 429 is connected by line 431 to line 432 in the main timer, and the line 432 receives a hot feed during the phase B amber through cam contacts 133. The opposite side of the coil relay 428 is connected by line 378 to the grounded line 379, thus energizing the relay 428. If there is a detector actuation on phase C, the relay 433 will be energized (similarly to the energization of relay 418 for a phase B detector actuation) through a circuit comprising line 434 which is connected to the top of the coil of relay 433 to line 435, which is connected to line 436 in the main timer unit, and through the first armature and control of energized detector relay 163, closed cam contacts 127 to the ground line 213, thus serving to energize the relay 433, which is connected at its opposite side to the line 383 which is connected by line 384 to a hot feed taken from the detector transformer 210 in the main timer. During the amber phase B interval, a circuit will be completed from the hot line 405, line 404, line 419, line 420 to line 434, which passes through contact 435 and armature 436 of energized relay 428 to line 437, armature 438 and contact 439 of energized relay 433 to line 440, which is connected to the line 426 and the coil of relay 390, thus energizing relay 390 and transferring the hot feed on the armature 410 to the upper fixed contact to change the signal indication from green to amber.

The triple overlap unit TPO is provided with means for predicting the right-of-way signal display transfer sequence, which will be hereinafter referred to as predictor circuits. As previously set forth, when the main timer is in the phase A amber interval the line 375 will be provided with a hot feed from the main timer phase A amber cam contacts, and this hot feed will be transferred by line 450 to the left hand armature 451 of the relay 390. This armature is in engagement with the fixed contact 452 when the relay 390 is de-energized so as to transfer the hot feed to the line 453. Accordingly, it will be obvious that when the relay 390 has been energized the hot feed on the armature 451 will be transferred to the upper contact 454, and to the line 455 in a phase A to phase C transfer sequence. As previously explained in connection with the TPO unit, the relay 390 will only be energized in such a transfer sequence, and hence the hot feed placed on the line 455 thus acts to predict this transfer sequence. Similarly in the event that relay 390 is not energized, the hot feed will be maintained on the line 453 thus predicting a phase A to phase B transfer sequence. As will also be obvious, since the hot feeds to the lines 453, 455 are taken by lines 375 and 376 from the amber phase A cam contacts, the predicting just described will be done during the phase A amber interval.

The line 429 and the line 456 similarly receive a hot feed from the main timer during the B and C amber phases, and since the TPO unit is symmetrical the line 457 will receive a hot feed predicting a B to A transfer sequence; the line 458 will receive a hot feed predicting a B to C transfer sequence; the line 459 will predict a C to B transfer sequence, and the line 460 will predict a C to A transfer sequence. The hot feeds placed on these lines will be utilized in other units of this controller, as will be hereinafter described.

*Triple red clearance timer—TRC*

The TRC unit functions to insert an all-red clearance interval following the amber interval of each main timer phase and, accordingly, this all-red interval will be referred to as following any given amber, but for purposes of describing the various movements shown in FIGURE 1, the all-red interval will be referred to as preceeding the green of any given phase. As previously set forth, the all-red interval is variable to the extent that either of two different intervals will be inserted after any given amber, depending upon the right-of-way transfer sequence. In this connection, the chart adjacent FIGURE 1 indicates that a long all-red interval will be inserted when the transfer sequence is from B to C; A to B and A to A, while a short all-red interval will be inserted when the transfer sequence is from B to A; A to C and C to B. Whether a long, or a short, all-red interval is selected will depend upon the physical or geometrical layout intersection, as previously set forth, and accordingly will be set when the controller is installed at the intersection.

The stop circuit for the main timing relay 167 in the plate circuit of tube 140 in the main timer is normally completed through any one of the cam contacts 118 to 121, inclusive, and lines 251 and 237. The line 237, however, passes from the timer into the TRC unit, shown in FIGURES 13–*e* and 13–*l*, and is connected through the armature 235 and lower contact 234 of relay 236 to line 233, which is connected through the lower contact 231 and armature 230 in relay 232 to line 473, and to line 229, which is connected in the triple pedestrian timer, as previously described, to provide the hot feed for the plate circuit. Similarly, the line 251 is connected through armature 250 and contact 249 of relay 232 to line 248, which is also connected as previously described, through the TPT unit to a hot feed. Accordingly, since the stop circuits for the main timer are both completed through the armatures and contacts of relay 232 in the TRC unit, it will be obvious that when the relay 232 is energized these stop circuits will be open thus preventing the cam unit in the main timer from moving from one interval to another.

The energization of relay 232 is effected through a 3-leg OR circuit consisting of normally closed disconnect switches 481, 482 and 483, and lines 484, 485 and 486, each of which includes a rectifier 487 connected to one side of a resistor 488, and the top side of the coil of relay 472. The bottom side of the coil is connected by line 489 to a grounded line 490. The lines 484, 485 and 486 receive their hot feeds from the lines 376, 431 and 456, which, as previously described, are connected to the amber cam contacts for the three phases in the main timer.

The selection of the two different all-red clearance intervals will now be described based on a transfer sequence of A to B giving a long interval, and a transfer sequence of A to C giving a short interval. Assume the main timer to be resting on phase A extension portion of the proceed interval with a call on the phase B detector. As the main timer moves into phase A amber, the hot feed on line 376 will be transferred by line 491 to the line 484 and through the circuit just described, to energize the relay 232. This hot feed on line 491 will also pass through the armature 492 and lower contact 493 of relay 494 to line 495, which is connected by line 496 to the phase A amber signal, thus energizing this signal. The energization of the relay 232 opens the stop circuit, previously described, by moving the armature 230 away from the contact 231. This serves to establish an alternate stop circuit from line 237 through the armature 235 and contact 234 of relay 236, line 233, line 498 through the coil of relay 500, resistor 501 and resistor 502 to line 473, which is connected by line 229 to the TRC unit hot feed, as previously described. Accordingly, the relay 500 is connected in series with the main timer plate relay 167, but the relay 500 is a much more sensitive relay than the relay 167, and will operate on a much lower current. The combination of the coil of relay 500 and resistors 501 and 502 offers sufficient resistance in this plate circuit to prevent the energization of plate relay 167, but allows a small amount of current to pass through the circuit energizing the relay 500. Consequently, the relay 167 will not be energized, and the cam unit in the main timer will remain stopped in the phase A amber position until the stop circuit is closed allowing the plate relay to energize and operate cam unit motor.

The energization of relay 500 causes a hot feed on the line 504 to pass through the armature 505 of the relay 500 to the upper contact 506, and to line 507. The hot feed on line 484 which energizes relay 232 is also passed by line 508 through the coil of relay 509 to the grounded line 510 thus energizing the relay 509. Consequently, the hot feed on line 507 is connected by armature 510 to contact 511 of the relay 509, and by line 512 through the coil of relay 494 to the grounded line 510 thus energizing the relay 494. The energization of the relay 494 causes the armature 492 to break the contact with the lower fixed contact 493, thus disconnecting the hot feed from the amber signal line 496. At the same time, however, the armature 513 of relay 494 is moved into engagement with the upper fixed contact 514 to energize the phase A red, or stop signal by the circuit to be next described.

This circuit comprises the hot line 515, contact 514, armature 513 and line 516, which is connected to the phase A red, or stop signal, thus energizing this signal. Accordingly, the main timer cam unit is now stopped in the phase A amber position, but the energization of relay 494 in the TRC unit has changed the signal indication on phase A from amber, or clearance, to red, or stop. Since the phase B and phase C red signals are also normally energized by the main timer in this position of the main timer cam unit, there is a red signal indication now present on all three main timer phases.

As previously set forth, the number 6 movement, which overlaps with phase C and A normally shows a green indication simultaneously with either a phase C or a phase A green indication. However, since the signal indication for phase A has now turned to amber, the signal indication for the number 6 movement will also be changed to amber similarly to the manner described previously in connection with the number 4 movement, which is an A plus B movement. Consequently, it is also necessary at this point to change the signal indication for the number 6 movement to the all-red indication simultaneously with the phase A signal change effected by the TRC unit, as just described.

In the phase A to phase B right-of-way transfer sequence the hot feed on line 405 will be connected by line 404 in the TPO unit to line 419, line 420, contact 421 and armature 422 of relay 206, line 423 through armature 424 and the upper contact 518 of relay 418, which is energized by a phase B detector actuation, line 519, line 520, which is connected to the top side of the coil of relay 521 in the TRC unit, and the opposite side of the coil 521 is connected to a grounded line 522. Consequently, this circuit energizes the relay 521 for a purpose to be hereinafter described. As previously set forth, the relay 500 in the TRC has been energized. The energization of the relay 500 at the end of the phase A amber serves to connect the hot line 504, via armature 505 and contact 506 to the line 507 which passes through the coil of relay 395 to the grounded line 522, thus energizing the relay 395 subsequent to the energization of the relay 521. Previous to the energization of either of the relays 395 or 521, however, the hot feed supplied to line 524 by the phase B red signal cam contacts 134 and line 188 passes through the armature 525 and lower fixed contact 526 of relay 527, line 528, either of the armatures 529 of relay 395, or armature 530 of relay 521, and the lower fixed contacts of these relays to line 531, which is connected in the TPO unit to one side of the coil of relay 532, the opposite side of which is connected by line 533 and line 402 to the grounded line 379. As will be seen, therefore, the relay 532 was maintained in the energized state during the phase B red signal indication interval by this circuit, and the energization of the relay 532, similar to the energization of the relay 391 in the TPO, as previously described, serve to maintain a green, or an amber signal indication to the 6th movement, which is an A plus C overlap movement. Consequently, the consecutive energization of relays 521 and 395 in the TRC serve to break the alternate paths of this circuit through the armatures 529 and 530, and thus de-energize the relay 532. The de-energization of the relay 532 causes its ganged armatures 532 to move downwardly into engagement with the ganged contacts 535 which are connected by line 536 to the red signal for the number 6 movement, thus turning the signal indication on the number 6 movement from amber to red simultaneous with the all-red signal indication for the 3 main movements. As will be obvious, therefore, since the transfer sequence is from phase A to phase B, the signal condition at this point will be red, or all three main timer phases, and red on overlap movements 5 and 6, but green on overlap movement 4.

The timing of the all-red interval for the above set forth movements will now be described. When the relay 500 of the TRC unit was energized, the armature 505 moved out of engagement with the lower fixed contact 538, thus removing the source of charge voltage from line 504 from the timing capacitor 539. This capacitor is part of a conventional RC timing circuit shown in FIGURE 13*l* of the TRC unit, and upon removal of the source of charging voltage, the capacitor 539 will discharge through a path consisting of line 540, armature 541, contact 542 of energized relay 509, line 543, armature 544, and contact 545 of relay 546, variable resistor 547, line 548 through fixed resistor 549 to a grounded line 550. As previously set forth, since it has been assumed that an A to B transfer sequence needs a long clearance timing, the variable resistor 547 is set to give this long timing. When the capacitor 539 has completely discharged, the grid bias will be removed from the tube 551, thus permitting the tube to conduct current through a path consisting of a hot line 552, relay coil 236, line 553, tube 551 to the grounded line 554. This circuit energizes the relay 236 causing the armature 235 to move into engagement with its upper fixed contact 555 completing a circuit via line 556 to the line 229, thus completing the stop circuit for the main timing tube in the main timer unit TAC. As previously set forth, the completion of this stop circuit now causes the cam unit motor in the main timer to be energized, thus moving the cam unit into the green phase B initial portion of the proceed interval. As the cam unit moves out of the phase A clearance position, the hot feed to the relays 232 and 509 will be opened de-energizing these relays, also de-energizing the relay 500. This will re-establish the source of charging voltage on the TRC timing capacitor 539, thus causing the tube 551 to stop conducting, and in turn de-energizing the relay 236. The deenergizing of the relay 500 will in turn de-energize relay 395. The de-energization of relay 509 breaks the hot feed to relay 494 thus de-energizing this relay, and, accordingly, it will be seen that the TRC unit has been reset by the movement of the main timer cam unit from any of the amber positions.

The preceeding description of the phase A to phase B sequence operation of the TRC unit applies in like manner to a phase A to phase C sequence transfer, with the exception that the line 558 will be hot in a phase A to phase C transfer sequence through a circuit comprising hot line 405, line 404 in the TPO, line 419, line 420, contact 421, and armature 422 of energized relay 206, line 423, armature 424, contact 425 of de-energized relay 418, and line 426 to the line 558. The line 558 is connected through the coil of the relay 396 in the TRC unit, thus acting with the energization of the relay 395, as previously described, to break the hot feed to the relay 391 in the TPO unit to change the signal indication to the overlap movement from amber to red during the all-red interval due to the fact that movement 4 would be conflicting with the movement on phase C in a phase A to phase C transfer sequence. In this sequence the line 455 will receive a hot feed as previously described predicting an A to C transfer sequence, and this hot feed will pass by line 560 to the line 561, which passes through the coil of relay 546 to the line 562, which is connected to the grounded line 552. Consequently the relay 546 will be energized changing the discharge path for the capacitor 539 of the RC timer in the TRC unit through the variable resistor 536, which, under the conditions previously assumed, has been set so as to give a short all-red interval.

Due to the fact that the TRC unit is symmetrical, the all-red intervals following the phase B and phase C amber intervals operate in the same manner.

*Synchronous interconnect unit—TSI*

The synchronous interconnect unit shown in FIGURE 13*a* and 13*h* is shown with a 3-dial synchronous interconnect arrangement. It is to be understood, however, that this unit will function satisfactorily on one or two dials, as well as with three dials. The dial unit motors 261 to 263, inclusive, are of the synchronous type and are rotated continuous as long as power is supplied to the unit, with the exception of the time during which the reset circuit from the master controller is closed, and the reset dial contact on any one of the three dial units are closed. During this time the dial unit is halted in the following manner. A voltage pulse placed on the reset line 570 from the master controller passes through the armature 571 and contact 572 of relay 305 to line 573 and through armature 574 and contact 575, of relay 309 to line 576 through the dial unit reset contacts 577 which are closed once during each revolution of dial unit through the normally closed reset switch 578 to energize the coil of the break relay 579, the opposite side of which is connected to the grounded line 580. Consequently, the feed on the reset line 570 will operate in conjunction with the closing of the reset contacts 577 to energize the relay 579. This causes the armature 580 to separate from the contact 581 thus removing the hot feed from the dial unit motor coil 582 from the hot line 583. The opposite side of the motor coil 582 is connected to a grounded line 583 and the removal of the voltage feed to the coil from the line 583 stops the dial unit motor in the conventional manner. It will be understood that the motor is maintained in the stop condition until the voltage feed on the reset line 570 is interrupted which is normally accomplished by another dial unit in the master controller which closes once each cycle of the master supervisory dial to interrupt the hot feed on reset line 570 for a short period of time.

If it is desired to effect local control of the reset, the reset contacts are connected to the line 585 which may be supplied with a local voltage feed to effect the reset. As will be obvious, with the three dial unit, as shown in FIGURES 13*a* and 13*h*, a triple reset is provided and the selection of any of resets 1, 2, or 3 is automatically effected by changing from dial 1 to dial 2 to dial 3.

The dial change may also be effected remotely, or locally, dependent upon the setting of the selector switches 586 and 587. To effect remote selection of the dial change, the switch 586, for example, is positioned to engage contact 587, which is connected by line 588 to a dial 2 selection means in the master. In this position a voltage feed placed on the line 588 will pass through the switch 586 to the coil of a relay 589, which is connected at its opposite side by line 590 to the grounded line 580, thus effecting energization of the relay 589. As will be hereinafter described, this will change from dial 1 to dial 2. Normally, dial 1 is rendered operative through a circuit comprising a hot line 300, line 301, line 302, which is connected through relays 305 and 309, as previously described, to place a hot feed on a buss line 310. At the same time, as previously set forth, all the dial motors are energized so that as the contacts sets 1 through 5 of dial 1 are closed by the keys of the dial 1 unit, the various control functions to be hereinafter described, are effected.

Similar to the manner described in connection with switch 586, it will be seen that by connecting switch 587 to the line 591, the number 3 dial unit may be selected by the energization of the relay 592 by placing a hot feed on line 591.

To effect local manual selection of the dial units, the switches 586 and 587 are moved into engagement with the contacts 593, or 594, which are connected by line 595 to the hot line 300 thus causing energization of the relays 589, or 592, as the case may be. Finally, by moving the switches 586 and 587 into engagement with the contacts 596, or 597, the dial change selection may be made by the time switches 598 or 599, which may be conventional time operated switches.

Returning now to the energization of relay 589, which may be energized either remotely or locally, in any one of the three manners just described, the energization of the relay causes the armature 600 to be moved from the contact 601 into engagement with the contact 602, thus completing a circuit from the hot line 300 and line 595 to line 603, or line 604, in the case of energization of the relay 592. These circuits, however, are open through the armatures 605 and 606 of the relay 607.

All dial transferring will take place at one specific place in the cycle, which will be during the amber interval following phase A, or the amber interval preceding phase B, which ever occurs first. This is accomplished through a 2-leg OR circuit for energizing the relay 607. This OR circuit comprises predictor circuit for predicting a phase C to phase B transfer circuit sequence commencing with line 610 in the TPO unit, line 611, which is connected through a rectifier 612 in the TSI unit to line 613 and through resistor 614 in line 613 to the top side of the coil of relay 607, the opposite side of the coil 607 being connected by line 615 to grounded line 583. The other leg of the OR circuit for relay 607 commences with the amber phase A signal line 496 in the TPC unit, FIGURE 13*a* which is connected by line 616 through rectifier 617 to the line 613, which is completed through the relay coil 607, as just described. Consequently, it will be seen that the relay 607 will be energized by either the phase A amber signal energization during the amber of a phase C to phase B transfer sequence. In either case, the energization of the relay 607 will connect the hot feed on line 603, for example, through the armature 605 to the contact 618, which is connected by line 619 through the coil of relay 309 to the ground line 583 thus energizing relay 309. The energization of relay 309 transfers the hot feed from line 306 through the armature 307 to the contact 620, which is connected by bus line 621 to the dial 2 contacts. The movement of armature 307 broke the feed from the bus 310 for dial unit 1, thus rendering dial unit 1 inoperative, even though the dial 1 motor continues to rotate the unit. In the same manner, the hot feed on line 604 will be supplied upon energization of the relay 607 to the coil of relay 305 to energize this relay, which in turn will transfer the hot feed from line 302 through the armature 303 to contact 622, which is connected to the bus 623 line for the contacts of dial 3. Similarly, the movement of the armature 303 removes the feed from line 306, thus rendering the dial contacts of dial 2 inoperative.

When either of the relays 309, or 305 are energized, as above set forth, they are held in the energized condition through stick circuits comprising hot line 301, line 624, armature 625 and contact 626 of relay 309, which is connected through the coil of relay 309 to ground; the stick circuit for relay 305 consists of hot line 301, line 302, armature 627 and contact 628, which is connected through the coil of relay 305 to ground. These stick circuits are necessary to maintain these relays in the energized condition, since the hot feeds on line 611, or 616 are maintained during only one portion of the complete cycle.

The transfer from dial 3 to either of dials 2 or 1, and from dial 2 to dial 1, must also be effected at a particular point in the cycle, and it is accomplished in the following manner. For example, let it be assumed that it is desired to transfer from dial 2 back to dial 1. The selection is made by opening the feed to the selector switch 586 either locally, or remotely, in the manner previously set forth. This will serve to de-energize the relay 589, and to connect the top of the coil of relay 309 by line 630, contact 601, armature 600, line 603, armature 605. The contact 618 of de-energized relay 607 is connected by line 619 to the bottom of coil 309. The relay 309, however, is still maintained in the energized condition by the stick circuit previously described. Accordingly, when a hot feed is again placed on either the line 611 or 616, the relay 607 will be again energized, thus placing both sides of the coil of the relay 309 at the same potential, and de-energizing the relay, which in turn breaks the stick circuit, previously described. From the above description, it will be obvious that the transfer from dial 3 to dial 2, or from dial 3 to dial 1, is effected in the same manner.

The split transfer feature of the TSI unit previously referred to in connection with FIGURE 2, and the general description will now be described in detail. The normal operation of the dial unit is such that the contact positioned at zero point in FIGURE 2 closes the first set of dial contacts to place a maximum pulse on line 630, and the dial key positioned at the 33% location of the dial would close the second dial unit contacts 311 to place a maximum pulse on the line 312, and the key positioned at the 66% point of the dial unit will close the third set of dial contacts to place maximum pulse on the line 631. However, in a phase A to phase C transfer sequence the right-of-way signal display for phase A will end somewhere between the first and second dial keys on the dial unit of FIGURE 2, and since in this sequence the main timer functions to skip the right-of-way signal display to phase B, the phase C right-of-way signal display sequence will have a maximum, or total right-of-way signal display interval consisting of the point at which the phase A sequence ended between dial contacts 1 and 2 until some point between the dial contacts 3 and 1. To avoid such an inordinately long maximum interval for phase C under this condition, a fourth dial key 45 is added, and is shown in FIGURE 2 as being positioned at the 50% point in the dial unit. The function of this key is to transfer the maximum pulse on line 631 from contacts 3 to contacts 4 by the energization of relay 634. In a phase A to phase C transfer sequence, a hot feed is placed by the TPO unit on the line 560, which is connected by line 635 through the rectifier 636 to the top of the coil of relay 636. Consequently, in the phase transfer sequence assumed, the relay 634 would be energized moving the armatures 637 and 638 upwardly into engagement with the upper fixed contacts. The movement of the armature 637 would transfer the maximum pulse for line 631, which is connected to the armature 637 from line 639, which is shown as connected to the number 3 dial unit contacts to line 640, which is connected to the number 4 dial unit contacts as shown. Consequently, in this transfer sequence, and with the split transfer key positioned, as shown in FIGURE 2, the maximum pulse will be placed on line 631 when the key 45 closes the number 4 dial contacts, thus dividing the right-of-way interval for the skipped phase B between phases A and C.

Since it is only desired to use the split transfer feature in the transfer sequence selected to receive the split transfer operation, it is necessary to de-energize the relay 634 upon completion of the operation of the split transfer. This is accomplished by connecting the phase C amber hot feed placed on line 642 by closing the phase C amber cam contacts 136 in the TAC, FIGURE 13*a*, to line 644, which is connected to the bottom side of the coil of relay 634. The relay 634 was maintained in the energized condition after receiving the hot feed from line 635 by a stick circuit consisting of hot line 301, line 302, armature 638, which is in engagement with its upper fixed contact in the energized condition of relay 634 and line 645, which is connected through the coil of relay 634 to the ground line 646. Consequently, when the hot feed is placed on line 644, as just described, both sides of the coil 634 will be placed at the same potential thus de-energizing the relay 634 and returning the phase C maximum impulse to the number 3 dial unit contacts.

Located in the upper portion of FIGURE 13*a* is a conventional voltage regulator 650 which functions to maintain a constant voltage on the main hot timing line 651.

*Triple pedestrain timer—TPT*

The triple pedestrian timer is shown by placing FIGURES 13*c*, *d*, *j*, and *k* together in the manner shown in the key diagram FIGURE 13. The TPT unit includes a cam unit having 21 cam contacts 653 to 673, and the cam unit is similar in construction and general operation to the cam unit of the main timer. This cam unit is synchronized with, or kept in step with, the main timer unit by the predictor circuit lines 674, 675, 676, 677, 560 and 678, which lines are connected through rectifiers indicated by the reference numeral 679 to the cam unit contacts 665, 666 and 667, as indicated in FIGURE 13*c* of the drawings. Referring now to the cam chart for the TPT unit, shown in FIGURE 4, the cam contacts 665 to 667, inclusive, are closed during all intervals, except the intervals associated with the respective phases for the cam contacts. To illustrate the operation of these synchronizing cam contacts, assume the cam unit contacts 665 are closed, and a hot feed is placed on the lines 674 or 675, from the TPO unit. The line 674 receives a hot feed, and the line 675 receives a hot feed during the amber interval preceding phase A in either a phase C to phase A transfer sequence, or a phase B to phase A transfer sequence. This hot feed will pass through closed cam contacts 665, line 680 and through coil of relay 223 to line 681, which is connected to a grounded line 682, thus energizing the relay 223. Since the cam unit contacts 665 are closed in both of pedestrian phases B and C, the relay 223 will thus be energized in these phases by a hot feed received on the lines 674 and 675 during the amber interval preceding phase A. The energization of relay 223 connects the hot feed at point 220 through the armature 221 and the upper fixed contact of relay 223 to the line 683, which is connected by lines 684 and 685 through cam unit motor to the ground line 682, thus energizing cam unit motor and rotating the cam unit for as long as the relay 223 is energized. The cam unit in the TPT will therefore remain in step with the cam unit of the TAC unit as a result of the predictor circuit from the TPO unit.

As seen in FIGURE 12 and FIGURE 13*k*, the detector for the three pedestrian movements associated with the main vehicle movements, are connected through the TPT unit. Accordingly, at this point let it be assumed that pedestrian phase A, or movement I push button 686 is closed. This will complete a circuit from ground line 197 through the closed push button 686, line 687, detector disconnect switch 688, through the coil of the phase A detector relay 689 to the hot side of the phase A detector transformer 690, thus energizing the relay 689. The energization of the relay 689 will close a stick circuit consisting of grounded line 691, line 692, armature 693, and contact 694 through coil of relay 689 to the transformer 690, thus maintaining the relay 689 in the energized condition. Armature 695 of the relay 689 will move into engagement with the contact 696 to complete a circuit for recalling the main timer to phase A by connecting the phase A memory circuit to the phase A detector circuit. This circuit commences with the grounded line in the TAC unit, closed main timer memory phase A cam contacts 125, line 697, which is connected by line 698 to the armature 695 of the phase A detector relay 689 in the TPT unit, and through the armature 695 to contact 696 to line 699, which is connected by line 700 in the TPO unit through a detector disconnect switch 701 to the contact 702 and armature 703 of relay **703*a* in the TPO unit to line 704, which is connected by line 705 in the TAC unit to line 706 through the coil of phase A detector relay 161 to the transformer 210, thus placing a phase A detector call on the main timer. This circuit which passes through the relay 703*a* of the TPO unit, as just described, will operate to prevent phase A calls from being registered on the main timer during phase C amber, due to the fact that in the phase C amber interval the relay 703*a* will be energized, thus breaking the circuit at armature 703**.

The energization of the phase A detector relay 689 also completes a circuit from the hot feed 708 through the armature 709 and contact 710 of the relay 689, line 711 to the armature 712 of relay 713 in the TPT unit. As the main timer moves to the amber interval preceding phase A, the synchronization between the cam units in the main timer, and the TPT unit will operate as previously described, to spin the cam unit to position I, as shown on cam chart in FIGURE 4, in which position cam contacts 665 open.

When the main timer cam unit moves into the green A initial portion of the proceed interval, the main timer cam contacts 129 will close to supply a hot feed to line 187, which is connected to the green signal for phase A, as indicated. The hot feed on line 187 will be transferred by line 715 to line 716, which passes through the coil of relay 713 to the grounded line 717, thus energizing the relay 713. Consequently, the hot feed placed on the armature 712 will be connected by the contact 718 to the line 719, and to the armature 720 of relay 722. The relay 722 is connected to a 3-leg OR pulse circuit so as to pulse this relay by the green signal feed for phase A, B or C. In this example, the hot feed on line 716 will pass through the first leg 723 of this OR pulse circuit through the rectifier 724 to line 725, and by line 726 through the top of the coil of relay 722 to the grounded line 717, thus pulsing this relay. Consequently, the hot feed on the armature 720 will be transferred to the line 727 to energize relay 728 through the line 729, resistor 730, through the coil of relay 728 to line 731, which is connected to the grounded line 717. The hot feed on the coil 728 will also pass through the rectifier 731*a* and line 732 through the coil of relay 228 to the grounded line 717, thus energizing relay 228. Finally the hot feed on line 727 will pass through the coil of relay 733 and through resistor 734 to the grounded line 717. Thus, it will be seen that relays 228, 728, and 733 have been energized. The energization of relay 228 will place the hot feed at point 735 through the armature 736 to the line 737, and through the armatures 738 and 739 of energized relay 733 to the lines 740 and 741, respectively. The hot feed on the line 740 will be connected by the energized relay 713 through the armature 742 and contact 743 by line 744 to the coil of relay 745 to the grounded line 746, thereby energizing the relay 745.

The energization of relay 745 moves its armatures 747, 748, 749 upwardly away from the lower fixed contacts and into engagement with the upper fixed contacts. The movement of the armature 748 will connect the hot feed at point 750 through the upper fixed contact to line 751 which passes through the coil of a relay 752 to a grounded line 753, thus energizing the relay 752. The energization of relay 752 moves its contacts into engagement to connect a hot feed on line 754 through the closed contacts of relay 752 to line 755, which is connected as indicated to the pedestrian phase A walk signal thereby energizing the walk signal.

At the same time the energization of the relay 745 and the movement of the armature 749 away from the lower contact and into engagement with the upper contact connects the hot feed on line 756 through the armature to the upper fixed contact and line 757 connected thereto. The hot feed on the line 756 is thus removed from the lower fixed contact associated with armature 749, thus breaking a signal circuit for the energization of the steady "don't walk" signal comprising a hot line 756, armature 749 in the lower fixed contact, line 758, which is connected to the left hand lower fixed contact of relay 759 and through the armature 760 thereof to line 761 which is connected through a phase A "don't walk" relay 762 to de-energize this relay and separate its contacts. The de-energization of this relay 762 disconnected the hot feed on line 754 through bus line 763, and the previously closed contacts of relay 762 to line 764, which is connected to the phase A "don't walk" signal, thus de-energizing this signal. Separation of the armature 749 of relay 745 from its lower contact, and thus removing the hot feed from line 758 also removes the hot feed from the primary of the phase A pedestrian detector relay 690, thereby de-energizing the relay 689 and breaking the stick circuit for the relay 689, as previously described.

The hot feed placed on the line 757 by the armature 749 as a result of the energization of relay 745 causes the relay 733 to become de-energized by virtue of the fact that the hot feed on line 757 is connected to the bottom of the coil of relay 733 thus placing both sides of the coil at the same potential and de-energizing this relay. Prior to this time, the relay 733 had been held energized through a stick circuit comprising the hot feed on the line 741, which is connected to line 727, and through the rectifier 765 to the top of the coil of relay 733. Accordinly, the de-energization of the relay 733 breaks this stick circuit.

Relay 745 will be maintained in the energized state by a stick circuit comprising the hot feed at point 766 which passes through the walk hold cam contact 670 which closed as the cam unit spins through position 1 and enters position 2, and from line 767 and upper fixed contact and armature 747 of relay 745 to line 777 which is connected through the coil of relay 45 to the grounded line 746, thereby maintaining the relay 745 in the energized state.

It will be recalled that the stop circuits for the main timer pass through the contacts of relay 228 in the TPT unit via the lines 229 and 248. Consequently, the energization of the relay 228, as previously set forth, will open both of these stop circuits through the opening of armatures 246 and 227. Accordingly, the main timer will rest in the phase A green initial portion of the proceed interval until the relay 228 becomes de-energized. This will occur in a manner to be now described upon completion of the timing interval for the phase A walk signal.

The TPT unit is provided with a walk and clearance initial RC timer, seen in FIGURE 13, including a tube 780, a capacitor 781, and a first plate relay 782, and variable timing resistors 783, through 791, which are associated with the TPT cam unit contacts 656 to 664. Capacitor 781 is charged to maintain the grid bias in the tube 780 through a circuit comprising the hot feed at point 792, armature 793 of relay 728, line 794 which passes through a resistor 795 and rectifiers 796, line 797 to the top of the capacitor 781 and the grid of tube 780, the opposite side of the capacitor 781 being connected to the grounded line 682, as shown. Consequently, the capacitor 781 will have been charged previous to the energization of the relay 728 of this circuit. Accordingly, when the relay 728 became energized, as above described, this circuit also opened, and the capacitor 781 begins to discharge. The discharge path for the capacitor 781 comprises line 797, line 794 to the timing bus line 798 through the closed cam contacts 656 and variable resistor 783, line 799, fixed resistor 800 to line 801, which is connected to the ground line 682.

Upon completion of the discharge of capacitor 781, the second plate relay 802, however, will not be energized since the plate circuit comprising line 803, contact 804 and armature 805 of relay 806, and line 807 is open by virtue of the separation of the armature 808 from the contact 809 of relay 810. Accordingly, the TPT unit rests in the phase A walk interval, which is position 2 in the cam chart shown in FIGURE 4. It will be seen, therefore, that while the TAC unit normally rests in the extension interval of phase A, the TPT unit, under the conditions above described, forces the main timer to rest in the initial interval displaying a green signal to the phase A vehicle movement, and a walk signal to the phase A pedestrian movement.

The plate circuit for the relay 802 will be completed upon the energization of the relay 810 through the cam contacts 668. The relay 810 is energized by a detector actuation on one of the opposing phases of the TAC unit. For example, let it be assumed that the phase B detector 198 is actuated to call the main timer from phase A to phase B. The actuation of the detector 198 will energize the relay 162 in the main timer, as previously described. This will complete a circuit originating in FIGURE 13*k* at the grounded line 812, line 813, line 814, line 815, armature 816 and contact 817 of relay 818, line 819 having resistor 820 therein, to line 821, which passes out of the TPT unit and into the TAC unit to line 192 and through contact 194, and armature 193 of energized relay 162 through the closed cam contacts 120 to line 237, which is connected in the TRC unit to armature 235 and contact 234 of relay 236, line 233, contact 231, and armature 230 of relay 232, line 473, line 229 to armature 227 and contact 226 of relay 228 in the TPT unit to line 822, to the bottom of the coil of relay 810, and rectifier 823 to line 224, which is connected to the contact 222 and armature 221 of relay 223 to the hot feed at point 22. As will be obvious, this circuit therefore energizes the relay 810 to move the armature 808 into engagement with the contact 809, thus completing the plate circuit previously described for the plate relay 802 to line 824 through the closed TPT cam unit contacts 668 to line 825 which is supplied with a hot feed from point 826. This hot feed on the plate circuit energizes the relay 802, thus moving the armature 827 into engagement with the contact 828, thereby completing a feed from the hot line 829 to the armature 827 and contact 828, to line 684, which passes through the motor 830 of the TPT cam unit to the grounded line 685, thereby effecting energization of the cam unit motor 830 and rotation of the TPT cam unit to the next position. Referring again to FIGURE 4, position 3 of the cam unit is the initial clearance position for the phase A pedestrian movement. The cam contacts 670 will open as the cam unit moves from position 2 to position 3, breaking the stick circuit previously described for relay 745, thus de-energizing the relay 745. The de-energization of relay 745 will in turn de-energize the walk signal for pedestrian movement A. In position 3 of the cam unit, the cam contacts 671 are closed completing a circuit to energize the relay 759. This circuit comprises a hot feed originating at point 735, armature 736 of relay 228, which is connected to line 737 by the energization of relay 228, as previously described, and from the line 737 through line 834 to armature 835 and contact 836 of previously energized relay 837 to line 838, which is connected to the bus line 839 and through the closed cam contact 671, line 840, line 842 through the coil of relay 759 to the ground line 682 thus energizing the relay 759. The relay 837 was previously energized through a circuit comprising the grounded line 717, coil of relay 837, line 844, which is connected through the contact 845, and armature 846 of a relay 847 to a hot feed at point 848. The relay 847 in turn was energized to complete the circuit just described by a pulse formed by the energization of relay 818. The relay 818 receives its feed from a 3-leg OR circuit comprising lines 850, 851 and 852, which are connected respectively to the lines 642, 431 and 376, which in turn are connected to the amber contacts 136, 133, and 130 for phases C, B and A in the main timer. Accordingly, when one of these cam contacts is closed, the hot feed will be transferred through the lines just mentioned through a rectifier 853 located in each of the lines 850, 851 and 852 and through resistor 854 to the coil of relay 818, which is connected at its opposite sides by line 814 and 813 to ground thus energizing the relay 818. The energization of relay 818 causes the armature 855 to move upwardly into engagement with the contact 856 thus connecting the hot feed at point 848 to the line 857 through the resistor 858 and rectifiers 859 through contact 856 and armature 855 to line 860 to charge the capacitor 861 which is connected at its opposite side to the grounded line 813. Accordingly, when the hot feed is removed from any one of the lines 850, 851, and 852 by the opening of the amber cam contacts in the main timer, the relay 818 will be deenergized dropping the armature 855 back into engagement with its lower contact point 862, thereby completing a pulse circuit comprising charged capacitor 861 (this capacitor was charged, as will be obvious by de-energization of relay 818), line 860, armature 855, contact 862, line 863, resistor 864 through the coil of relay 847 to the grounded line 813, thus momentarily pulsing the relay 847. As above set forth the pulsing of the relay 847 will connect the hot feed at 848 to the line 844 and through the coil of relay 837 to energize the relay 837 to in turn place the hot feed on the bus 839, as above described. The relay 837 is held in the energized condition through a stick circuit comprising a hot line 756, line 866, armature 867, contact 868 through the coil of relay 837 to the ground line 717, thereby holding the relay 837 energized.

The energization of relay 759 in FIGURE 13*d* will cause the armature 760 to move upwardly into engagement with the upper fixed contact, thus completing a circuit from the hot line 756, line 870 through the motor 871 of a flashing unit and from the opposite side of the motor by line 872 to the grounded line 682. The hot feed on the line 870 now passes through the flasher contacts 873 to line 874 which is connected by the upper fixed contact, and the armature 760 of relay 759 to line 761, which, as previously described, is connected to energize the "don't walk" signal. Now, however, the flasher unit causes the "don't walk" signal to be intermittently energized thus giving a flashing "don't walk" indication.

Referring again to the cam chart of FIGURE 4, it will be seen that in position 3 of the cam unit, the cam contacts 668 are open thus breaking the plate circuit of relay 802 while the cam contacts 669 are closed completing a plate circuit for the plate relay 782. This circuit consists of tube 780 which is connected to the grounded line 682, line 876 which passes through the coil of relay 782 to line 877 which is connected through the closed cam contacts 669 to the hot feed at point 826. Similarly to the operation of the TAC cam unit, the main timing capacitor 781 in the TPT unit has been charged as the TPT cam unit moves from position 2 to position 3 and will now discharge through a timing path similar to that previously described, but in this position the discharge path will be through cam contacts 657 and variable resistor 784. Accordingly, upon discharge of capacitor 781 the tube 780 will now conduct through the plate circuit, just described, to energize the relay 782. The energization of the relay 782 will break stick circuits for the relays 728 and 228. These stick circuits comprise the hot feed at point 878 through the armature 879 and contact 880 of relay 782 to line 881, which passes through the rectifier 882 and through the contact 883 and armature 884 of the energized relay 728, and through the resistor 730, and the coil of the relay 728 to the ground line 731. The hot feed on the line 881 is also connected through the resistor 730 to the line 732, which passes through the coil of relay 228 to the grounded line 717. Consequently, the opening of the armature 879 of relay 782 will break both of these stick circuits de-energizing the relays 728 and 228.

The de-energization of relay 228 will establish the stop circuits for the main timer plate relay through the lines 248 and 229, as previously described, thereby permitting the energization of the TAC cam motor to rotate the TAC cam unit from the phase A green initial position to the phase A green extension position.

The energization of the plate relay 782 of the TPT walk and clearance initial timer will supply the hot feed at point 878 and armature 879 to the line 885, which passes through rectifier 886 and through the coil of relay 887 to the line 888 which is connected to be grounded line 682, thus energizing the relay 887. The relay 887 is maintained in the energized state by a stick circuit consisting of the hot feed at point 848 adjacent relay 847 in FIGURE 13*j* in the TPT unit through the armature 846 to contact 889, line 890, contact 891, armature 892 of the TPT clearance timer plate relay 893, line 894, which passes through the upper right hand fixed contact in armature 895 of energized relay 759 to line 842, to line 840 through the rectifier 896, line 897, armature 898 and fixed contact 899 to the top of coil of the relay 887 which is connected at its opposite side to a ground line thus maintaining the relay in the energized condition. The energization of the relay 887 also breaks the charge circuit for the main timing capacitor 900 in the clearance terminal timer consisting of the hot feed 901, rectifiers 902, and resistor 903, armature 904, contact 905, line 906 and line 907, which is connected to the top of the capacitor 900, which is connected at its opposite side to ground line 682. Accordingly, the removal of the charging voltage from the capacitor 900 allows the capacitor 900 to discharge through the path comprising line 907, line 908, to the terminal timing buss 909, and through the closed phase A terminal timing contacts 662, and variable resistor 789 to the grounded line 799. As will be obvious, this will time the terminal clearance interval for pedestrian phase A. Upon completion of the discharge of the capacitor 900, the clearance terminal timer tube 910 will began to conduct current through the circuit comprising hot feed 911, coil of relay 893 and tube 910, which is connected to the grounded line 682. The conduction of current in this circuit will enegrize the relay 893 and break the stick circuit for relay 887 previously described by opening the armature 892 of relay 893. This, however, may not occur since the timing for the clearance terminal interval is always set by means of the variable resistors 662, 663 and 664 to be at least one second longer than the total of the extension amber and all-red intervals, and, accordingly, the relay 847 will energize prior to the completion of the discharge of capacitor 900, thus breaking the stick circuit for the relay 887 by the opening of the armature 846 of the relay 847, which in turn replaces the charging voltage upon the capacitor 900. Regardless of which one of the relays 847 or 893 becomes energized first to break the stick circuit, the breaking of the stick circuit will also cause the de-energization of the relay 759 by breaking its stick circuit previously described thus returning the armature 760 into engagement with the lower fixed contact to change the signal indication on the phase A pedestrian signal from flashing "don't walk" to steady "don't walk".

As previously set forth, the plate circuit for the relay 802 is completed by the energization of the relay 810 which becomes energized by a detector acutation on any of the three main phases. Accordingly, in a transfer sequence where one of the main phases is being skipped in order to prevent the relay 810, which is maintained in an energized condition during such a skip transfer sequence, from indicating a false call, the relay 806 is energized during the time that the main timer cam unit motor is running to break the plate circuit for the timer tube 780. The energization of the relay 806 is accomplished by a circuit comprising a line 912, in the TAC unit, FIGURE 13*h*, which is receiving a hot feed from the line 243 during the running of the main timer cam unit motor 244, line 913 in the TPT unit FIGURE 13*j*, which is connected through the coil of 806 to the grounded line 682 thereby energizing the relay 806. The energization of this relay moves the armature 805 away from the contact 804, thus breaking the plate circuit for the tube 780.

The TPT unit is provided with a pedestrian signal switch 914 connecting the hot line 915 which receives its hot feed from line 405 by line 916 to the line 756. Accordingly, when the switch 914 is open, the hot feed will remove from the line 756, and hence from the line 758, which is connected to the detector transformer and the line 761, which is connected to the means for energizing the pedestrian signals, thereby rendering the TPT unit inoperative insofar as the signal indication and detector actuations are concerned.

The TPT unit is also provided with 3 recall switches 917, 918, 919, FIGURE 13*j*, which when closed connect the coil of the detector relays to the ground line 691 from the detector transformer. These switches, when closed, serve to place continuous calls on the pedestrian phases, but it should be noted that the detector relays will not be energized even though the recall switches are closed during the walk interval due to the fact that the hot feed to the detector transformer is removed, as previously described, during this interval. As shown in FIGURE 13*k*, each of the detector relays is provided with a pilot light, wired in parallel with the relay to indicate, for purposes of service and maintenance, when the relays are energized.

Finally, as is the case with the units previously described, the TPT unit is symmetrical so that the operation of the unit for a phase B or phase C pedestrian actuation is the same as above described for a phase A actuation.

Pedestrian overlap unit—TPL

As previously set forth, the TPL unit functions to provide an overlap pedestrian movement which is given the right-of-way signal display simultaneous with one of the vehicle overlap movements. The TPL unit may be connected in the controller circuit so as to provide this overlap movement with any one of the three vehicle overlap movements. For purpose of illustration and explanation however, the unit has been shown as connected to give an overlap pedestrian movement simultaneous with the vehicle overlap movement phase A plus phase B. This pedestrian movement is shown on FIGURE I, as being the pedestrian movement across the street 22, and is indicated by the dashed lines 32.

The TPL unit is shown in FIGURES 13*g* and 13*n* of the circuit diagram. Since the pedestrian overlap movement is associated with the vehicle overlap movement A plus B, the pedestrian walk signal must come on simultaneously with the vehicle proceed signal for the A plus B vehicle movement. Consequently, it will be understood that the controller must either be on phase C or be cycled to phase C, and then called back to phase A or phase B in order for the pedestrian overlap signal to start simultaneously with the proceed signal for the A plus B vehicle movement.

When the push button detector 920 (see FIGURE 13*k*) for the pedestrian overlap movement is closed, a circuit will be completed from the grounded line 197 through the closed detector switch 920, line 921, detector disconnect switch 922 in the TPL unit to the coil of relay 923 to the hot secondary of a detector transformer 924 thus energizing the relay 923. At the same time, the relay 925 which is wired in parallel with the relay 923, will also be energized by the hot feed on line 921. These relays will be maintained in the energized state by a stick circuit comprising line 926 which is connected to a grounded line 927 and through the armature 928 and contact 929 of energized relay 925 to the bottom side of the coils of relays 923 and 925, which are connected at their opposite sides to the detector transformer 924.

The energization of relay 925 serves to place a call on phase C when the proceed signal for the vehicle overlap movement A plus B is on, through a circuit comprising the hot feed on line 412, line 930, which passes through the left hand armature and lower fixed contact of a relay 931, line 932, contact 933 and armature 934 of energized relay 925, line 935, which is connected through a rectifier and resistor to the top of the coil of the relay 936 and from the opposite side of the coil to a grounded line 937, thus energizing the relay 936. The energization of the relay 936 connects the grounded line 937 through the armature 938 and contact 939 to the line 940 which is connected by line 941 through the TPO unit, as shown, and by line 435 from the TPO unit to the phase C detector relay 163, in the TAC, thus calling the main timer cam unit to the phase C portion of the cycle.

At this point let it be assumed that the main timer was resting on the phase B extension portion of the proceed interval, which is position 9, shown on the cam chart of FIGURE 3. Let it further be assumed that the "don't walk" signals for all pedestrian movements are energized, and that the pedestrian overlap detector actuation just described was followed by a detector actuation for the phase A and B pedestrian movements. As above set forth, the pedestrian overlap detector actuation will call the main timer to the phase C portion of the cycle as previously described. This means that the cam unit will cycle to present the phase B vehicle movement with an amber signal, an all-red interval following the phase B amber signal, and phase C green initial portion of the proceed interval in the normal manner. Since there has been no phase C pedestrian actuation, the cam unit in the main timer will automatically move into the position giving the extension portion of the proceed interval for phase C, and thereafter upon expiration of the maximum set on the dial unit of the TSI unit, the cam unit will move to the position giving the phase C amber signal indication if the traffic demand is sufficiently heavy to render the maximum circuit, previously described, operative. If, however, the traffic density on the phase C movement is sufficiently light, the controller will pass to the phase C amber position in a normal manner by virtue of the calls on the pedestrian movements phases A and B. Upon completion of the extension portion of the proceed interval, the cam unit will cycle to present phase C with an amber clearance interval, and the TRC unit will then insert an all-red clearance interval into the cycle following the phase C amber clearance interval.

The previous actuation of the pedestrian overlap detector 920 will supply a hot feed from the hot line 242, line 942, line 943, armature 944, contact 945 of energized relay 925, line 946 to the armature 947 of relay 948. The relay 948 is energized when the proceed signal is displayed to the A plus B vehicle overlap movement through the circuit comprising a hot line 412, line 930, line 949 through the conventional pulse circuit, as shown in FIGURE 13*g* to the coil of relay 948 and from the opposite side of the coil by line 950 to a grounded line 951, thus energizing the relay 948 at the beginning of the A plus B proceed signal. The energization of the relay 948 thus connects the hot feed on armature 947 to the contact 952 and through line 953 through the coil of relay 931 to the line 954 which is connected to ground, as indicated, thus energizing the relay 931. The relay 931 is maintained in the energized state through a stick circuit comprising a hot line 942, line 955, line 956, armature 957 and contact 958 of relay 959, line 960, contact 961, and armature 962 of energized relay 931 through the coil of the relay 931 to ground.

The energization of relay 931 serves to de-energize the "don't walk" signal to the pedestrian overlap movement which was maintained in the energized condition by the circuit comprising hot line 405 which passes into the TPL unit, line 963, armature 964, contact 965 of relay 966, line 967 through the middle armature and lower contact of relay 931 to line 968, which is connected through coil of the overlap movement "don't walk" signal relay 969 in the TPT unit, thus de-energizing this signal upon de-energization of the relay 969.

Finally, the energization of the relay 931 completes a circuit for the energization of the walk signal to the pedestrian overlap movement comprising hot line 412, line 930, armature 970, and contact 971 of relay 931 to line 972, which is connected through coil of the "walk" signal relay 973 for the overlap walk signal in the TPT unit thereby energizing the "walk" signal. As will be obvious, this action took place simultaneously with the commencement of the proceed indication to the vehicle overlap movement A plus B by virtue of the hot feed on line 412 to the overlap vehicle movement A plus B proceed signal. The hot feed for the pedestrian overlap walk signal on line 973 is connected by line 974 through a resistor and rectifier to the coil of the relay 975 which is connected at its opposite side by lines 976 and 954 and 950 to the grounded line 951, thus energizing the relay 975. The energization of relay 975 breaks the circuit supplying the hot feed to the detector transformer 924 to disconnect the power from the detector relays 923 and 925. This circuit comprises the hot line 942, line 955, which passes through the armature 977 and contact 978 of relay 975 to the line 979 which is connected to the primary of the detector transformer 924, and consequently the energization of the relay 975 will break this circuit to the armature 977.

At this point, the signal indications are illustrated in the color sequence chart of FIGURE 10 in interval I thereof. As seen in FIGURE 10, the walk signal for the phase A pedestrian movement is energized. Accordingly, the actuation of the phase B pedestrian detector previously assumed, will cause the TPT unit to change the signal indication on phase A pedestrian movement from walk to a clearance initial interval, which displays a flashing "don't walk" to phase A pedestrian movement while holding the main timer in the phase A initial portion of the proceed interval. Upon completion of the phase A pedestrian initial clearance interval, the TPT unit will move to the phase A clearance terminal portion of the clearance interval which, as previously described, allows the main timer to move to the extension portion of the vehicle phase A proceed interval. Consequently, after the extension portion of the vehicle phase A proceed interval has expired, the main timer will move through the amber and all-red clearance intervals, which follow phase A to the phase B initial portion of the proceed interval. At this point, the signals for the various movements are as indicated in interval 5 of FIGURE 10. The controller will now rest in this initial interval in order to display a minimum walk signal to the phase B pedestrian movement, as set forth in connection with the description of the TPT unit.

Now let it be assumed that phase C pedestrian detector actuation has been received, thus cycling the TPT unit to change the signal indication on phase B from walk position to the clearance initial position wherein a flashing "don't walk" signal is displayed. The signal for the pedestrian overlap movement will now also show a flashing "don't walk" signal indication by virtue of the energization of the relay 980.

The relay 980 is connected in a unique pulse circuit so that upon the initial application of the power to the TPT unit, this relay will be energized in the following manner. The hot feed on the line 942 will pass through rectifiers 981, and capacitor 982 through the coil of relay 980 and resistor 983, to the line 984 which is connected by line 927 to the grounded line 950. Accordingly, this circuit will serve to initially pulse the relay 980. As above set forth, the initial pulsing of the relay 980, however, has no effect on the TPL unit. The charged capacitor 982 will be discharged slowly through the resistor 985 when the pedestrian phase B walk signal is energized through the circuit comprising the hot line 986 from the TPT unit (as previously described in connection with the pedestrian phase A movement, this line will be hot by the operation of the TPT unit as a result of a pedestrian phase B movement call). The line 986 is connected to the bottom of the coil of relay 980, and the opposite side of the capacitor 982 through the rectifiers 987 and 988 respectively. At this point, both the coil of relay 980 and the capacitor 982 are now placed at the same potential thus allowing the charge on the capacitor 982 to equalize through resistor 985 on both sides of the capacitor. Accordingly. when the phase B walk signal is de-energized, and the hot feed removed from line 986, the relay 980 will be pulsed, thus connecting the hot feed on line 942 through the armature 989 and contact 990 of the relay 980 to line 991. The momentary hot feed on line 991 passes by line 992 through the coil of relay 959 to the ground line 954, thus energizing relay 959. This connects the hot feed on the armature 957 of relay 959 to line 993, and through the armature 994 and contact 995 of energized relay 996 to line 997 through coil of relay 966, to line 998, which is connected to the grounded line 954 to thus energize relay 966.

The relay 996 became energized when the "don't walk" signal was de-energized by the connection of the hot line 967 through the middle armature and upper contact of the relay 931 to line 999, which was connected through the coil of relay 996 to the grounded line 976.

The relay 996 is maintained in the energized condition through a stick circuit comprising hot line 242, line 1000, armature and lower fixed contact of relay 1001, line 1002 through the armature and lower fixed contact of the TPT timer plate relay 1003, line 1004 through the upper armature and upper fixed contact of relay 976 to the top side of coil 996 to maintain the relay energized.

The same stick circuit is utilized to maintain the relay 966 energized by connecting the hot feed on line 1004 to the upper fixed contact and armature of the right hand set of contacts of the relay 966 and through the coil of this relay to the grounded line 998.

The energization of the relay 959 broke the stick circuit for the relay 931, previously described, by the opening of the armature 957. The de-energization of the relay 931 breaks the feed on line 972 for the walk signal for the pedestrian overlap movement thus de-energizing the walk signal. At the same time, a circuit is completed comprising line 405 through the motor of the flasher unit 1005 to the grounded line 954, thus energizing the flashing unit. The hot feed on line 405 passes through the flasher contacts of de-energized relay 931 to the line 968 which is connected to the "don't walk" signal, as previously described, to indicate a flashing "don't walk" signal to the pedestrian overlap movement. It will be obvious, therefore, that the flashing "don't walk" signal indication for the pedestrian overlap movement commences simultaneously with the termination of the phase B pedestrian walk signal.

Referring to interval 8 of the color sequence chart shown in FIGURE 10, it will be seen that the overlap movement flashing "don't walk" signal indication will terminate at the same point in the cycle if the pedestrian phase B flashing "don't walk" signal (i.e., the end of interval 8. This is effected in the following manner. The line 431 which receives a hot feed during the phase B amber interval, which is where the cam unit in the main timer is resting at this point, which hot feed comprises one leg of an OR circuit for energizing the relay 1001. The other leg of this OR circuit receives its hot feed in a phase A to phase C transfer sequence during the amber of phase A from the predictor circuit line 455 which is connected to the line 1006. The lines 431 and 1006 pass through rectifiers 1007 and a resistor 1008 through the coil of relay 1001 to the grounded line 984. Accordingly, the hot feed on line 431 will energize the relay 1001. The energization of the relay 1001 will break one of the parallel paths forming the stick circuit for relay 966 by the opening of the armature of relay 1001. The other path forming the stick circuit is from hot line 242 through the line 1009 and the armature and lower fixed contact of the relay 241. As previously set forth, upon completion of the all-red clearance interval, a circuit will be completed for the main timing plate 167 in the main timer through the TRC unit. This in turn completes a circuit through the motor 244 of the main timer commencing with the hot line 242 through the coil of relay 241 in the TPL unit, line 239, wihch is connected through the armature 238 of relay 167 through the motor 244 in the main timer to the grounded line 245. The relay 241 is of the type that will thus be energized simultaneously with the energization of the motor 244 in the main timer. The energization of the relay 241 will break the alternate path for the stick circuit of relay 966 which, has previously had its other alternate path for the stick circuit broken by the energization of relay 1001, and accordingly relay 966 will now be de-energized. The de-energization of the relay 966 now completes a circuit from the hot line 405 through the circuit previously described to the line 968 to indicate a steady "don't walk" signal to the overlap movement.

The operation of the TPL unit just described in connection with the sequence chart shown in FIGURE 10 will apply similarly to the sequence chart of FIGURE 9 with the difference that the phase A pedestrian movement is called in the sequence chart shown in FIGURE 9. The sequence shown in FIGURE 7 is similar to that shown in FIGURES 10 and 9, with the difference that there is neither a phase A walk or a phase A vehicle proceed signal indication called. Accordingly, it will be seen in FIGURE 7 that the walk signal for the overlap movement will be energized simultaneously with the proceed signal for the vehicle movement A plus B, which is energized concurrently with the proceed signal for phase B, and consequently the description of the TPL unit set forth in connection with FIGURE 10 will be identical for the sequence illustrated in FIGURE 7, with the exception of the phase A pedestrian and vehicle movements.

The TPL unit has a circuit that will call the phase A movement of the main timer after the TPL unit has received the detector actuation during the phase C extension portion of the proceed interval for phase C if no call has come in for phase B at the start of the extension portion of the proceed interval for the phase C. This is necessary in order to call the main timer out of the phase C portion of the cycle to start the proceed signal for the A plus B vehicle overlap movement. Accordingly, if the pedestrian overlap detector 920 has been actuated, a circuit will be completed from the main timer cam contacts 135 which are the cam contacts for the phase C proceed signal through line 1012 to the phase C proceed signal, as indicated, to line 1013 which is connected in the TPL unit through the middle armature and contact of relay 923 which is energized by the detector actuation to line 1014 through armature 1015 and contact 1016 of relay 1017, line 1018, through a rectifier through the coil of relay 1019 to line 1020 which is connected to the grounded line 954, thus energizing relay 1019 so long as relay 1017 is de-energized. The coil of the relay 1017 is connected by line 1021 through the open TAC cam contacts 117 to the hot buss 1022 and hot line 322 in the TAC unit. The cam contacts 117 are open in all the extension intervals of the main timer. The energization of relay 1019 will connect the ground feed on line 1020 through the armature and upper contact of relay 1019 to line 1023 which is connected by line 700 through the TPO unit as previously described, to line 704 which is connected in the main timer, as was previously described, to energize the phase A detector relay 161, thus placing a call on the main timer for phase A. In the event that a call had previously been received on the phase B detector for the main timer, a circuit would be completed from the grounded line 197 through the closed phase B detector 198, line 199, line 200, line 1024 through the coil of relay 1025 to line 1026, which is connected by line 384 to the detector transformer 210 in the main timer thus energizing relay 1025. The energization of relay 1025 will complete a circuit from the hot line 242 through line 955, line 1027, through the armature and upper contact of energized relay 1025, line 1028 through the rectifier 1029 to the bottom side of the coil of relay 1019, thus preventing this relay from being energized by the TPL actuation previously described, thus preventing the TPL unit from placing a phase A call on the main timer, since the phase B detector actuation renders a necessity for the phase A call unnecessary.

In the event that only the phase B vehicle detector 198 is actuated for the phase B vehicle movement, it is necessary to call the pedestrian phase B walk movement to create a point in the cycle where the TPL unit will change the signal indication to the pedestrian overlap movement from steady "walk" to flashing "don't walk." Referring now to FIGURE 7, it will be seen that the flashing "don't walk" for the pedestrian overlap movement commences simultaneously with the flashing "don't walk" for the phase B pedestrian movement. Accordingly, if both the phase A pedestrian and vehicle movements are to be skipped when the main timer leaves phase C, the predictor circuit in the TPO unit for the phase C to B transfer sequence will place a hot feed on line 610, line 1030 through the upper armature and fixed contact of relay 923, line 1031 through the coil of relay 1032 to the grounded line 937, thus energizing the relay 1032. The energization of relay 1032 will connect the ground feed on line 937 through the armature and upper fixed contact of relay 1032 to the line 1033, which is connected by line 1034 in the TPT unit to actuate the phase B detector relay 1035. Consequently, the TPT unit will be cycled to present the "walk" and "don't walk" sequence to the phase B pedestrian movement to create a point at which the TPL overlap signal will change from flashing "don't walk" to steady "don't walk," as previously described.

Now let it be assumed that a TPL detector actuation has been received, and that neither of the phase A or phase B pedestrian movements has been called. Accordingly, as shown in FIGURE 6, the TPL signal indication will change from flashing "don't walk" to steady "don't walk" at the end of the phase B all-red clearance interval (i.e., the end of interval 8 of sequence chart FIGURE 6). This is accomplished due to the fact that the relay 1036 connected at its bottom side to the grounded line 937, and at its opposite side by line 1033 in series with the phase B pedestrian detector relay 1035, which is connected to a phase B detector transformer supplying power to the line 1034. The relay 1036 is much more sensitive than the detector relay 1035 in the TPT unit, and hence the relay 1036 will be continuously energized, except when there is a phase B pedestrian detector actuation to energize the pedestrian detector relay 1035, and consequently it will be obvious that the relay 1036 is energized if no phase B pedestrian actuation is present. Relay 1037 in FIGURE 13*m* is connected at its bottom side to a grounded line 1038, and at its opposite side to line 1039 which is connected by line 376 to the phase A amber cam contacts 130 so that the relay 1037 will be energized by this circuit during the phase A amber interval. As previously set forth the relay 241 in the TPL unit is energized when the main timer cam unit motor 244 runs to the end of each interval, and accordingly when the relay 241 becomes energized the hot feed on line 242 will be connected from line 1009 through the armature and upper fixed contact of relay 241 to line 1040 through line 1041, armature and upper fixed contact of energized relay 1037, line 1042 to the armature and upper fixed contact of energized relay 1036, line 1043 through the coil of relay 959 to energize relay 959. As previously described, the de-energization of relay 959 de-energizes relay 931 and energizes relay 966 to change the signal indication on the pedestrian overlap movement from "walk" to flashing "don't walk." This will take place by the sequence of operations, just described, at the beginning of interval 5 of the sequence chart shown in FIGURE 6, which is the beginning of the phase B proceed signal indication.

Similarly, if the pedestrian phase A was called, along with vehicle phase B, but pedestrian phase B was omitted, the pedestrian overlap signal would commence the flashing "don't walk" indication simultaneously with the commencement of the phase B vehicle proceed signal, i.e., at the beginning of interval 5, as shown in sequence chart of FIGURE 8.

Figure 5:
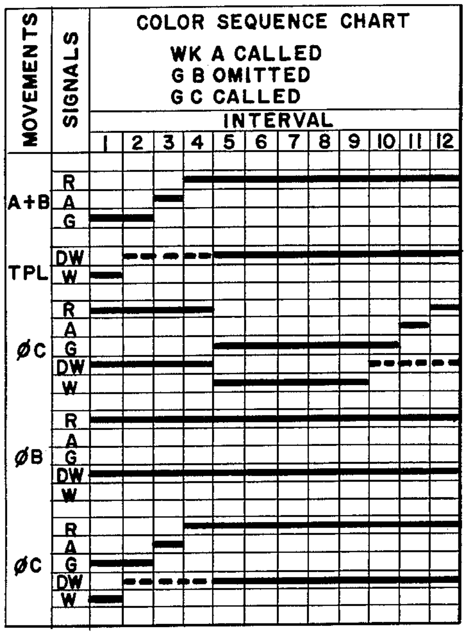
FIGURES 5 to 10, inclusive, are sequence charts illustrating various combinations of calls and resultant signal sequences for the pedestrian overlap unit.

If all of the phase B pedestrian and vehicle proceed signal indication is omitted from the sequence, the "walk" signal for the pedestrian overlap movement would be energized simultaneously with the proceed signal for the A plus B overlap movement, that is at the beginning of interval I, as shown in the sequence chart FIGURE 5. This operation is accomplished similarly to that previously described wherein the flashing "don't walk" signal for the pedestrian overlap movement commences with the pedestrian phase B flashing "don't walk" signal, and is shown as commencing at the beginning of interval 6 in color sequence chart FIGURE 10. However, in this example, a different circuit would be utilized commencing with a hot feed which is placed on line 1045 by line 751 in the TPT unit at the commencement of the walk signal for pedestrian movement phase A, which would result in energizing the relay 1046 in the TPL unit FIGURE 13*n*, in a manner in sequence similar to that described for the energization of the relay 980. Accordingly, when the relay 1046 is pulsed, a hot feed will be received from line 242, line 942, line 955, line 1027 to the armature and lower fixed contact of relay 1025, which is de-energized when there is no phase B vehicle actuation, as previously described, line 1047, armature and upper fixed contact of pulsed relay 1046, line 1048 through line 992 to energize the relay 959, which in turn deenergizes relay 931 and energizes relay 966 to change the signal indication from steady "don't walk" to flashing "don't walk." Accordingly, this will be effected simultaneously with the commencement of the flashing "don't walk" signal for the phase A pedestrian movement, that is at the beginning of interval 2 of color sequence chart FIGURE 5.

Referring now to FIGURE 6, if the controller moved to phase A green after a TPL actuation and omitted phase A "walk," the phase B green would be called automatically by the TPL unit to determine the end of the TPL "walk" indication and the beginning of the TPL flashing "don't walk" indication. This is accomplished in the following manner. Relay 1050 in FIGURE 13*n* in the TPL receives a hot feed from line 1051 via line 715, which is connected by line 187 to the phase A green cam contacts 129, whereby the relay 1050 will be energized when the main timer places a hot feed on the phase A green interval cam contacts. As previously set forth, relay 241 will be energized at the end of phase A green by the energization of the main timer cam unit motor thus connecting a hot feed from line 242 to the armature and to the contact of relay 241 and line 1040 to the armature and upper contact of energized relay 1050 to line 1054, which is connected to the armature of relay 1055. The relay 1055 is energized by a circuit comprising hot line 405, the left hand armature 964 and lower contact 965 of relay 966, line 967, middle armature and upper contact of energized relay 931, line 999, line 1056 through the upper armature and its lower contact of relay 1057, line 1058, through the contact and lower armature of relay 1017, and line 1059, which is connected through the coil of relay 1055 to the grounded line 937. The hot feed on line 1054 is thus transferred by the armature of relay 1055 to the line 1060 which passes through the coil of relay 1061 to the grounded line 937 to energize the relay 1061. The energization of relay 1061 completes a circuit from the grounded line 937 through the armature and upper contact of energized relay 1061 to the line 1024 which is connected, as previously described, to give a phase B detector actuation to call the main timer to phase B, which, as previously described, will change the signal display indication to the overlap movement from "walk" to flashing "don't walk" simultaneously with the commencement of the proceed signal indication to the phase B vehicle movement, which will occur, as shown in the chart of FIGURE 6, at the beginning of interval 5.

In each of the preceeding cases, where the flashing "don't walk" signal controlled by the TPL unit started at the beginning of the phase B green interval (see FIGURES 8 and 6), there is no flashing "don't walk" indication on phase B to create a point at which the TPL flashing "don't walk" signal may end. In this situation, a standard RC timer is utilized in the TPL unit to determine the end of the flashing "don't walk" signal. This timer includes a tube 1065, timing capacitor 1066, and variable and fixed resistors 1067 and 1068, as well as the timing plate relay 1003. The variable resistor 1067, as stated in the general description, is set for one second longer than the longest of the phase A, or phase B clearance interval set on the TPT unit. As the grid bias is removed from the tube 1065 by the discharge of the main timing capacitor 1066 in the conventional manner, through the variable resistor 1067, and fixed resistor 1068, the tube 1065 will become conductive to energize the plate relay 1003, thus opening the stick circuit through the line 1004, previously described, for relay 966, thus in turn de-energizing relay 966. The de-energization of the relay 966, as previously set forth, changes the signal indication from flashing "don't walk" to steady "don't walk."

In the event that the main timer is resting in the phase C green and walk interval, and a TPL actuation is received, it is necessary to force the TPT unit out of phase C green and walk. As will be recalled, it will be necessary to force the TPT unit out of the walk and into the initial clearance interval and from there into the terminal clearance interval in order to allow the main timer, which was being held in the phase C green initial interval, to pass into the phase C green extension interval, in which position relay 1017 in the TPL unit is de-energized, which, in turn, as previously described, energizes relay 1019, which, in turn, places a call on phase A by line 1023, even though no phase A or phase B call has been registered on the detectors. This is accomplished through a circuit originating with the closed cam contacts 135, which places a hot feed on line 1012, which is connected by line 1013, which is connected to the lower armature and fixed contact of energized relay 923 in FIGURE 13*n* of the TPL unit, to line 1075 which is connected through the coil of relay 1076 to the grounded line 1050, thus energizing the relay 1076. The energization of relay 1076 moves the armature into engagement with the upper fixed contact, thus completing a circuit between line 1077 and line 1078. Line 1077 is connected through the closed cam contacts 668 in the TPT unit to the hot line 826, thus completing a circuit back through the line 1078, and the plate circuit of the tube 780 of the walk, clearance and initial interval timer in the TPT unit allowing these intervals to time out.

*Auxiliary pedestrian unit—TPA*

Referring now to FIGURE 1, it will be seen that the vehicle overlap movement 27 (phase B plus C) which turns into street 20 from street 21, will intersect with the pedestrian movement indicated by the dashed lines 42. Accordingly, while it is desirable to provide the vehicle overlap movement 27 (B plus C) during the phase B and phase C intervals, this movement will intersect with the pedestrian movement 42 across the street 20, which pedestrian movement is referred to as a phase B auxiliary pedestrian movement. The TPA unit will function to protect this pedestrian movement by changing the signal indication for the overlap movement B plus C to red during the auxiliary pedestrian phase B walk intervals.

Reference now will be made to FIGURE 14, showing a first connection for the TPA unit with the rest of the controller shown in FIGURE 13 in order to give the result above described. Assuming the main timer to be resting in the phase A extension portion of the proceed interval, an actuation of the pedestrian detector 1080 in the TPA unit will complete a circuit from the ground indicated in FIGURE 14 through line 1081, and the coil of relay 1082 to the detector transformer 1083 to energize the relay 1082. During the phase A green, or proceed interval, a feed placed on the line 715 from the phase A green cam contacts will pass through the rectifier 1084 in the TPA unit and through resistor 1085 by line 1086 through the coil of relay 1087 to the ground point 1088 to energize the relay 1087. The energization of relay 1087 will connect a hot feed from point 1089 through the armature and upper contact of relay 1087 to line 1090 through armature 1091 of energized relay 1082, contact 1092, line 1093 through the coil of relay 1094 to ground point 1095 to energize the relay 1094. Relay 1094 is maintained in the energized state by a hot feed originating at point 1096 through the armature 1097, and contact 1098 of relay 1099, line 1100, line 1101, armature 1102, contact 1103, and line 1104 which passes through coil of relay 1094 to the ground point 1095.

The energization of the auxiliary pedestrian movement detector relay 1082 completed a circuit from the ground point 1105 to the line 1106, and contact 1107 to armature 1108 of relay 1082, and through line 1081, through the coil of relay 1082, through the transformer 1083 to hold the relay 1082 in the energized condition. The ground feed on line 1106 is also transferred through the contact 1109, and armature 1110 to line 1111, which is connected to phase B pedestrian detector relay in the TPT unit, thus placing a call on the phase B pedestrian detector. This call will cause the main timer to move from the green extension position of phase A to the amber phase A position of the main timer cam unit. As the main timer moves into amber phase A, a hot feed on the predictor circuit 453, as a result of the transfer sequence phase A to phase B, will pass through the rectifier 1112 in the TPA unit, rectifier 1113 and resistor 1114 in line 1115, capacitor 1116 and coil of relay 1117 to the ground point 1118. The circuit just described is a conventional pulse circuit so that the hot feed on line 453 will serve to pulse the relay 1117. As the relay 1117 pulses, the hot feed at point 1119 will be connected through armature 1120 and contact 1121 of the relay 1117 to line 1122, which is connected to the armatures 1123 and 1124 of the energized relay 1094. The relay armature 1123 will connect the hot feed to the line 644, which is connected to the TSI unit to effect the split transfer operation, as previously described, if this is connected in circuit with the line 644. (It should be noted, however, that this feature has already been described as being operative during a phase A to phase C transfer sequence).

The hot feed on armature 1124 will be transferred through contact 1125, line 1126 and line 1127 through the coils of relays 1128 and 1129 to the ground points shown in FIGURE 14 to energize these coils. The relays 1128 and 1129 are maintained in the energized state by a hold circuit comprising the hot feed at point 1130, armature 1131 and contact 1132 of relay 1133, line 1134 which passes through the contact 1135, and armature 1136 of energized relay 1129 to the line 1127, which, as previously set forth, is connected through coils to ground to maintain relays 1128 and 1129 energized. The energization of relay 1129 connects the hot feed at point 1137, through the armature 1138 to contact 1139, which is connected by line 1140 through resistor 1141 and rectifiers 1142 to line 1143, through resistor 1144 and the coil of relay 1145 to the ground point 1146, thus energizing relay 1145.

The energization of relay 1145 will connect the hot feed at point 1147, through armature 1148 and contact 1149 to the line 1150, which is connected through the coils of the relays 1151 and 1152 to ground to energize these relays. The energization of relays 1145, 1151, 1152, 1128 and 1129 will transfer the feed for the overlap signals associated with movement 27, from the TPO unit to the main timer. As is indicated on FIGURE 14, the phase B plus phase C overlap movement 27 signals are controlled by the relay 1151 and relay 1128, whereby the energization of these relays will transfer the feed for the B plus C overlap signals through the TPA unit to the main timer. For example, prior to the energization of relays 115, 1128, the feed for the red overlap signal phase B plus C comprises line 1155 through the contact 1156, and armature 1157 of relay 1128 to line 1158, which is connected to the red signal for the B plus C overlap movement, and through the contact 1159 and armature 1160, which is also connected to the line 1158. Accordingly, when the relays 1151 and 1128 are energized, the red signal will now be fed from the main timer feed line 399, which is connected to line 1163, through the contact 1161 and armature 1157 of energized relay 1128 to line 1158, and through the contact 1162 and armature 1160 of energized relay 1151 to the line 1158. Similarly, the feeds for the amber and green signals for the B plus C overlap movement, and the phase B pedestrian signals are transferred from the TPO and TPT units respectively, through the TPA unit to the main timer. As will be obvious, this will turn the B plus C overlap signals, associated with movement 27, to red during the phase B pedestrian movement, thus cutting off that portion of the right-of-way signal display to the B plus C overlap movement 27, and resulting in a protected pedestrian movement across the crosswalk 42 on street 20. Similarly, the crosswalks 40 and 41 may be arranged to be protected pedestrian movements, as is indicated in FIGURE 1.

The TPA unit will be reset when the main timer cycles to the phase A green or phase C green interval by placing a hot feed on either of the line 715, or 1013, as the case may be. This hot feed will pass through the rectifier 1084 to line 1165, armature 1166 of relay 1167, line 1168, rectifier 1169, resistor 1170, capacitor 1171, through the coil of relay 1133 to the ground point, as indicated. This circuit will pulse the relay 1133 to disconnect the hot feed at point 1130 from the line 1134 by opening the armature 1131, thus de-energizing the relays 1128 and 1129, which in turn will de-energize relays 1145, 1151, 1152, thus resetting the TPA unit and allowing the overlap signals for the overlap movement 27 (B plus C) to operate in the normal manner.

It will be noticed that the energization of the detector relay 1082 completed a circuit from the grounded point at the primary of the detector transformer 1083 through line 1172 and the coil of a relay 1173, line 1174, contact 1175 and armature 1176 of energized relay 1082, and line 1177 through the lower left hand fixed contact and armature of relay 1152 to line 1178, which is connected, as indicated, to the hot feed on the phase B walk signal line in the TPT unit. This circuit will energize the relay 1173 when the TPT unit and the TAC unit are resting in the phase B interval, completing a circuit between the lines 1077 and 1078 through the contact 1179 and armature 1180 of the energized relay 1173. This is the cycle circuit previously described in connection with the TPL unit, and will serve to permit the TPT unit to time out the walk and initial clearance intervals for the phase B pedestrian movement, thus allowing the terminal clearance interval to also be timed out, which, as previously set forth, will permit the TPT unit to cycle out of the phase B pedesterian interval, which, in turn, allows the main timer TAC to pass from the phase B initial interval, in which it was held by the TPT unit of the phase B extension interval, all as previously described. As above set forth, this will allow the phase B pedesterian call placed on line 1111 to initiate the operation of the TPA unit, as above described. As will be obvious, when the TPT unit has timed out the phase B walk interval, the hot feed will be removed from line 1178, thus breaking the circuit which energized the relay 1173.

Let it now be assumed that the controller is resting in the phase C extension interval when the TPA detector is actuated. This will cause the operation of the TPA unit in a generally similar manner, with the exception that the signals for the B plus C overlap movement will be changed in this instance from green to amber simultaneously with the change in the phase C signals from green to amber, and from amber to red with the change in the phase C signals.

The connection of the TPA unit shown in FIGURE 15 is to turn the vehicle overlap movement (26 and 31) A plus B to red during the phase B auxiliary pedestrian movement across the crosswalk 41 of street 20, shown in FIGURE 1 in order to make this crosswalk a protected crosswalk. As indicated in FIGURE 15, the signals for the phase A plus B overlap movement 26, 31 are connected through the relays 1128 and 1151 in the TPA unit to the various feeds from the main timer TAC, and the overlap unit TPO, as indicated on the left hand side of FIGURE 15 in order to give the desired signal control just described.

FIGURE 16 illustrates a connection of the TPA unit where an A plus B plus C vehicle overlap movement is provided. While such a movement is not illustrated in FIGURE 1, it will be understood that this movement will continuously receive the right-of-way signal display during all of the main timer phases. FIGURE 16 illustrates a connection for the TPA unit, however, where a crosswalk across the overlap movement A plus B plus C would result in a pedestrian movement, which conflicted with this vehicle overlap movement. In the connection shown in FIGURE 16, this pedestrian movement is shown as being a phase B auxiliary pedestrian movement, and the signal connections are as illustrated in FIGURE 16 to give such a phase B auxiliary pedesterian movement protection against conflict with the A plus B plus C overlap movement by changing this overlap movement to an A plus C overlap movement. The signal connections in FIGURE 16 will result in showing a red signal indication to the A plus B plus C overlap movement during the phase B pedesterian movement.

It will be understood that since FIGURES 14 through 16 indicate three different connections of the TPA unit for phase B auxiliary pedestrian movements, there are three similar connections for the TPA unit associated with each of the phase A and C, thus resulting in 9 possible TPA connection combinations, all of which could be utilized if desired.

Accordingly, it will be seen that I have provided by my invention a new and improved control system and apparatus which combines the best features of the old pre-timed and actuated controllers, and adds additional control features for more efficient movement of traffic through an intersection having any possible geometrical or physical configuration, and which further may be so arranged so as to provide, with other conditions of the same type, an interconnected system to give a progressive traffic movement.

What I claim is:

1. A traffic signal system for a plurality of intersections, each intersection having a plurality of interferring traffic movements, vehicular actuated detector means associated with each of said traffic movements, a full actuated timer at each of said intersections for operating go, clearance, and stop traffic indications for each of said traffic movements in response to actuation of said detector means by traffic in the respective traffic movements, said main timer being operable to display the go indication for a predetermined initial interval followed by an extensible interval, and said timer being operable during the display of the go indication to one of said movements, and in the absence of additional actuations of detector means associated with said one movement during said extensible interval, and upon actuation of detector means in another of said movements, to effect start of transfer of the go indication to said other movement, said main timer including further means, operable during the display of the go signal to one movement and in response to additional actuations of the detector means associated with said one movement during said extension interval, to extend the go signal indication to said one movement for an additional period of predetermined length following each such additional actuation, a coordinating cycle timer connected to said main timer at each of said intersections, said coordinating cycle timer being operable during each cycle thereof to transmit to said main timer a number of pulses corresponding to the number of said traffic movements, said main timer having additional means operable for each of said traffic movements subsequent to the reception of a pulse from said coordinating cycle timer during a said additional period and upon actuation of the detector means associated with another movement to prevent the start of a further additional period and to effect transfer of the go signal indication to said other movement.

2. A traffic signal system having a plurality of intersections, each intersection having a plurality of interferring traffic movements, a controller at each of said intersections, said controller including a main timer operable during the display of the go signal to each movement, and upon actuations occurring in all other of said movements to display the go signal in a predetermined sequence to said movements, a coordinating cycle timer connected to said controller at each of said intersections, said coordinating cycle timer being operable during each cycle thereof to transmit to said main timer in said predetermined sequence, a pulse corresponding with each of said traffic movements, said main timer including additional means operable subsequent to the reception of a pulse from said coordinating cycle timer corresponding to one traffic movement and during the display of the go signal to said one movement and during repeated actuations of its associated detector, to effect transfer of the display of the go signal to another traffic movement upon actuation of the detector means associated with said other traffic movement, said main timer being operable during the display of the go signal to one of said movements to effect immediate start of transfer of the go signal to a movement other than the next sequential movement upon actuation of the detector means in said other movement and in absence of actuation of the detector means associated with said next sequential movement, said coordinating cycle timer having means operable to transmit a pulse prior to the time of transmittal of the pulse corresponding to said other movement, and to omit transmittal of the pulse corresponding to said other movement, whereby the time which would normally be allotted to the next sequential movement by said coordinating cycle timer is divided between said other movement and the movement in which detector actuation has next occurred.

3. A traffic signal system for three or more intersecting traffic movements, a controller, said controller including a main timer for operating go, clearance, and stop signal indications to each of said traffic movements in response to actuation of detector means associated therewith, said main timer being operable during display of the go signal to one of said traffic movements, and upon actuation of the detector means in another of said traffic movements to effect display of the clearance signal to said one traffic movement, and subsequently effect display of the go signal to said other traffic movement, said controller including an additional timer operable following the display of the clearance signal to said one movement to prevent termination of the display of the stop signal to said other traffic movements for a predetermined time interval, said controller also including means operable upon actuation of the detector means in said other movement for determining the extent of said predetermined time interval.

4. A traffic signal system for three or more intersecting traffic movements, a controller, a vehicle actuated detector associated with each of said traffic movements, a pedestrian actuated detector associated with each of said traffic movements, said controller including a main timer operable upon actuation of a vehicle detector associated with a traffic movement to display the go signal indication, to said traffic movement, said main timer including means operable, during the display of the go signal to said one movement and in response to said additional actuations of the vehicle detector associated therewith, to extend display of the go signal to said one movement for an interval following each additional actuation up to a maximum, said controller further including a pedestrian signal timer, means operable upon actuation of a pedestrian detector associated with one of said movements to cause said main timer to display the pedestrian go signal to said one movement for a predetermined minimum interval and to display the go signal to vehicle traffic for said one movement, and upon display of the pedestrian go signal to prevent further operation of said main timer, said pedestrian timer being operable upon actuation of detector means in another of said traffic movements to effect display of a pedestrian clearance signal to said one movement and to restore operation of said main timer, and said pedestrian timer being operable in the presence of additional actuation of the detector means associated with said one traffic movement to effect termination of said pedestrian clearance signal prior to the termination of the display of the clearance signal by said main timer to vehicle traffic in said one movement.

5. A traffic signal system for three or more intersecting traffic movements, a controller, a vehicle actuated detector associated with each of said traffic movements, a pedestrian actuated detector associated with each of said traffic movements, said controller including a main timer operable upon actuation of a vehicle detector associated with a traffic movement to display the go signal indication to said traffic movement, said main timer including means operable, during the display of the go signal to said one movement and in response to said additional actuations of the vehicle detector associated therewith, to extend display of the go signal to said one movement for an interval following each additional actuation up to a maximum, said controller further including a pedestrian signal timer, means operable upon actuation of a pedestrian detector associated with one of said movements to cause said main timer to display the pedestrian go signal to said one movement for a predetermined minimum interval and to display the go signal to vehicle traffic for said movement, and upon display of the pedestrain go signal to prevent further operation of said main timer, said pedestrian timer means being operable upon actuation of detector means in another of said traffic movements to effect display of an initial pedestrain clearance signal for a predetermined interval and thereupon to restore operation of said main timer and to effect display of a terminal pedestrain clearance signal, said pedestrain timer being operable to effect termination of said terminal pedestrain clearance signal simultaneously with the termination of the display of the clearance signal to vehicular traffic in said movement by said main timer in the absence of additional actuation of the vehicle detector means associated with said one traffic movement.

References Cited by the Examiner

UNITED STATES PATENTS

| | | | |
|---|---|---|---|
| 2,215,851 | 9/40 | Horni | 340—35 |
| 2,88Q,645 | 4/59 | DuVivier | 340—36 |
| 2,3,056,946 | 10/62 | Brockett | 340—36 |

FOREIGN PATENTS

| | | |
|---|---|---|
| 416,588 | 9/34 | Great Britain. |
| 444,969 | 4/36 | Great Britain. |
| 408,796 | 7/38 | Great Britain. |
| 503,798 | 4/39 | Great Britain. |

NEIL C. READ, *Primary Examiner.*

THOMAS B. HABECKER, *Examiner.*

UNITED STATES PATENT OFFICE
CERTIFICATE OF CORRECTION

Patent No. 3,208,038 September 21, 1965

Walter M. Jeffers

It is hereby certified that error appears in the above numbered patent requiring correction and that the said Letters Patent should read as corrected below.

Column 1, line 62, for "contrtol" read -- control --; column 2, line 34, for "righ-of-way" read -- right-of-way --; column 6, line 19, for "displays" read -- display --; column 10, line 53, for "ground" read -- grounded --; line 75, strike out "a"; column 11, line 58, for "225" read -- 255 --; column 13, line 32, for "inpulse" read -- impulse --; column 17, line 43, for "A to A" read -- C to A --; column 20, line 51, for "FIGURE" read -- FIGURES --; column 28, line 46, for "be" read -- the --; line 75, for "began" read -- begin --; column 29, line 3, for "enegrize" read -- energize --; line 11, for "will energize" read -- will be energized --; line 48, for "will remove" read -- will be removed --; line 55, for 13j" read -- 13k --; lines 58 and 59, for "pedstrain" read -- pedestrian --; column 33, line 47, after "plate" insert -- relay --; line 51, for "wihch" read -- which --; column 42, lines 36 and 37, 40, 43, 44, and 45, for "pedestrain", each occurrence, read -- pedestrian --; line 55, for "2,88q,645" read -- 2,883,645 --; line 56, for "2,3,056,946" read -- 3,056,946 --.

Signed and sealed this 28th day of June 1966.

(SEAL)
Attest:

ERNEST W. SWIDER
Attesting Officer

EDWARD J. BRENNER
Commissioner of Patents